US012710841B2

(12) United States Patent
Kim

(10) Patent No.: US 12,710,841 B2
(45) Date of Patent: Aug. 18, 2026

(54) ELECTRONIC DEVICE INCLUDING BOUNDARY ELECTRODES CONNECTED TO BOUNDARY DUMMY PATTERNS THROUGH COMPENSATION CONTACT HOLES IN A SENSOR LAYER

(71) Applicant: Samsung Display Co., Ltd., Yongin-si (KR)

(72) Inventor: Sangkook Kim, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 19/010,774

(22) Filed: Jan. 6, 2025

(65) Prior Publication Data

US 2025/0251829 A1 Aug. 7, 2025

(30) Foreign Application Priority Data

Feb. 6, 2024 (KR) ........................ 10-2024-0018199

(51) Int. Cl.
*G06F 3/041* (2006.01)
*G06F 3/0354* (2013.01)
*G06F 3/044* (2006.01)

(52) U.S. Cl.
CPC ...... *G06F 3/04166* (2019.05); *G06F 3/03545* (2013.01); *G06F 3/04164* (2019.05); (Continued)

(58) Field of Classification Search
CPC ............. G06F 3/03545; G06F 3/04164; G06F 3/04166; G06F 3/0445; G06F 3/0446; G06F 2203/0411
See application file for complete search history.

(56) References Cited

U.S. PATENT DOCUMENTS 10,545,619 B2 1/2020 Lee
10,775,916 B2 9/2020 Kim et al.
(Continued)

FOREIGN PATENT DOCUMENTS

KR 10-1602842 B1 3/2016
KR 10-2020-0143628 A 12/2020
(Continued)

*Primary Examiner* — Liliana Cerullo
(74) *Attorney, Agent, or Firm* — Womble Bond Dickinson (US) LLP

(57) ABSTRACT

An electronic device includes: a sensor layer including: first electrodes; second electrodes; first auxiliary electrodes; second auxiliary electrodes; first trace lines; second trace lines; and dummy patterns. The second trace lines include: second-first trace lines connected to second-first electrodes; and second-second trace lines connected to second-second electrodes. A first boundary electrode from among the second-first electrodes is adjacent to a second boundary electrode from among the second-second electrodes. The dummy patterns include a first boundary dummy pattern, and a second boundary dummy pattern. The first boundary electrode and the first boundary dummy pattern are connected to each other through first compensation contact holes, and the second boundary electrode and the second boundary dummy pattern are connected to each other through second compensation contact holes. A number of the first compensation contact holes and a number of the second compensation contact holes vary depending on positions.

11 Claims, 34 Drawing Sheets

(52) U.S. Cl.
CPC .......... *G06F 3/0445* (2019.05); *G06F 3/0446* (2019.05); *G06F 2203/04111* (2013.01)

(56) References Cited

U.S. PATENT DOCUMENTS

| | | | | |
|---|---|---|---|---|
| 11,449,182 | B2 * | 9/2022 | Gogte | G06F 3/0412 |
| 2016/0048248 | A1 * | 2/2016 | Na | G06F 3/047<br>345/174 |
| 2022/0019306 | A1 * | 1/2022 | Koide | G02F 1/136286 |
| 2022/0147212 | A1 * | 5/2022 | Kim | G06F 3/04162 |
| 2022/0357816 | A1 * | 11/2022 | Wen | G06F 3/04164 |
| 2025/0251827 | A1 * | 8/2025 | Lim | G06F 3/04164 |

FOREIGN PATENT DOCUMENTS

| | | | |
|---|---|---|---|
| KR | 10-2453868 | B1 | 10/2022 |
| KR | 10-2508964 | B1 | 3/2023 |

* cited by examiner

ELECTRONIC DEVICE INCLUDING BOUNDARY ELECTRODES CONNECTED TO BOUNDARY DUMMY PATTERNS THROUGH COMPENSATION CONTACT HOLES IN A SENSOR LAYER

CROSS-REFERENCE TO RELATED APPLICATION

The present application claims priority to and the benefit of Korean Patent Application No. 10-2024-0018199, filed on Feb. 6, 2024, in the Korean Intellectual Property Office, the entire disclosure of which is incorporated by reference herein.

BACKGROUND

Aspects of embodiments of the present disclosure relate to an electronic device for sensing an input by a pen and a proximity input by a pen.

Multimedia electronic devices, such as televisions, mobile phones, tablet computers, notebook computers, car navigation units, game machines, and the like, include a display device for displaying an image. The electronic devices may include a sensor layer (e.g., an input sensor) capable of providing a touch-based input method that enables a user to intuitively and conveniently input information or instructions in an easy and simple manner, in addition to a conventional input method, such as a button, a keyboard, a mouse, or the like. The sensor layer may sense the user's touch or pressure. Meanwhile, pens for users accustomed to inputting information using writing instruments or pens for accurate touch inputs in specific application programs (e.g., application programs for sketching or drawing) have been increasingly demanded.

The above information disclosed in this Background section is for enhancement of understanding of the background of the present disclosure, and therefore, it may contain information that does not constitute prior art.

SUMMARY

Embodiments of the present disclosure may be directed to an electronic device for sensing an input by a pen and a proximity input by a pen.

According to one or more embodiments of the present disclosure, an electronic device includes: a sensor layer; and a sensor driver configured to drive the sensor layer, and selectively operate in a first mode to sense a touch input or in a second mode to sense a pen input. The sensor layer includes: a plurality of first electrodes along a first direction, and extending in a second direction crossing the first direction; a plurality of second electrodes along the second direction, and extending in the first direction; a plurality of first auxiliary electrodes along the first direction, extending in the second direction, and overlapping with the plurality of first electrodes; a plurality of second auxiliary electrodes along the second direction, extending in the first direction, and overlapping with the plurality of second electrodes; a plurality of first trace lines connected to the plurality of first electrodes; a plurality of second trace lines connected to the plurality of second electrodes; and dummy patterns overlapping with the plurality of second electrodes. The plurality of second trace lines includes: second-first trace lines connected to second-first electrodes from among the plurality of second electrodes; and second-second trace lines connected to second-second electrodes from among the plurality of second electrodes. A first boundary electrode from among the second-first electrodes is adjacent to a second boundary electrode from among the second-second electrodes. The dummy patterns include a first boundary dummy pattern overlapping with the first boundary electrode, and a second boundary dummy pattern overlapping with the second boundary electrode. The first boundary electrode and the first boundary dummy pattern are connected to each other through first compensation contact holes, and the second boundary electrode and the second boundary dummy pattern are connected to each other through second compensation contact holes. A number of the first compensation contact holes and a number of the second compensation contact holes vary depending on positions.

In an embodiment, the second-first trace lines may be connected to first ends of the second-first electrodes located on a first side, respectively, and the second-second trace lines may be connected to second ends of the second-second electrodes located on a second side opposite to the first side, respectively.

In an embodiment, the number of first compensation contact holes may increase from a center point of the first boundary electrode toward a second end of the first boundary electrode, and the number of second compensation contact holes may increase from a center point of the second boundary electrode toward a first end of the second boundary electrode.

In an embodiment, the first boundary electrode may include first divided boundary electrodes spaced from each other in the second direction, and the first divided boundary electrodes may be commonly connected to a first boundary trace line from among the second trace lines. The second boundary electrode may include second divided boundary electrodes spaced from each other in the second direction, and the second divided boundary electrodes may be commonly connected to a second boundary trace line from among the second trace lines.

In an embodiment, the first compensation contact holes may be connected with one of the first divided boundary electrodes, and the second compensation contact holes may be connected with one of the second divided boundary electrodes.

In an embodiment, each of the first and second boundary electrodes may include a plurality of sensing patterns, and a plurality of sensing bridge patterns electrically connecting the plurality of sensing patterns to each other. The sensor layer may include: a sensor base layer, the first and second boundary dummy patterns and the sensing bridge patterns being located on the sensor base layer; and an intermediate insulating layer covering the first and second boundary dummy patterns and the sensing bridge patterns, the sensing patterns being located on the intermediate insulating layer.

In an embodiment, the first compensation contact holes may penetrate the intermediate insulating layer, and may expose the first boundary dummy pattern. The sensing patterns of the first boundary electrode may be connected to the first boundary dummy pattern through the first compensation contact holes. The second compensation contact holes may penetrate the intermediate insulating layer, and may expose the second boundary dummy pattern. The sensing patterns of the second boundary electrode may be connected to the second boundary dummy pattern through the second compensation contact holes.

In an embodiment, each of the second auxiliary electrodes may include a plurality of auxiliary patterns, and a plurality of auxiliary bridge patterns electrically connecting the plurality of auxiliary patterns to each other. The plurality of auxiliary patterns may include: first auxiliary patterns on the sensor base layer; and second auxiliary patterns on the intermediate insulating layer.

In an embodiment, the first and second auxiliary patterns may be connected with each other through a contact hole penetrating the intermediate insulating layer, and the second auxiliary patterns and the auxiliary bridge patterns may be connected with each other through a contact hole penetrating the intermediate insulating layer.

In an embodiment, the second mode may include a pen sensing driving mode, and in the pen sensing driving mode, the plurality of first auxiliary electrodes may be electrically connected to ground, or may be electrically connected with each other. In the pen sensing driving mode, the plurality of second auxiliary electrodes may be electrically connected to ground, or may be electrically connected with each other.

In an embodiment, the sensor layer may further include: a third trace line electrically connected to the plurality of first auxiliary electrodes; and a fourth trace line electrically connected to the plurality of second auxiliary electrodes. The fourth trace line may include: a fourth-first trace line commonly connected to second-first auxiliary electrodes adjacent to the second-first electrodes from among the second auxiliary electrodes; and a fourth-second trace line commonly connected to second-second auxiliary electrodes adjacent to the second-second electrodes from among the second auxiliary electrodes.

According to one or more embodiments of the present disclosure, an electronic device includes: a sensor layer; and a sensor driver configured to drive the sensor layer, and selectively operate in a first mode to sense a touch input or in a second mode to sense a pen input. The sensor layer includes: a plurality of first electrodes along a first direction, and extending in a second direction crossing the first direction; a plurality of second electrodes along the second direction, and extending in the first direction; a plurality of first auxiliary electrodes along the first direction, extending in the second direction, and overlapping with the plurality of first electrodes; a plurality of second auxiliary electrodes along the second direction, extending in the first direction, and overlapping with the plurality of second electrodes; a plurality of first trace lines connected to the plurality of first electrodes; a plurality of second trace lines connected to the plurality of second electrodes; and dummy patterns overlapping with the plurality of second electrodes. The plurality of second trace lines includes: second-first trace lines connected to second-first electrodes from among the plurality of second electrodes; and second-second trace lines connected to second-second electrodes from among the plurality of second electrodes. A first boundary electrode from among the second-first electrodes is adjacent to a second boundary electrode from among the second-second electrodes. The dummy patterns include a first boundary dummy pattern connected with the first boundary electrode, and a second boundary dummy pattern connected with the second boundary electrode. Each of the first and second boundary dummy patterns includes a mesh line, a line width of the mesh line varying depending on positions.

In an embodiment, the second-first trace lines may be connected to first ends of the second-first electrodes located on a first side, respectively, and the second-second trace lines may be connected to second ends of the second-second electrodes located on a second side opposite to the first side, respectively.

In an embodiment, the line width of the mesh line of the first boundary dummy pattern may be based on a distance from a first boundary trace line connected to the first boundary electrode from among the second-first trace lines, and the line width of the mesh line of the second boundary dummy pattern may be based on a distance from a second boundary trace line connected to the second boundary electrode from among the second-first trace lines.

In an embodiment, the line width of the mesh line of the first boundary dummy pattern may increase from a center point of the first boundary electrode toward a second end of the first boundary electrode, and the line width of the mesh line of the second boundary dummy pattern may increase from a center point of the second boundary electrode toward a first end of the second boundary electrode.

In an embodiment, each of the first and second boundary electrodes may include a plurality of sensing patterns, and a plurality of sensing bridge patterns electrically connecting the plurality of sensing patterns to each other. The sensor layer may include: a sensor base layer, the first and second boundary dummy patterns and the sensing bridge patterns being located on the sensor base layer; and an intermediate insulating layer covering the first and second boundary dummy patterns and the sensing bridge patterns, the sensing patterns being located on the intermediate insulating layer.

In an embodiment, the first boundary electrode may be connected to the first boundary dummy pattern, and the second boundary electrode may be connected to the second boundary dummy pattern.

According to one or more embodiments of the present disclosure, an electronic device includes: a sensor layer; and a sensor driver configured to drive the sensor layer, and selectively operate in a first mode to sense a touch input or in a second mode to sense a pen input. The sensor layer includes: a plurality of first electrodes along a first direction, and extending in a second direction crossing the first direction; a plurality of second electrodes along the second direction, and extending in the first direction; a plurality of first auxiliary electrodes along the first direction, extending in the second direction, and overlapping with the plurality of first electrodes; a plurality of second auxiliary electrodes along the second direction, extending in the first direction, and overlapping with the plurality of second electrodes; a plurality of first trace lines connected to the plurality of first electrodes; and a plurality of second trace lines connected to the plurality of second electrodes. The plurality of second trace lines includes: second-first trace lines connected to second-first electrodes from among the plurality of second electrodes; and second-second trace lines connected to second-second electrodes from among the plurality of second electrodes. The plurality of second auxiliary electrodes includes: second-first auxiliary electrodes overlapping with the second-first electrodes; and second-second auxiliary electrodes overlapping with the second-second electrodes. The second mode includes a pen sensing driving mode, and in the pen sensing driving mode, the plurality of first auxiliary electrodes are electrically connected to ground, or electrically connected with each other. In the pen sensing driving mode, the plurality of second auxiliary electrodes are electrically connected to ground, or electrically connected with each other. In the first mode, the second-first auxiliary electrodes are configured to receive a first compensation voltage, and the second-second auxiliary electrodes are configured to receive a second compensation voltage different from the first compensation voltage.

In an embodiment, the sensor layer may further include: a third trace line electrically connected to the plurality of first auxiliary electrodes; and a fourth trace line electrically connected to the plurality of second auxiliary electrodes. The fourth trace line may include: a fourth-first trace line commonly connected to the second-first auxiliary electrodes; and a fourth-second trace line commonly connected to the second-second auxiliary electrodes. In the first mode, the sensor driver may be configured to output the first compensation voltage to the fourth-first trace line, and output the second compensation voltage to the fourth-second trace line.

According to one or more embodiments of the present disclosure, an electronic device includes: a sensor layer; and a sensor driver configured to drive the sensor layer, and selectively operate in a first mode to sense a touch input or in a second mode to sense a pen input. The sensor layer includes: a plurality of first electrodes along a first direction, and extending in a second direction crossing the first direction; a plurality of second electrodes along the second direction, and extending in the first direction; a plurality of first auxiliary electrodes along the first direction, extending in the second direction, and overlapping with the plurality of first electrodes; a plurality of second auxiliary electrodes along the second direction, extending in the first direction, and overlapping with the plurality of second electrodes; a plurality of first trace lines connected to the plurality of first electrodes; and a plurality of second trace lines connected to the plurality of second electrodes. The plurality of second trace lines includes: second-first trace lines connected to second-first electrodes from among the plurality of second electrodes; and second-second trace lines connected to second-second electrodes from among the plurality of second electrodes. The plurality of second auxiliary electrodes includes: a first auxiliary boundary electrode overlapping with a first boundary electrode from among the second-first electrodes; and a second auxiliary boundary electrode overlapping with a second boundary electrode from among the second-second electrodes. The second mode includes a pen sensing driving mode, and in the pen sensing driving mode, the plurality of first auxiliary electrodes are electrically connected to ground, or electrically connected with each other. In the pen sensing driving mode, the plurality of second auxiliary electrodes are electrically connected to ground, or electrically connected with each other. In the first mode, the first auxiliary boundary electrode is configured to receive a first compensation voltage, and the second auxiliary boundary electrode is configured to receive a second compensation voltage different from the first compensation voltage.

In an embodiment, the sensor layer may further include: a third trace line electrically connected to the plurality of first auxiliary electrodes; and a fourth trace line electrically connected to the plurality of second auxiliary electrodes. The fourth trace line may include: a first auxiliary boundary trace line connected to the first auxiliary boundary electrode; and a second auxiliary boundary trace line connected to the second auxiliary boundary electrode. In the first mode, the sensor driver may be configured to output the first compensation voltage to the first auxiliary boundary trace line, and output the second compensation voltage to the second auxiliary boundary trace line.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1A:
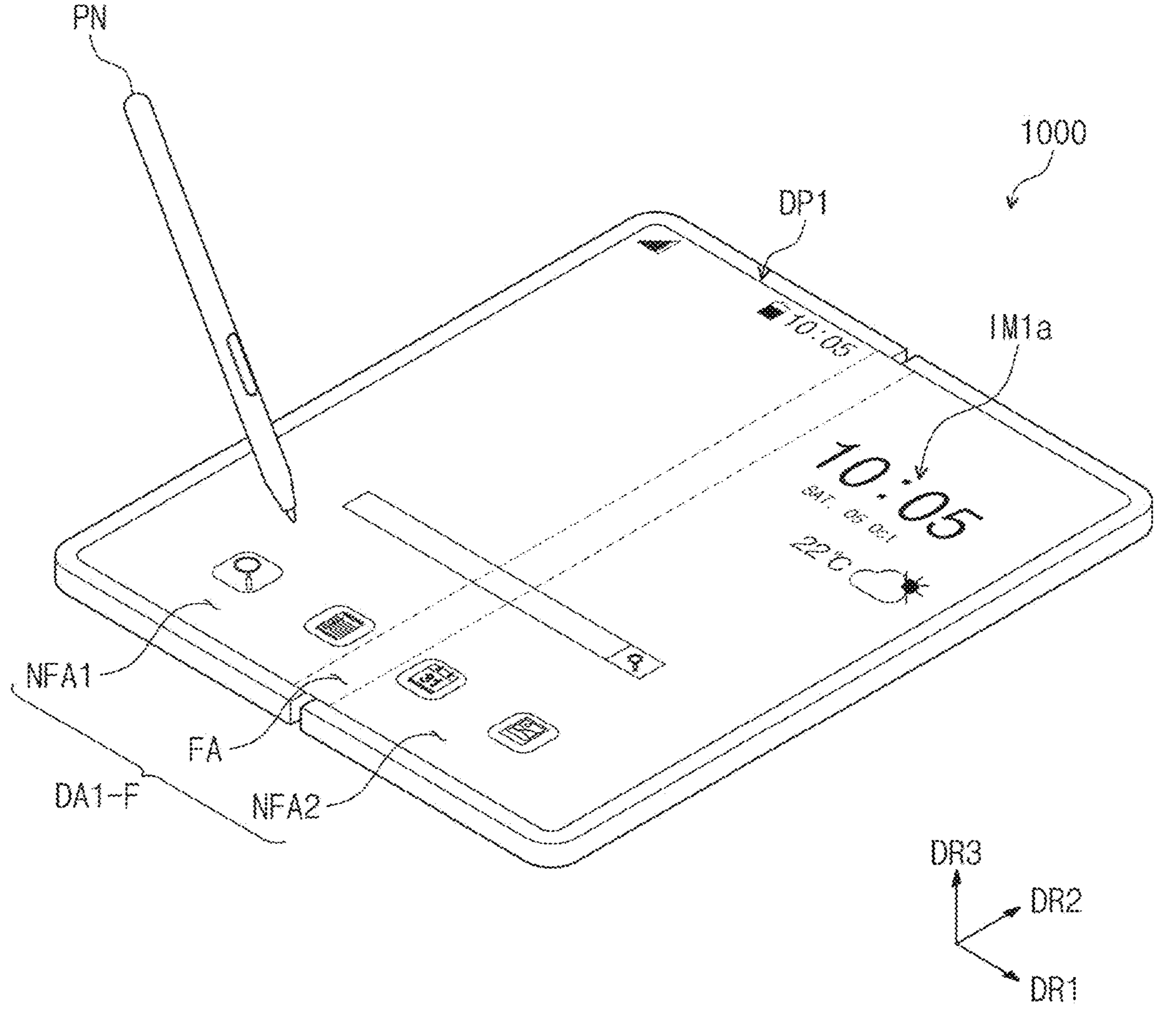
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
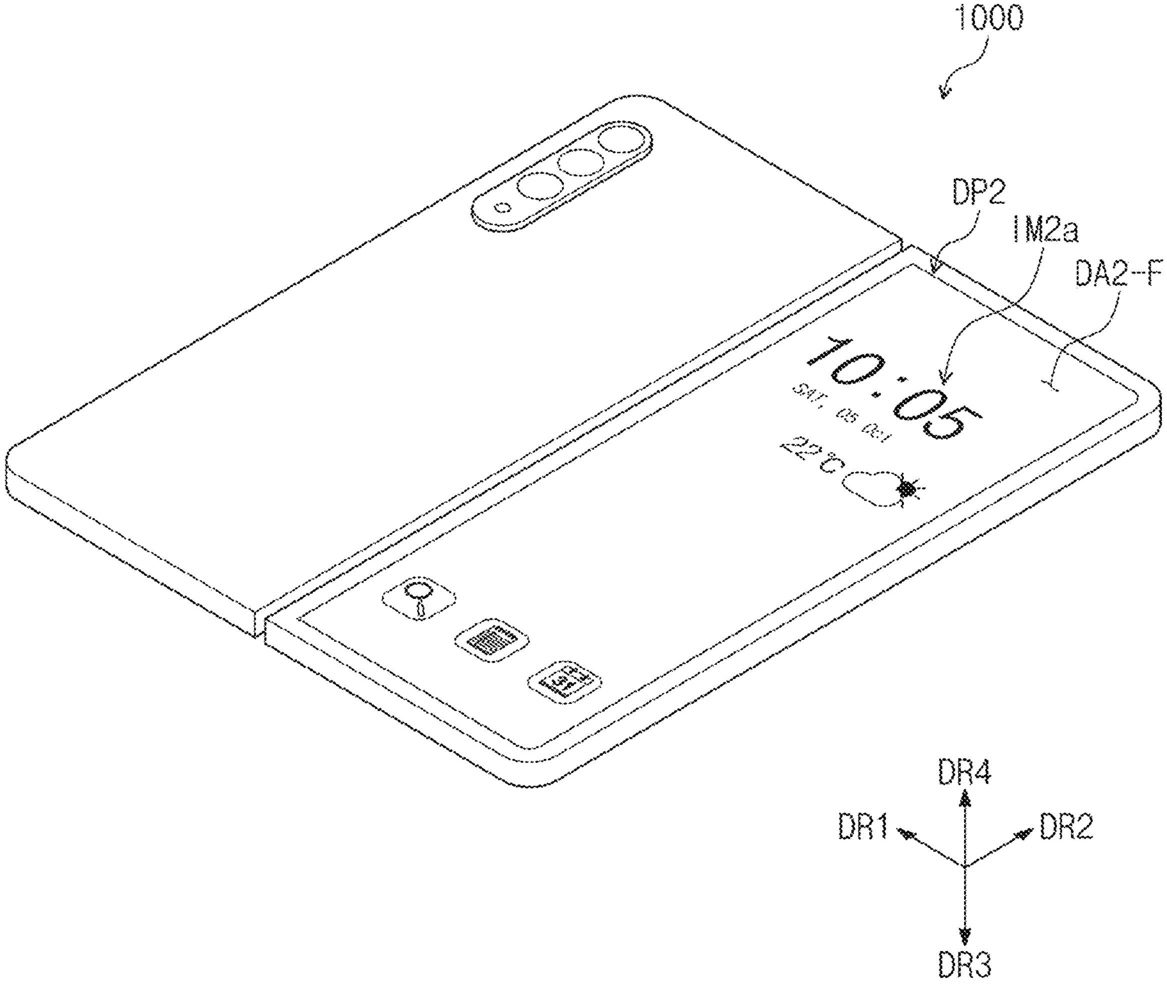
FIG. 1B is a rear perspective view of the electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be a device that is activated depending on an electrical signal. For example, the electronic device 1000 may display an image, and may sense an input (e.g., an external input) applied from the outside. The external input may be a user input. The user input may include various suitable kinds of external inputs, such as a part of a user's body, a pen PN, light, heat, or pressure.

The electronic device 1000 may include a first display panel DP1 and a second display panel DP2. The first display panel DP1 and the second display panel DP2 may be separate panels that are spaced (e.g., that are separated) from each other. The first display panel DP1 may be referred to as a main display panel, and the second display panel DP2 may be referred to as an auxiliary display panel or an external display panel.

The first display panel DP1 may include a first display portion DA1-F, and the second display panel DP2 may include a second display portion DA2-F. The second display panel DP2 may have a smaller area than that of the first display panel DP1. The area of the first display portion DA1-F may be larger than the area of the second display portion DA2-F to correspond to the sizes of the first display panel DP1 and the second display panel DP2.

In an unfolded state of the electronic device 1000, the first display portion DA1-F may have a plane that is parallel to or substantially parallel to a first direction DR1 and a second direction DR2. A thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of members constituting the electronic device 1000 may be defined based on the third direction DR3.

The first display panel DP1 or the first display portion DA1-F may include a folding area FA that may be folded and unfolded, and a plurality of non-folding areas NFA1 and NFA2 that are spaced apart from each other with the folding area FA therebetween. The second display panel DP2 may overlap with one of the plurality of non-folding areas NFA1 and NFA2. For example, the second display panel DP2 may overlap with the first non-folding area NFA1.

A display direction of a first image IM1*a* displayed on a portion of the first display panel DP1, for example, such as on the first non-folding area NFA1, may be opposite to a display direction of a second image IM2*a* displayed on the second display panel DP2. For example, the first image IM1*a* may be displayed in the third direction DR3, and the second image IM2*a* may be displayed in a fourth direction DR4 opposite to the third direction DR3.

In an embodiment of the present disclosure, the folding area FA may be bent about a folding axis extending in a direction parallel to or substantially parallel to long sides of the electronic device 1000, for example, such as in a direction parallel to or substantially parallel to the second direction DR2. The folding area FA may have a curvature (e.g., a certain or predetermined curvature) and a radius of curvature (e.g., a certain or predetermined radius of curvature) in a folded state of the electronic device 1000. The electronic device 1000 may be folded in an in-folding manner, such that the first non-folding area NFA1 and the second non-folding area NFA 2 face each other and the first display portion DA1-F is not exposed to the outside.

In an embodiment of the present disclosure, the electronic device 1000 may be folded in an out-folding manner, such that the first display portion DA1-F is exposed to the outside. In an embodiment of the present disclosure, the electronic device 1000 may be folded in the in-folding manner and the out-folding manner from the unfolded state. However, the present disclosure is not limited thereto.

Although FIG. 1A illustrates an example in which one folding area FA is defined in the electronic device 1000, the present disclosure is not limited thereto. For example, a plurality of folding axes and a plurality of folding areas corresponding to the folding axes may be defined in the electronic device 1000. In this case, the electronic device 1000 may be folded about the plurality of folding axes in an in-folding manner and/or in an out-folding manner from the unfolded state.

According to an embodiment of the present disclosure, at least one of the first display panel DP1 or the second display panel DP2 may sense an input by the pen PN, even without including or using a digitizer. Because the digitizer for sensing the pen PN may be omitted, an increase in the thickness and weight of the electronic device 1000, and a decrease in the flexibility of the electronic device 1000 due to the addition of the digitizer may not occur. Accordingly, in some embodiments, both of or either of the first display panel DP1 and the second display panel DP2 may be designed to sense the pen PN.

Figure 2:
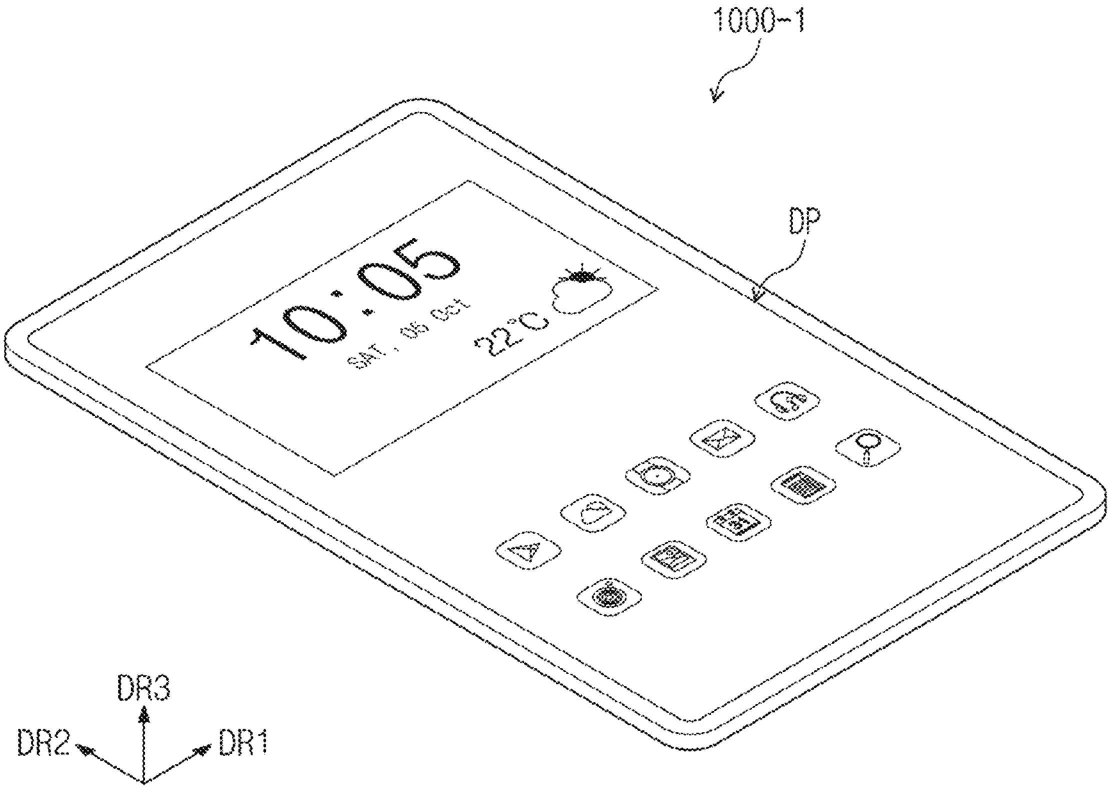
FIG. 2 is a perspective view of an electronic device according to an embodiment of the present disclosure.
Figure 3:
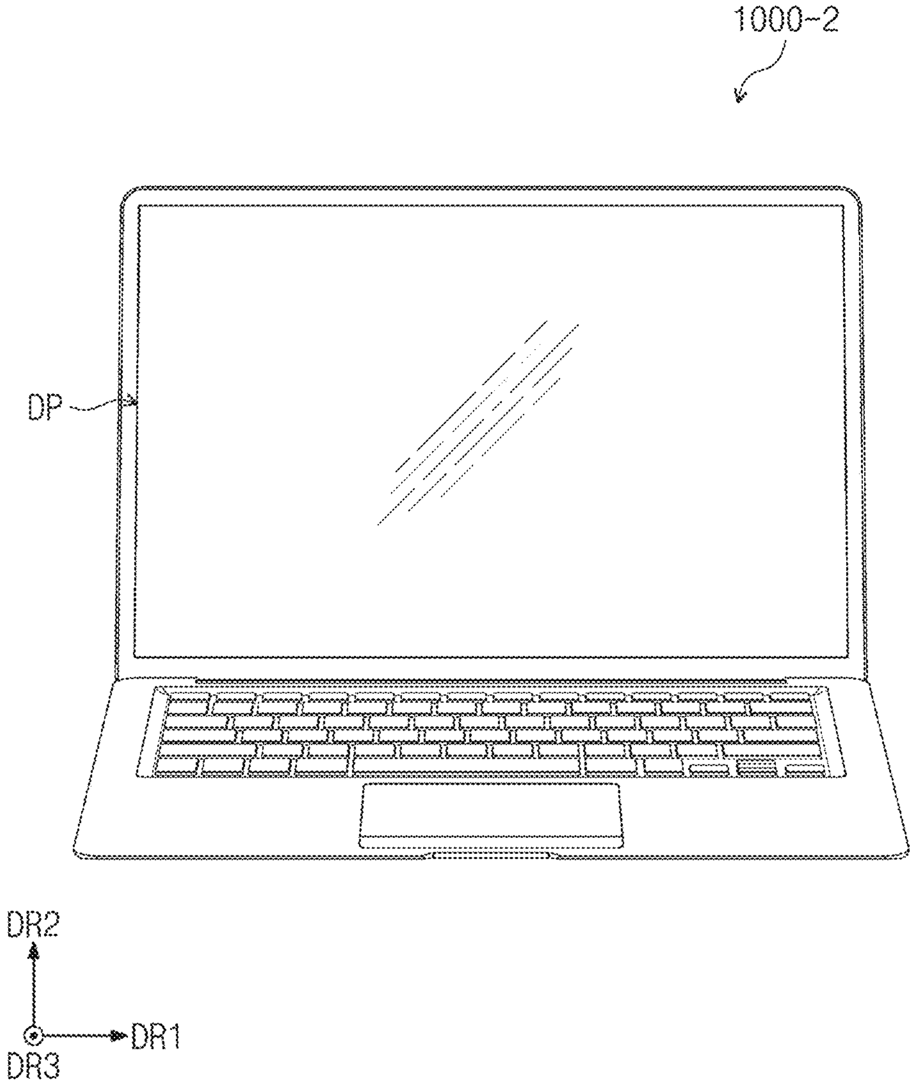
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

FIG. 2 illustrates an example in which the electronic device 1000-1 is a mobile phone, and the electronic device 1000-1 may include a display panel DP. FIG. 3 illustrates an example in which the electronic device 1000-2 is a notebook computer, and the electronic device 1000-2 may include a display panel DP.

In an embodiment of the present disclosure, the display panel DP may sense an input (e.g., an external input) applied from the outside. The external input may be a user input. The user input may include various suitable kinds of external inputs, such as a part of the user's body, the pen PN (e.g., refer to FIG. 1A), light, heat, or pressure.

According to an embodiment of the present disclosure, the display panel DP may sense an input by the pen PN even without using or including a digitizer. Because the digitizer for sensing the pen PN may be omitted, an increase in the thickness and the weight of the electronic device 1000-1 or 1000-2 due to the addition of the digitizer may not occur.

Although a foldable electronic device 1000 is illustrated in FIG. 1A and a bar-kind of electronic device 1000-1 is illustrated in FIG. 2, the present disclosure is not limited thereto. For example, some embodiments of the present disclosure described herein may be applied to various suitable kinds of electronic devices, such as a rollable electronic device, a slidable electronic device, and/or a stretchable electronic device.

Figure 4:
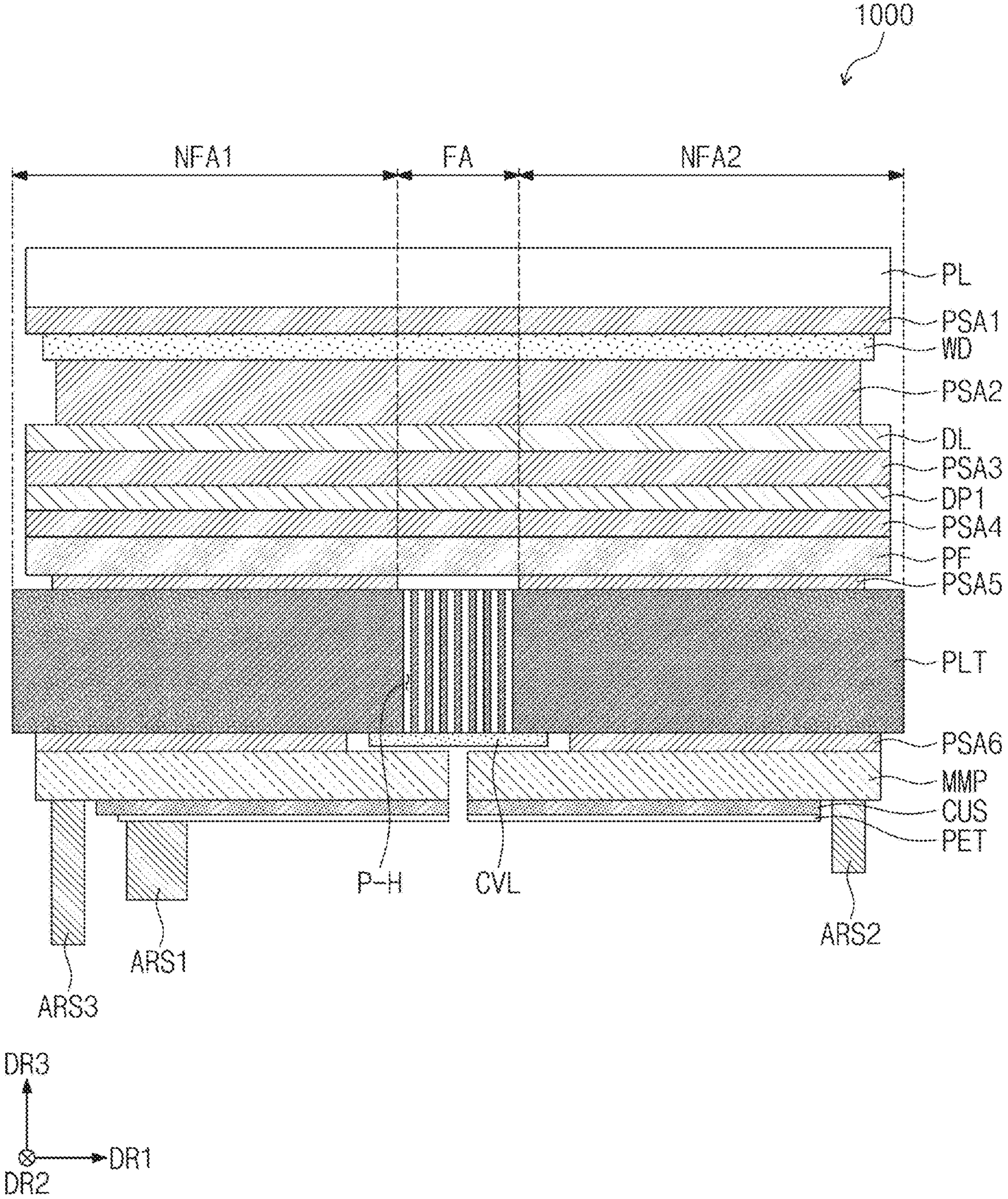
FIG. 4 is a sectional view of an electronic device according to an embodiment of the present disclosure.

FIG. 4 is a sectional view of the electronic device 1000 according to an embodiment of the present disclosure. The sectional view illustrated in FIG. 4 may be a sectional view illustrating a portion of the electronic device 1000 that includes the first display panel DP1 of the electronic device 1000 described above with reference to FIG. 1A.

Referring to FIG. 4, the electronic device 1000 may include the first display panel DP1, upper functional layers, and lower functional layers. The upper functional layers may include components disposed on the first display panel DP1, and the lower functional layers may include components disposed under the first display panel DP1.

The first display panel DP1 may be a component that generates an image, and senses an input (e.g., an external input) applied from the outside. For example, the first display panel DP1 may include a display layer 100 (e.g., refer to FIG. 6) and a sensor layer 200.

The upper functional layers may include a protective layer PL, a window WD, an impact absorbing layer DL, a first adhesive layer PSA1, a second adhesive layer PSA2, and a third adhesive layer PSA3. The components included in the upper functional layers are not limited thereto. At least some of the aforementioned components may be omitted as needed or desired, and other suitable components may be added.

The protective layer PL may protect the components disposed under the protective layer PL. In some embodiments, the protective layer PL may have a thickness of about 60 μm to about 70 μm, for example, such as a thickness of about 65 μm according to an embodiment. However, the thickness of the protective layer PL is not limited thereto.

A hard coating layer, an anti-fingerprint layer, and the like may be additionally provided to the protective layer PL to improve characteristics, such as a chemical resistance, a wear resistance, and the like. For example, the hard coating layer may be a functional layer for improving the usage characteristics of the electronic device 1000, and may be provided on the protective layer PL by coating. For example, anti-fingerprint characteristics, anti-contamination characteristics, and anti-scratch characteristics may be improved by the hard coating layer. For example, the hard coating layer may have a thickness of about 5 μm, but is not particularly limited thereto.

The window WD may be disposed under the protective layer PL. The first adhesive layer PSA1 may be disposed between the window WD and the protective layer PL. In some embodiments, the first adhesive layer PSA1 may have a thickness of about 30 μm to about 40 μm, for example, such as a thickness of about 35 μm according to an embodiment. However, the thickness of the first adhesive layer PSA1 is not limited thereto. In an embodiment of the present disclosure, a bezel pattern may be disposed between the first adhesive layer PSA1 and the protective layer PL.

The window WD may include an optically clear insulating material. For example, the window WD may include a glass substrate or a synthetic resin film. The window WD may have a multi-layered structure or a single-layer structure. For example, the window WD may include a plurality of synthetic resin films that are connected to (e.g., coupled to or attached to) each other through an adhesive, or may include a glass substrate and a synthetic resin film that are connected to (e.g., coupled to or attached to) each other through an adhesive. When the window WD is a glass substrate, the window WD may have a thickness of about 80 μm or less, for example, a thickness of about 30 μm in an embodiment. However, the thickness of the window WD is not limited thereto.

The impact absorbing layer DL may be disposed under the window WD. The second adhesive layer PSA2 may be disposed between the window WD and the impact absorbing layer DL. The second adhesive layer PSA2 may have a thickness of about 70 μm to about 80 μm, for example, a thickness of about 75 μm in an embodiment. However, the thickness of the second adhesive layer PSA2 is not limited thereto.

The impact absorbing layer DL may protect the first display panel DP1 by absorbing an impact applied toward the first display panel DP1. The impact absorbing layer DL may be manufactured in the form of a stretchable film. For example, the impact absorbing layer DL may include a flexible plastic material. The flexible plastic material may be defined as a synthetic resin film. For example, the impact absorbing layer DL may include a flexible plastic material, such as polyimide or polyethylene terephthalate. The impact absorbing layer DL may have a thickness of about 18 μm to about 28 μm, for example, a thickness of about 23 μm according to an embodiment. However, the thickness of the impact absorbing layer DL is not limited thereto. In an embodiment of the present disclosure, the impact absorbing layer DL may be omitted as needed or desired.

The third adhesive layer PSA3 may be disposed between the impact absorbing layer DL and the first display panel DP1. The third adhesive layer PSA3 may have a thickness of about 45 μm to about 55 μm, for example, a thickness of about 50 μm according to an embodiment. However, the thickness of the third adhesive layer PSA3 is not limited thereto.

The lower functional layers may include a protective film PF, a plate PLT, a cover layer CVL, a shielding layer MMP, a lower sheet CUS, an insulating film PET, step compensation members ARS1, ARS2, and ARS3, a fourth adhesive layer PSA4, a fifth adhesive layer PSA5, and a sixth adhesive layer PSA6. The components included in the lower functional layers are not limited thereto. At least some of the aforementioned components may be omitted as needed or desired, and other suitable components may be added.

The protective film PF may be connected to (e.g., coupled to or attached to) the rear surface of the first display panel DP1 through the fourth adhesive layer PSA4. The fourth adhesive layer PSA4 may have a thickness of about 20 μm to about 30 μm, for example, a thickness of about 25 μm according to an embodiment. However, the thickness of the fourth adhesive layer PSA4 is not limited thereto.

The protective film PF may prevent or substantially prevent a scratch from occurring on the rear surface of the first display panel DP1 during a manufacturing process of the first display panel DP1. The protective film PF may be a colored polyimide film. For example, the protective film PF may be an opaque yellow film, but the present disclosure is not limited thereto. The protective film PF may have a thickness of about 45 μm to about 55 μm, for example, a thickness of about 50 μm according to an embodiment. However, the thickness of the protective film PF is not limited thereto.

The plate PLT may be disposed under the protective film PF. The fifth adhesive layer PSA5 may be disposed between the plate PLT and the protective film PF. The fifth adhesive layer PSA5 may have a thickness of about 11 μm to about 21 μm, for example, a thickness of about 16 μm according to an embodiment. However, the thickness of the fifth adhesive layer PSA5 is not limited thereto.

The plate PLT may include a carbon fiber reinforced plastic (CFRP), a metal, or a metal alloy. The plate PLT may support the components disposed thereon. Openings P-H may be defined in (e.g., may be formed in or provided in) a portion of the plate PLT. For example, the plate PLT may include the openings P-H having a shape penetrating the plate PLT from the upper surface to the lower surface of the plate PLT. The openings P-H may be defined in an area overlapping with the folding area FA. The openings P-H may overlap with the folding area FA when viewed from above the plane (e.g., in a plan view), for example, when viewed in the third direction DR3 or the thickness direction of the plate PLT. A portion of the plate PLT may be more easily deformed by the openings P-H. The plate PLT may have a thickness of about 160 μm to about 180 μm, for example, a thickness of about 170 μm according to an embodiment. However, the thickness of the plate PLT is not limited thereto.

The cover layer CVL may be attached to the plate PLT. The cover layer CVL may cover the openings P-H of the plate PLT. Accordingly, the cover layer CVL may prevent or substantially prevent the infiltration of foreign matter into the openings P-H. The cover layer CVL may include a thermoplastic polyurethane, but the present disclosure is not particularly limited thereto. The cover layer CVL may have a thickness of about 11 μm to about 21 μm, for example, a thickness of about 16 μm according to an embodiment. However, the thickness of the cover layer CVL is not limited thereto.

The shielding layer MMP may be disposed under the plate PLT and the cover layer CVL. The sixth adhesive layer PSA6 may be disposed between the shielding layer MMP and the plate PLT. The sixth adhesive layer PSA6 may have a thickness of about 15 μm to about 25 μm, for example, a thickness of about 20 μm according to an embodiment. However, the thickness of the sixth adhesive layer PSA6 is not limited thereto.

The shielding layer MMP may include a magnetic metal powder. The shielding layer MMP may be referred to as a ferrite sheet, a magnetic metal powder layer, a magnetic layer, a magnetic circuit layer, or a magnetic path layer. The shielding layer MMP may shield a magnetic field that transmits through the first display panel DP1. For example, the shielding layer MMP may serve to induce the magnetic field in another direction. Accordingly, the magnetic field that reaches the shielding layer MMP may be shielded without being leaked to the outside, for example, from below the shielding layer MMP. The shielding layer MMP may have a thickness of about 53 μm to about 63 μm, for example, a thickness of about 58 μm according to an embodiment. However, the thickness of the shielding layer MMP is not limited thereto.

The lower sheet CUS may be disposed under the shielding layer MMP. The lower sheet CUS may serve to reflect a magnetic field toward the shielding layer MMP. The lower sheet CUS may include a metal or a metal alloy. For example, the lower sheet CUS may include aluminum, copper, or a copper alloy. The lower sheet CUS may have a thickness of about 15 μm to about 25 μm, for example, a thickness of about 20 μm according to an embodiment. However, the thickness of the lower sheet CUS is not limited thereto.

The insulating film PET may be disposed under the lower sheet CUS. The insulating film PET may include polyethylene terephthalate, but the present disclosure is not particularly limited thereto. The insulating film PET may prevent or substantially prevent the introduction of static electricity. For example, the insulating film PET may prevent or substantially prevent an electrical interference between the members disposed on the insulating film PET and the members disposed under the insulating film PET. The insulating film PET may have a thickness of about 3 μm to about 9 μm, for example, a thickness of about 6 μm according to an embodiment. However, the thickness of the insulating film PET is not limited thereto.

The step compensation members ARS1, ARS2, and ARS3 may include a first step compensation member ARS1 attached to the insulating film PET, a second step compensation member ARS2 attached to the shielding layer MMP, and a third step compensation member ARS3 attached to the shielding layer MMP. The thicknesses of the first to third step compensation members ARS1, ARS2, and ARS3 may be variously modified depending on a desired product structure or a desired arrangement relationship between the components. For example, the first step compensation member ARS1 may have a thickness of about 90 μm, the second step compensation member ARS2 may have a thickness of about 87 μm, and the third step compensation member ARS3 may have a thickness of about 87 μm. However, the present disclosure is not particularly limited thereto.

In an embodiment of the present disclosure, the sixth adhesive layer PSA6, the shielding layer MMP, the lower sheet CUS, and the insulating film PET may each have a structure that is divided at a portion overlapping with the folding area FA. For example, the sixth adhesive layer PSA6, the shielding layer MMP, the lower sheet CUS, and the insulating film PET may each be divided into two components that are spaced apart from each other with a gap (e.g., a certain or predetermined gap) therebetween at the portion overlapping with the folding area FA. The gap may range from about 0.6 mm to about 1.7 mm, but the present disclosure is not particularly limited thereto.

Figure 5A:
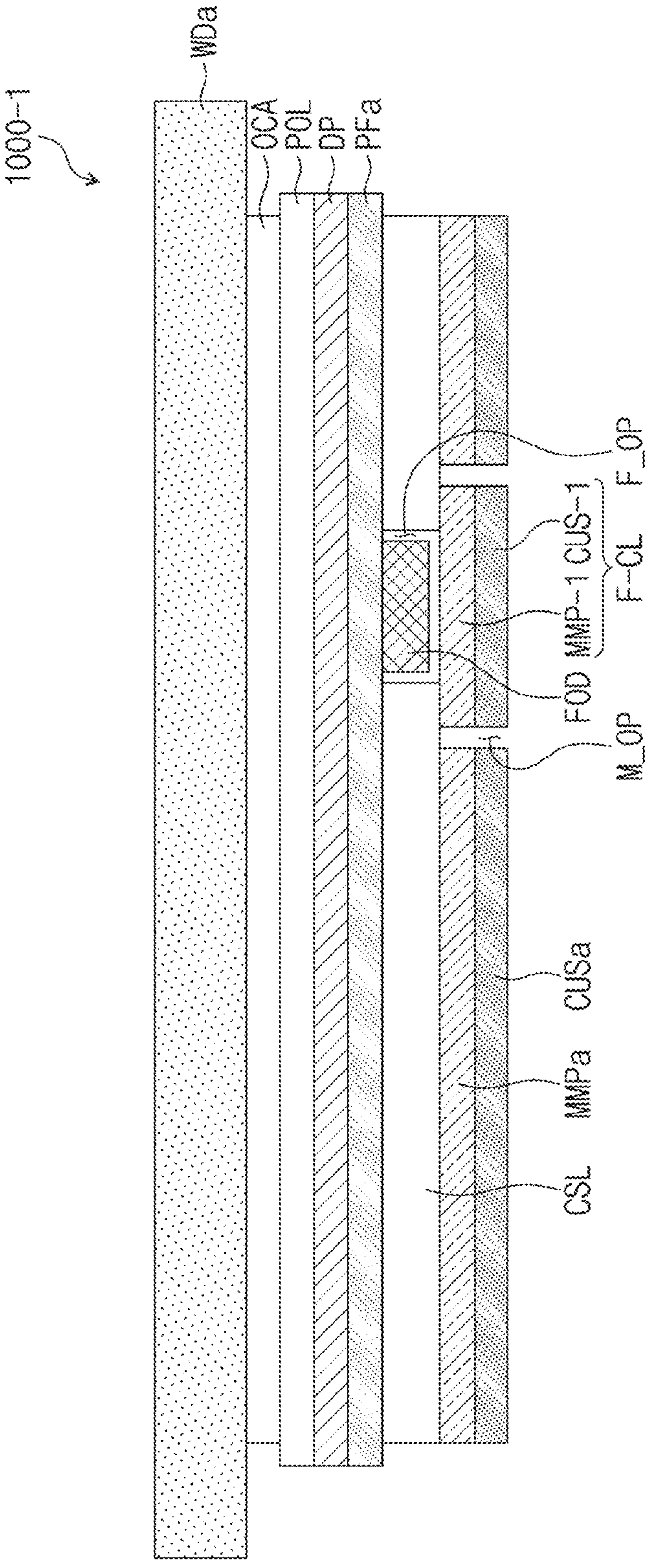
FIG. 5A is a sectional view of an electronic device according to an embodiment of the present disclosure.

FIG. 5A is a sectional view of the electronic device 1000-1 according to an embodiment of the present disclosure.

Referring to FIG. 5A, the electronic device 1000-1 may include the display panel DP, upper functional layers, and lower functional layers. The upper functional layers may include a window WDa, an adhesive layer OCA, and an anti-reflective layer POL. The lower functional layers may include a protective film PFa, a first lower layer CSL, a shielding layer MMPa, a second lower layer CUSa, a fingerprint sensor FOD, and a cover layer F-CL. The components included in the upper functional layers and the lower functional layers are not limited thereto. At least some of the aforementioned components may be omitted as needed or desired, and other suitable components may be added.

The window WDa may include an optically clear insulating material. For example, the window WDa may include a glass substrate or a synthetic resin film, and may have a multi-layered structure or a single-layer structure. For example, the window WDa may be a glass substrate. In this case, the window WDa may have a thickness of about 0.43 mm to about 0.53 mm, for example, a thickness of about 0.48 mm according to an embodiment. However, the thickness of the window WDa is not limited thereto.

The anti-reflective layer POL may be disposed under the window WDa. The adhesive layer OCA may be disposed between the anti-reflective layer POL and the window WDa. The adhesive layer OCA may have a thickness of about 0.10 mm to about 0.20 mm, for example, a thickness of about 0.15 mm according to an embodiment. However, the thickness of the adhesive layer OCA is not limited thereto.

The anti-reflective layer POL may decrease a reflectance of the external light incident from outside the electronic device 1000-1. The anti-reflective layer POL may include a stretchable synthetic resin film. For example, the anti-reflective layer POL may be provided by dyeing a polyvinyl alcohol (PVA) film with an iodine compound. However, the present disclosure is not limited thereto, and the material of the anti-reflective layer POL is not limited thereto. The anti-reflective layer POL may have a thickness of about 50 μm to about 60 μm, for example, a thickness of about 55 μm according to an embodiment. However, the thickness of the anti-reflective layer POL is not limited thereto.

In an embodiment of the present disclosure, the anti-reflective layer POL may be omitted as needed or desired. As another example, the anti-reflective layer POL may be embedded in the display panel DP. In this case, the anti-reflective layer POL may include a barrier wall layer that blocks light, and a plurality of color filters. As another example, the anti-reflective layer POL may include an optical layer that prevents or substantially prevents a reflection, and a barrier wall layer that blocks light.

The protective film PFa may be connected to (e.g., coupled to or attached to) the rear surface of the display panel DP. The protective film PFa may have a thickness of about 83 μm to about 93 μm, for example, a thickness of about 88 μm according to an embodiment. However, the thickness of the protective film PFa is not limited thereto.

The first lower layer CSL may be disposed under the protective film PFa. The first lower layer CSL may have a multi-layered structure. For example, the first lower layer CSL may include an embo sheet and a cushion layer. The embo sheet may absorb light passing through the display panel DP. In addition, the embo sheet may include an embo pattern to prevent or substantially prevent a phenomenon in which bubbles may be generated when the first lower layer CSL is attached to the protective film PFa. The cushion layer may protect the display panel DP from an impact transmitted from below. An impact resistance of the electronic device 1000-1 may be improved by the cushion layer.

An opening F_OP may be defined in the first lower layer CSL, and the fingerprint sensor FOD may be disposed in the opening F_OP. The fingerprint sensor FOD may be attached to the protective film PFa. In an embodiment of the present disclosure, the fingerprint sensor FOD may be omitted as needed or desired.

The shielding layer MMPa may be disposed under the first lower layer CSL. The shielding layer MMPa may shield a magnetic field that transmits through the display panel DP. Accordingly, the magnetic field that reaches the shielding layer MMPa may be shielded without being leaked to the outside, for example, from below the shielding layer MMPa. The shielding layer MMPa may have a thickness of about 20 μm to about 30 μm, for example, a thickness of about 25 μm according to an embodiment. However, the thickness of the shielding layer MMPa is not limited thereto.

The second lower layer CUSa may be disposed under the shielding layer MMPa. The second lower layer CUSa may include a metal or a metal alloy. For example, the second lower layer CUSa may include aluminum, copper, or a copper alloy. The second lower layer CUSa may have a thickness of about 7 μm to about 17 μm, for example, a thickness of about 12 μm according to an embodiment. However, the thickness of the second lower layer CUSa is not limited thereto.

An opening M_OP corresponding to an area where the fingerprint sensor FOD is disposed may be defined in the shielding layer MMPa and the second lower layer CUSa. The cover layer F-CL may be disposed in the opening M_OP defined in the shielding layer MMPa and the second lower layer CUSa, and may cover the opening F_OP defined in the first lower layer CSL. In other words, the cover layer F-CL may be attached to the first lower layer CSL, and may cover the fingerprint sensor FOD. In an embodiment, the cover layer F-CL may include a first cover layer MMP-1 including the same material as that of the shielding layer MMPa, and a second cover layer CUS-1 including the same material as that of the second lower layer CUSa.

Figure 5B:
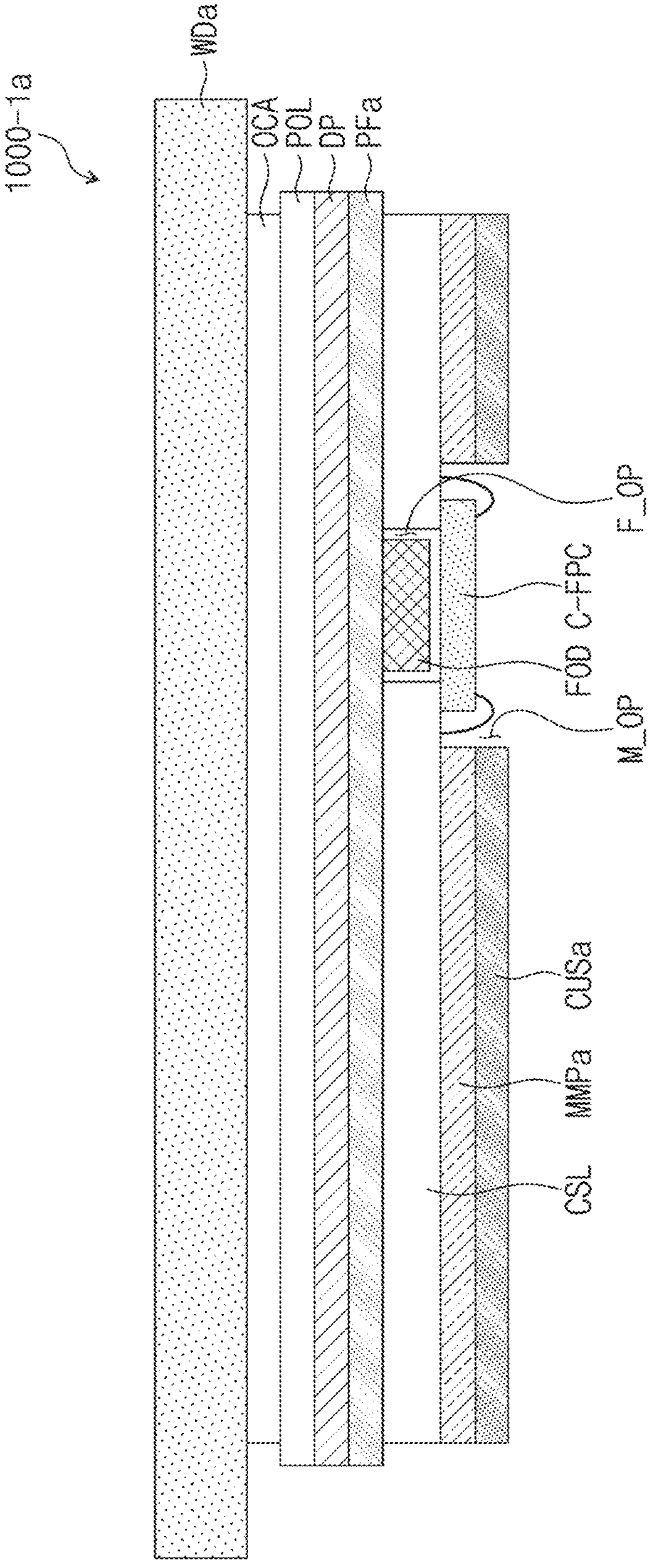
FIG. 5B is a sectional view of an electronic device according to an embodiment of the present disclosure.

FIG. 5B is a sectional view of an electronic device **1000_1*a* according to an embodiment of the present disclosure. In FIG. 5B, the components that are the same or substantially the same as the components described above with reference to FIG. 5**A are denoted with the same reference numerals, and thus, redundant description thereof may not be repeated.

Referring to FIG. 5B, the electronic device **1000-1*a* may not include the cover layer F-CL (e.g., refer to FIG. 5**A). The fingerprint sensor FOD may be covered by a sensing circuit board C-FPC that controls an operation of the fingerprint sensor FOD.

An opening M_OP corresponding to an area where the fingerprint sensor FOD is disposed may be defined in the shielding layer MMPa and the second lower layer CUSa. The sensing circuit board C-FPC may be disposed in the opening M_OP defined in the shielding layer MMPa and the second lower layer CUSa, and may cover the opening F_OP defined in the first lower layer CSL. For example, the sensing circuit board C-FPC may overlap with the fingerprint sensor FOD, and may be connected to (e.g., coupled to or attached to) the first lower layer CSL.

Figure 6:
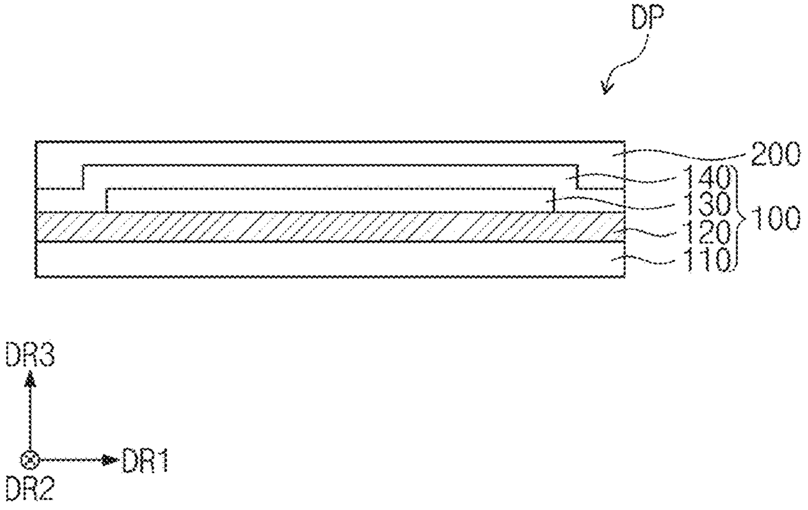
FIG. 6 is a schematic sectional view of a display panel according to an embodiment of the present disclosure.

FIG. 6 is a schematic sectional view of the display panel DP according to an embodiment of the present disclosure.

Referring to FIG. 6, the display panel DP may include the display layer 100 and the sensor layer 200.

The display layer 100 may be a component that generates or substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition, and may be selectively subjected to patterning by performing a photolithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter, such as moisture, oxygen, and dust particles.

The sensor layer 200 may be disposed on the display layer 100. The sensor layer 200 may sense an external input applied from the outside. The sensor layer 200 may be an integrated sensor that is continuously formed in a process of manufacturing the display layer 100. As another example, the sensor layer 200 may be an external sensor that is attached to the display layer 100. The sensor layer 200 may be referred to as a sensor, an input sensing layer, an input sensing panel, or an electronic device for sensing input coordinates.

According to an embodiment of the present disclosure, the sensor layer 200 may sense both an input by a passive input means, such as a part of the user's body, and an input by an input device that generates a magnetic field having a suitable resonant frequency (e.g., a certain or predetermined resonant frequency). The input device may be referred to as a pen, an input pen, a magnetic pen, a stylus pen, or an electromagnetic resonance pen.

Figure 7:
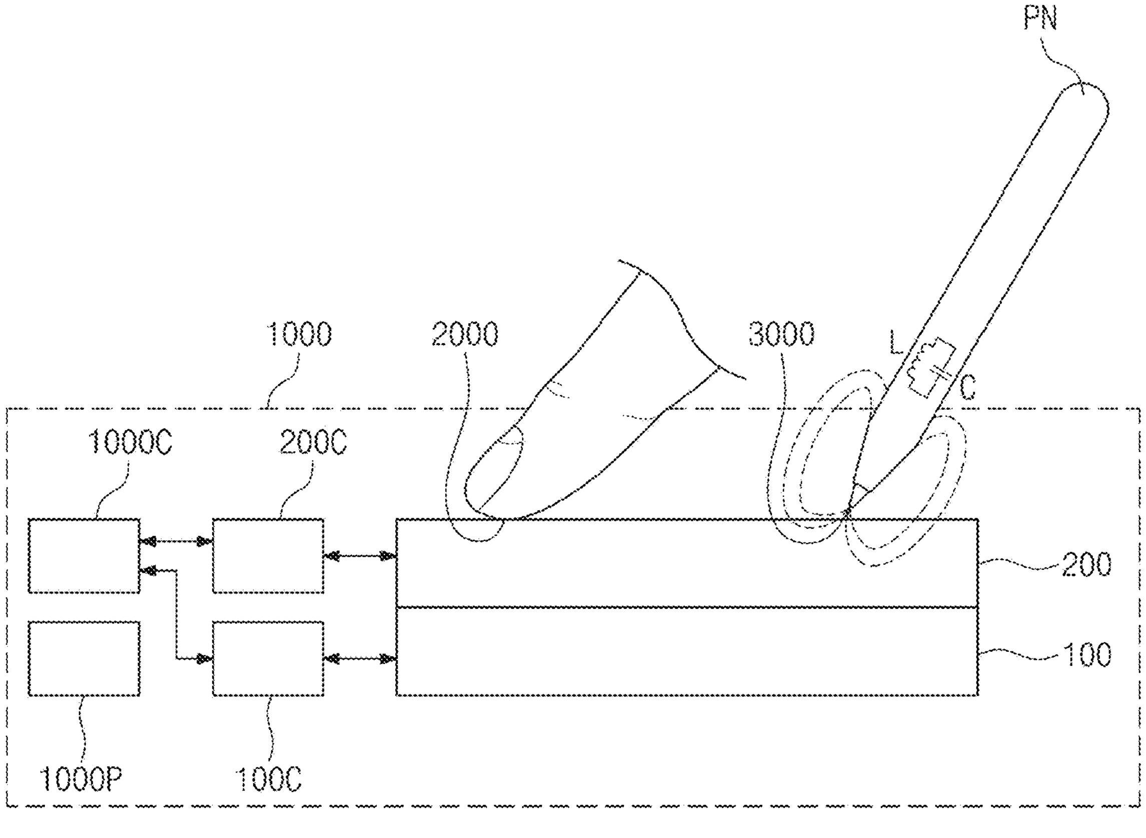
FIG. 7 is a view illustrating an operation of an electronic device according to an embodiment of the present disclosure.

FIG. 7 is a view illustrating an operation of the electronic device 1000 according to an embodiment of the present disclosure.

Referring to FIG. 7, the electronic device 1000 may include the display layer 100, the sensor layer 200, a display driver 100C, a sensor driver 200C, a main driver 1000C, and a power circuit 1000P.

The sensor layer 200 may sense a first input 2000 or a second input 3000 applied from the outside. Each of the first input 2000 and the second input 3000 may be an input capable of providing a change in a capacitance of the sensor layer 200, or an input capable of causing an induced current in the sensor layer 200. For example, the first input 2000 may be a passive kind of input, such as a part of the user's body. The second input 3000 may be an input by the pen PN, or an input by an RFIC tag. For example, the pen PN may be a pen of a passive kind or a pen of an active kind.

In an embodiment of the present disclosure, the pen PN may be a device that generates a magnetic field having a suitable resonant frequency (e.g., a certain or predetermined resonant frequency). The pen PN may transmit an output signal based on a suitable electromagnetic resonance scheme. The pen PN may be referred to as an input device, an input pen, a magnetic pen, a stylus pen, or an electromagnetic resonance pen.

The pen PN may include an RLC resonance circuit. The RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not particularly limited thereto.

The inductor L generates a current by a magnetic field formed in the sensor layer 200. However, the present disclosure is not particularly limited thereto. For example, when the pen PN operates in an active kind, the pen PN may generate a current even though a magnetic field is not provided to the pen PN from the outside. The generated current is transferred to the capacitor C. The capacitor C charges the current input from the inductor L, and discharges the charged current to the inductor L. Thereafter, the inductor L may emit a magnetic field having a resonant frequency. An induced current may flow in the sensor layer 200 by the magnetic field emitted from the pen PN. The induced current may be transferred to the sensor driver 200C as a reception signal (e.g., a sensing signal or a signal).

The main driver 1000C may control the overall operations of the electronic device 1000. For example, the main driver 1000C may control operations of the display driver 100C and the sensor driver 200C. The main driver 1000C may include at least one microprocessor, and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determination signal for determining a driving mode of the sensor driver 200C and the sensor layer 200.

The sensor driver 200C may be implemented with an integrated circuit (IC), and may be electrically connected with the sensor layer 200. For example, the sensor driver 200C may be directly mounted on a suitable area (e.g., a certain or predetermined area) of the display panel DP, or may be mounted on a separate printed circuit board using a chip on film (COF) method, and may be electrically connected with the sensor layer 200.

The sensor driver 200C and the sensor layer 200 may selectively operate in a first mode or a second mode. For example, the first mode may be a mode for sensing a touch input, for example, such as the first input 2000. The second mode may be a mode for sensing an input by the pen PN, for example, such as the second input 3000. The first mode may be referred to as a touch sensing mode, and the second mode may be referred to as a pen sensing mode.

Switching between the first mode and the second mode may be performed in various suitable ways. For example, the sensor driver 200C and the sensor layer 200 may be driven in the first mode and the second mode in a time-division manner, and may sense the first input 2000 and the second input 3000. As another example, the switching between the first mode and the second mode may be performed by the user's selection or the user's action (e.g., specific action), or by activating or deactivating an application (e.g., a specific application). One of the first mode or the second mode may be activated or deactivated, or the driving mode may be switched from one mode to the other mode. As another example, while the sensor driver 200C and the sensor layer 200 alternately operate in the first mode and the second mode, when the first input 2000 is sensed, the sensor driver 200C and the sensor layer 200 may remain in the first mode, and when the second input 3000 is sensed, the sensor driver 200C and the sensor layer 200 may remain in the second mode.

The sensor driver 200C may calculate coordinate information of an input based on a signal received from the sensor layer 200, and may provide a coordinate signal having the coordinate information to the main driver 1000C. The main driver 1000C executes an operation corresponding to a user input, based on the coordinate signal. For example, the main driver 1000C may operate the display driver 100C, such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high-voltage, a gate low-voltage, a first driving voltage (e.g., an ELVSS voltage), a second driving voltage (e.g., an ELVDD voltage), an initialization voltage, and the like, but the present disclosure is not particularly limited thereto.

Figure 8:
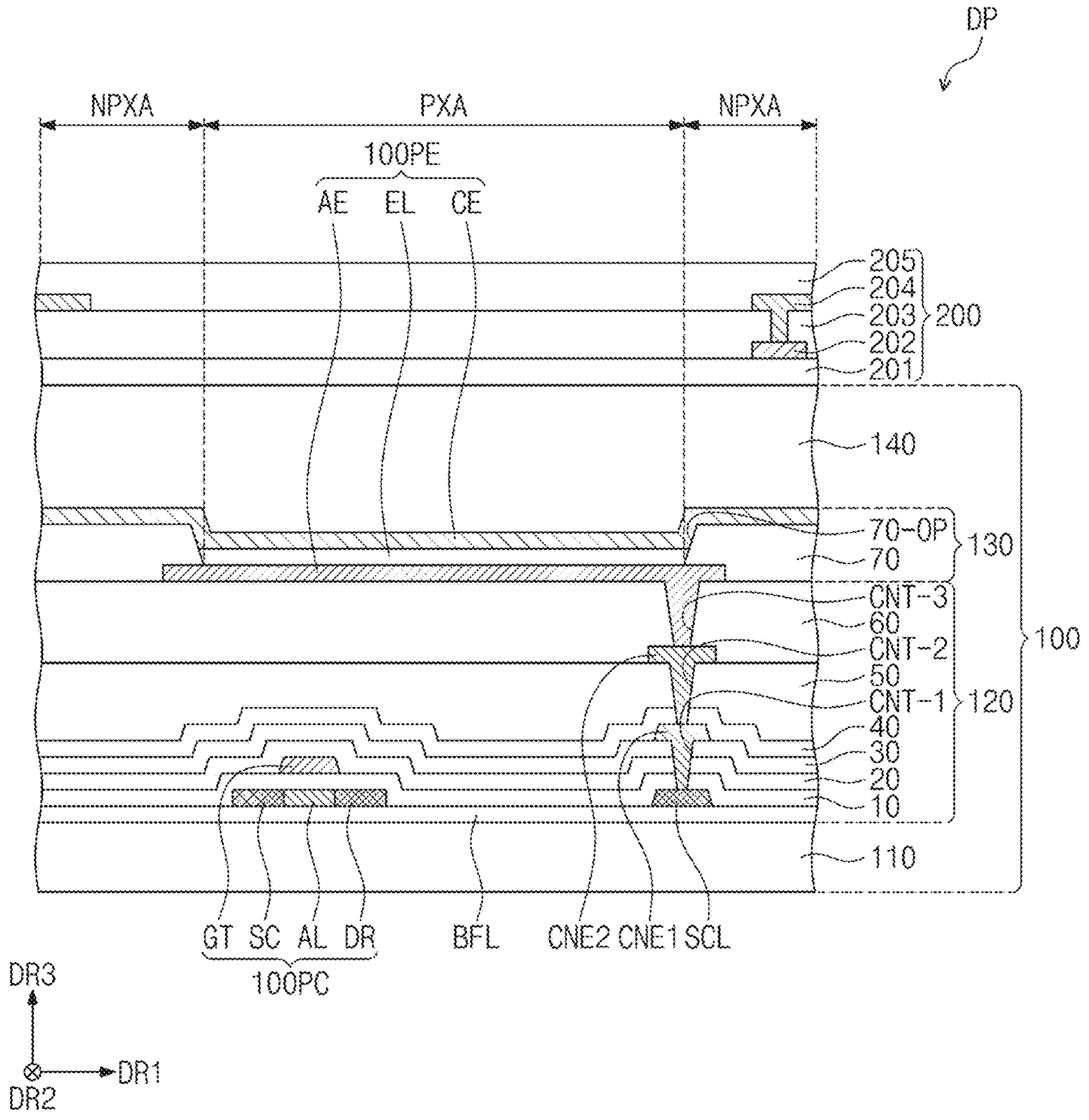
FIG. 8 is a sectional view of the display panel according to an embodiment of the present disclosure.

FIG. 8 is a sectional view of the display panel DP according to an embodiment of the present disclosure.

Referring to FIG. 8, at least one buffer layer BFL may be formed on the upper surface of the base layer 110. The buffer layer BFL may improve the coupling force between the base layer 110 and a semiconductor pattern SC, AL, DR, and SCL. The buffer layer BFL may be formed of multiple layers. As another example, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, the present disclosure is not limited thereto, and the semiconductor pattern SC, AL, DR, and SCL may include amorphous silicon, a low-temperature polycrystalline silicon, or an oxide semiconductor.

FIG. 8 illustrates a portion (e.g., one portion or only a portion) of the semiconductor pattern SC, AL, DR, and SCL, and the semiconductor pattern may be additionally disposed in other areas. The semiconductor pattern SC, AL, DR, and SCL may be arranged over the pixels according to a suitable rule (e.g., a specific or predetermined rule). The semiconductor pattern SC, AL, DR, and SCL may have different electrical properties depending on whether doping is performed or not. The semiconductor pattern SC, AL, DR, and SCL may include first areas SC, DR, and SCL having a higher conductivity, and a second area AL having a lower conductivity. The first areas SC, DR, and SCL may be doped with an N-type dopant or a P-type dopant. A P-type transistor may include a doped area that is doped with the P-type dopant, and an N-type transistor may include a doped area that is doped with the N-type dopant. The second area AL may be an un-doped area, or may be an area that is more lightly doped than the first areas SC, DR, and SCL.

The first areas SC, DR, and SCL may have a higher conductivity than that of the second area AL, and may serve or substantially serve as electrodes or signal lines. The second area AL may correspond to or substantially correspond to an active area AL (e.g., a channel area) of a transistor 100PC. In other words, one portion AL of the semiconductor pattern SC, AL, DR, and SCL may be the active area AL of the transistor 100PC, another portion SC or DR of the semiconductor pattern SC, AL, DR, and SCL may be a source area SC or a drain area DR of the transistor 100PC, and another portion SCL of the semiconductor pattern SC, AL, DR, and SCL may be a connecting electrode or a connecting signal line SCL.

Each of the pixels may have an equivalent circuit including seven transistors, one capacitor, and a light emitting element, but the present disclosure is not limited thereto, and the equivalent circuit of the pixel may be variously modified as needed or desired as would be understood by those having ordinary skill in the art. In FIG. 8, one transistor 100PC and one light emitting element 100PE included in the pixel are illustrated as representative examples.

The source area SC, the active area AL, and the drain area DR of the transistor 100PC may be formed from the semiconductor pattern SC, AL, DR, and SCL. The source area SC and the drain area DR may extend from the active area AL in opposite directions from each other on the section (e.g., in a sectional view or a cross-sectional view). In FIG. 8, a portion of the connecting signal line SCL formed from the semiconductor pattern SC, AL, DR, and SCL is illustrated. In another view, the connecting signal line SCL may be connected to the drain area DR of the transistor 100PC when viewed from above the plane (e.g., in a plan view).

A first insulating layer 10 may be disposed on the buffer layer BFL. The first insulating layer 10 may commonly overlap with the plurality of pixels, and may cover the semiconductor pattern SC, AL, DR, and SCL. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon nitride, silicon oxy nitride, zirconium oxide, or hafnium oxide. In the present embodiment, the first insulating layer 10 may be a single silicon oxide layer. Not only the first insulating layer 10, but also insulating layers of the circuit layer 120 that will be described in more detail below, may be inorganic layers and/or organic layers, and may have a single-layer structure or a multi-layered structure. The inorganic layers may include at least one of the aforementioned inorganic materials, but the present disclosure is not limited thereto.

A gate GT of the transistor 100PC is disposed on the first insulating layer 10. The gate GT may be a portion of a metal pattern. The gate GT overlaps with the active area AL. The gate GT may function as a mask in a process of doping or reducing the semiconductor pattern SC, AL, DR, and SCL.

A second insulating layer 20 may be disposed on the first insulating layer 10, and may cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of silicon oxide, silicon nitride, or silicon oxy nitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer 50, and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, for convenience of illustration, the light emitting element 100PE may be described in more detail in the context of an organic light emitting element. However, the present disclosure is not particularly limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

A pixel defining layer 70 may be disposed on the sixth insulating layer 60, and may cover a portion of the first electrode AE. The pixel defining layer 70 may have an opening 70-OP defined therein. The opening 70-OP of the pixel defining layer 70 exposes at least a portion of the first electrode AE.

The first display portion DA1-F (e.g., refer to FIG. 1A) may include an emissive area PXA, and a non-emissive area NPXA adjacent to the emissive area PXA. The non-emissive area NPXA may surround (e.g., around a periphery of) the emissive area PXA. In the present embodiment, the emissive area PXA is defined to correspond to a partial area of the first electrode AE exposed through the opening 70-OP.

The emissive layer EL may be disposed on the first electrode AE. The emissive layer EL may be disposed in an area corresponding to the opening 70-OP. In other words, the emissive layer EL may be separately formed for each of the pixels. When the emissive layer EL is separately formed for each of the pixels, the emissive layers EL may each emit at least one of a blue light, a red light, or a green light. However, the present disclosure is not limited thereto, and the emissive layer EL may be connected to the pixels to be commonly included in the pixels. In this case, the emissive layer EL may provide a blue light or a white light.

The second electrode CE may be disposed on the emissive layer EL. The second electrode CE may have a one-body shape, and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer, and may selectively further include a hole injection layer. An electron control layer may be disposed between the emissive layer EL and the second electrode CE. The electron control layer may include an electron transport layer, and may further selectively include an electron injection layer. The hole control layer and the electron control layer may be commonly formed for the plurality of pixels using an open mask or an ink-jet process.

The encapsulation layer 140 may be disposed on the light emitting element layer 130. The encapsulation layer 140 may include an inorganic layer, an organic layer, and an inorganic layer that are sequentially stacked one above another. However, the layers constituting the encapsulation layer 140 are not limited thereto. The inorganic layers may protect the light emitting element layer 130 from moisture and oxygen, and the organic layer may protect the light emitting element layer 130 from foreign matter, such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a sensor base layer 201, a first conductive layer 202, an intermediate insulation layer 203, a second conductive layer 204, and a cover insulating layer 205.

The sensor base layer 201 may be an inorganic layer including at least one of silicon nitride, silicon oxy nitride, or silicon oxide. As another example, the sensor base layer 201 may be an organic layer including an epoxy resin, an acrylic resin, or an imide-based resin. The sensor base layer 201 may have a single-layer structure, or may have a multi-layered structure stacked in the third direction DR3.

Each of the first conductive layer 202 and the second conductive layer 204 may have a single-layer structure, or may have a multi-layered structure stacked in the third direction DR3.

Each of the first conductive layer 202 and the second conductive layer 204 having the single-layer structure may include a metal layer or a transparent conductive layer. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer, such as poly(3,4-ethylenedioxythiophene) (PEDOT), a metal nano wire, or graphene.

Each of the first conductive layer 202 and the second conductive layer 204 having the multi-layered structure may include a plurality of metal layers. The meal layers may have, for example, a three-layered structure of titanium/aluminum/titanium. The conductive layer having the multi-layered structure may include at least one metal layer and at least one transparent conductive layer.

In an embodiment of the present disclosure, the thickness of the first conductive layer 202 may be greater than or equal to the thickness of the second conductive layer 204. When the thickness of the first conductive layer 202 is greater than the thickness of the second conductive layer 204, a resistance of a component included in the first conductive layer 202 may be decreased. In addition, because the first conductive layer 202 may be disposed under the second conductive layer 204, a probability that a pattern will be visually recognized by a reflection of external light may be lower than that of the second conductive layer 204, even though the thickness of first conductive layer 202 is increased.

In an embodiment of the present disclosure, the width of a first mesh line included in the first conductive layer 202 may be smaller than or equal to the width of a second mesh line included in the second conductive layer 204. Because the first mesh line may have a smaller width than that of the second mesh line, a probability that the user will visually recognize the first mesh line when looking at or viewing the electronic device 1000 (e.g., refer to FIG. 1A) may be decreased.

At least one of the intermediate insulation layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the intermediate insulation layer 203 or the cover insulating layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

While the sensor layer 200 has been illustrated as including the first conductive layer 202 and the second conductive layer 204, or in other words, a total of two conductive layers, the present disclosure is not particularly limited thereto. For example, the sensor layer 200 may include three or more conductive layers.

Figure 9:
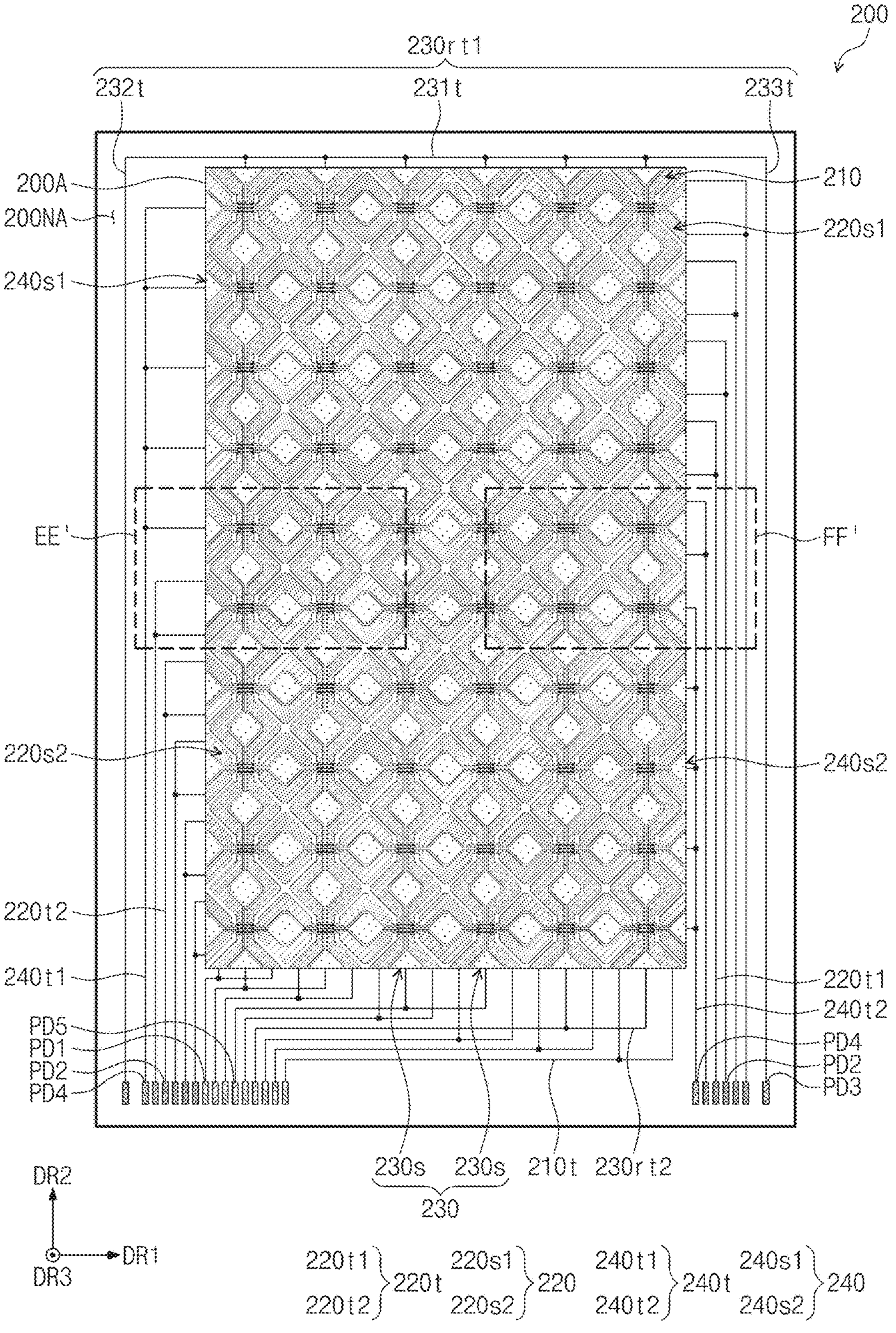
FIG. 9 is a plan view of a sensor layer according to an embodiment of the present disclosure.
Figure 10:
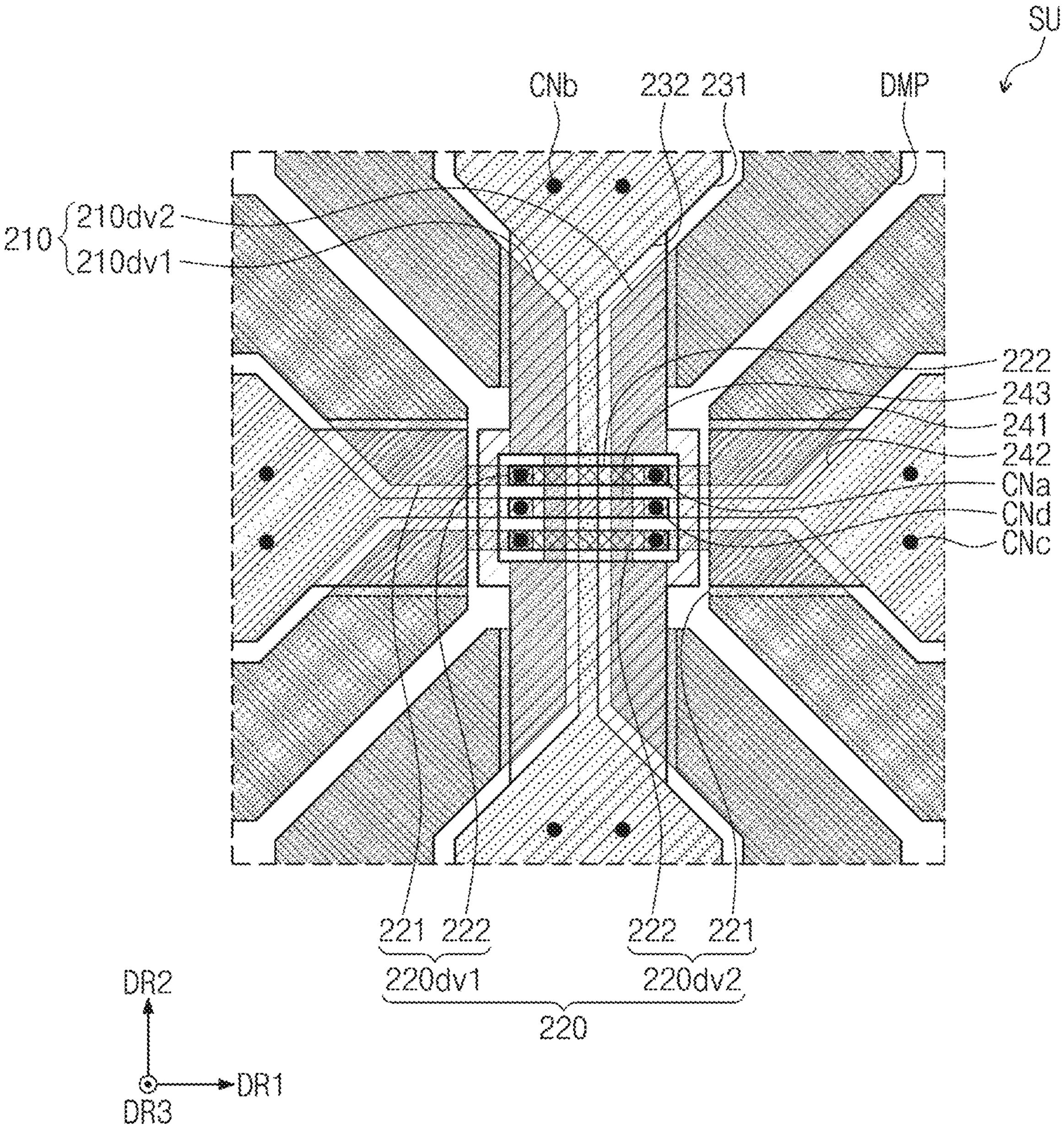
FIG. 10 is an enlarged plan view illustrating one sensing unit according to an embodiment of the present disclosure.
Figure 11A:
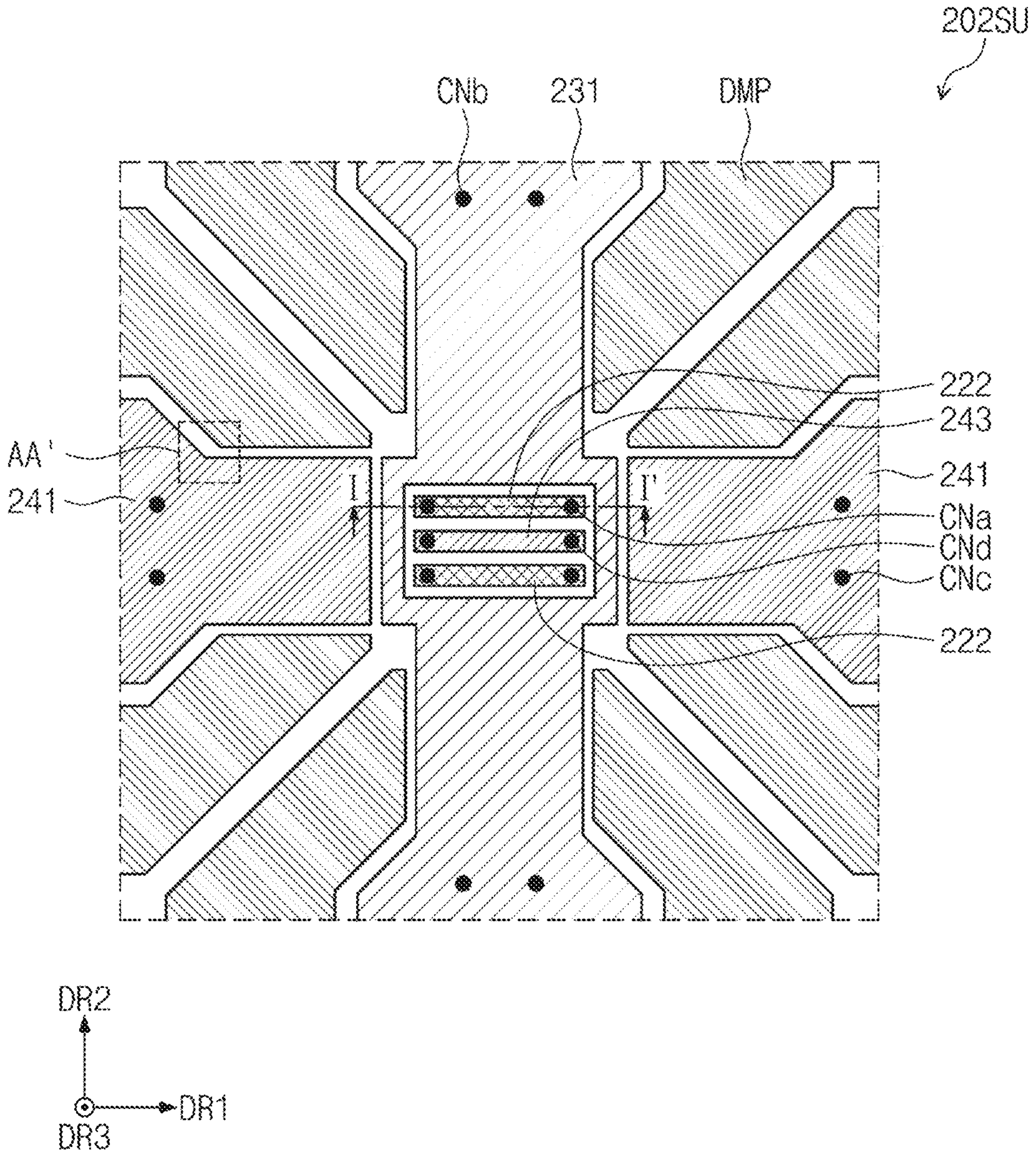
FIG. 11A is a plan view illustrating a first conductive layer of the sensing unit according to an embodiment of the present disclosure.
Figure 11B:
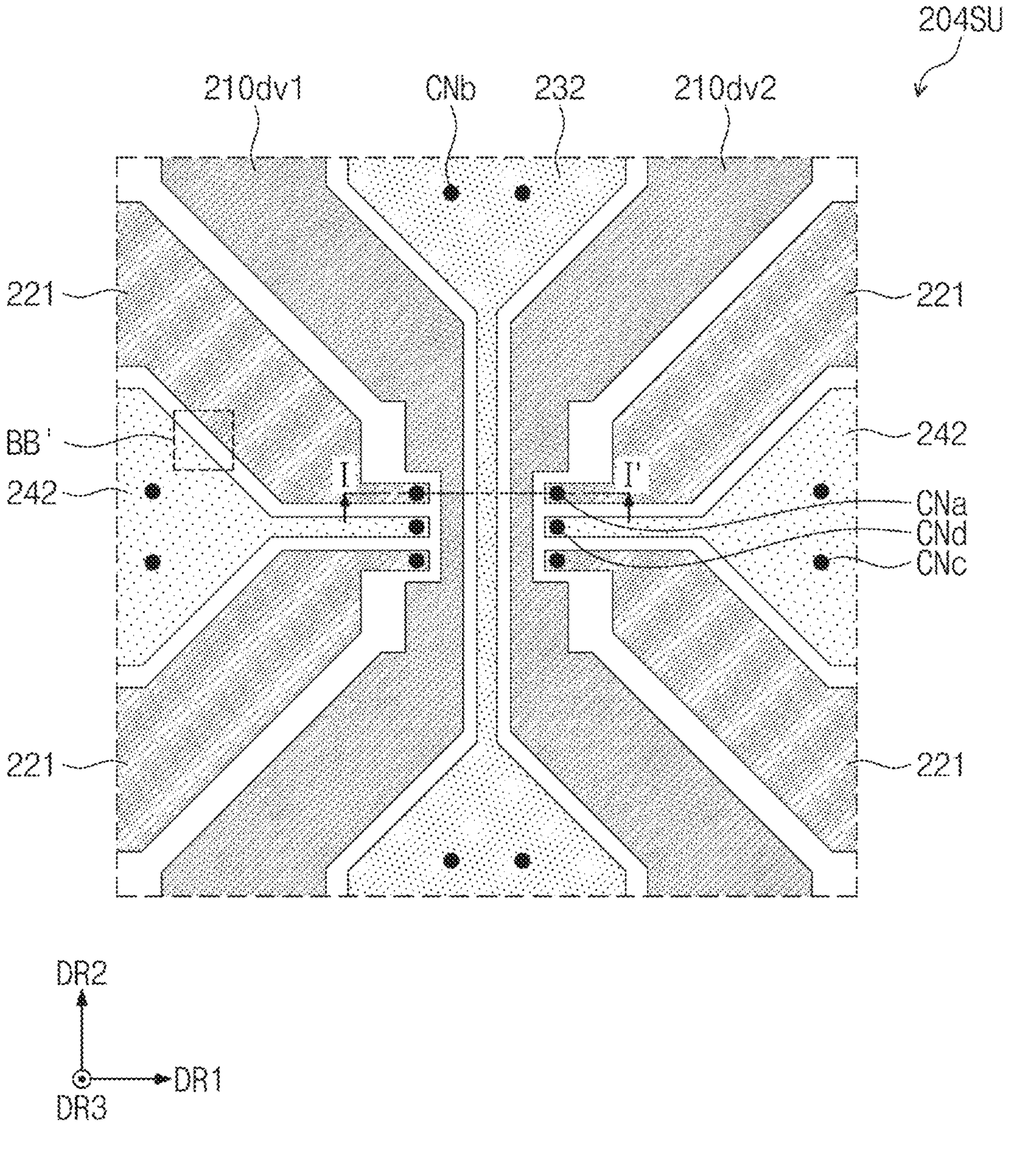
FIG. 11B is a plan view illustrating a second conductive layer of the sensing unit according to an embodiment of the present disclosure.
Figure 12:
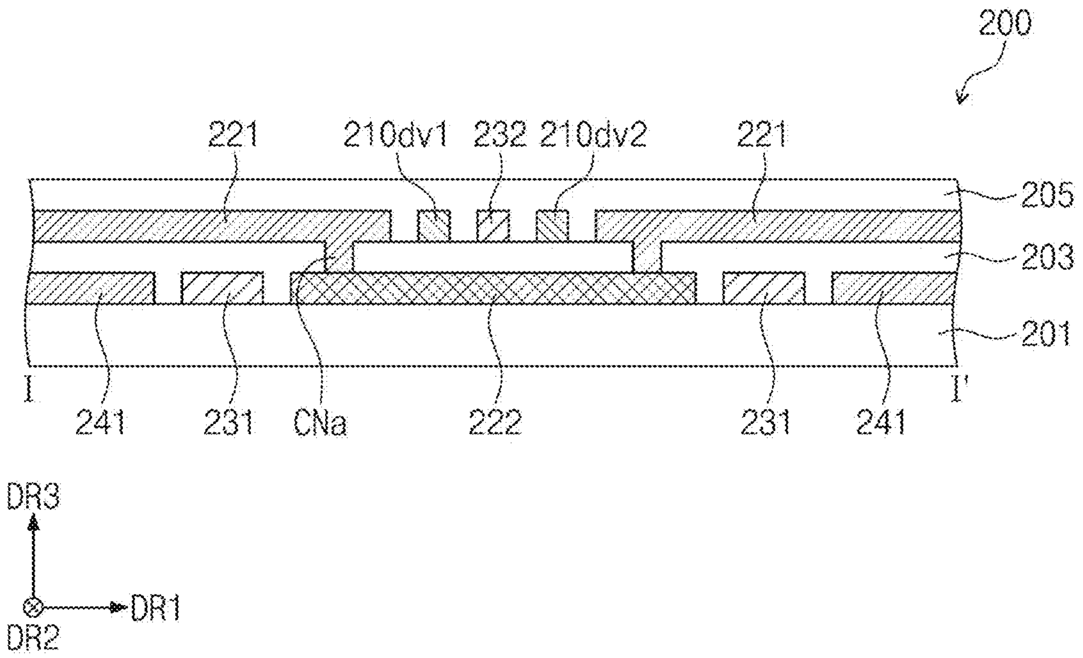
FIG. 12 is a sectional view of the sensor layer taken along the line I-I' illustrated in FIGS. 11A and 11B according to an embodiment of the present disclosure.

FIG. 9 is a plan view of the sensor layer 200 according to an embodiment of the present disclosure. FIG. 10 is an enlarged plan view illustrating one sensing unit SU according to an embodiment of the present disclosure. FIG. 11A is a plan view illustrating a first conductive layer 202SU of the sensing unit SU according to an embodiment of the present disclosure. FIG. 11B is a plan view illustrating a second conductive layer 204SU of the sensing unit SU according to an embodiment of the present disclosure. FIG. 12 is a sectional view of the sensor layer 200 taken along the line I-I' illustrated in FIGS. 11A and 11B according to an embodiment of the present disclosure.

Referring to FIG. 9, a sensing area 200A and a peripheral area 200NA adjacent to the sensing area 200A may be defined in the sensor layer 200.

The sensor layer 200 may include a plurality of first electrodes 210, a plurality of second electrodes 220, a plurality of third electrodes 230, and a plurality of fourth electrodes 240 disposed in the sensing area 200A.

Each of the first electrodes 210 may cross the second electrodes 220. Each of the first electrodes 210 may extend in the second direction DR2. The first electrodes 210 may be arranged along the first direction DR1 so as to be spaced apart from one another. Each of the second electrodes 220 may extend in the first direction DR1. The second electrodes 220 may be arranged along the second direction DR2 so as to be spaced apart from one another. The sensing unit SU of the sensor layer 200 may be an area (e.g., a sensing area) where one first electrode 210 and one second electrode 220 cross each other.

In FIG. 9, six first electrodes 210 and ten second electrodes 220 are illustrated as an example, and sixty sensing units SU are illustrated as an example. However, the number of first electrodes 210 and the number of second electrodes 220 are not limited thereto.

Referring to FIGS. 9 and 10, each of the first electrodes 210 may include first divided electrodes 210*dv*1 and 210*dv*2. The first divided electrodes 210*dv*1 and 210*dv*2 may extend in the second direction DR2, and may be spaced apart from each other in the first direction DR1. The first divided electrodes 210*dv*1 and 210*dv*2 may have shapes having a line symmetry with each other with respect to a line extending in the second direction DR2.

Each of the second electrodes 220 may include second divided electrodes 220*dv*1 and 220*dv*2. The second divided electrodes 220*dv*1 and 220*dv*2 may extend in the first direction DR1, and may be spaced apart from each other in the second direction DR2. The second divided electrodes 220*dv*1 and 220*dv*2 may have shapes having a line symmetry with each other with respect to a line extending in the first direction DR1.

Referring to FIGS. 10, 11A, 11B, and 12, each of the second divided electrodes 220*dv*1 and 220*dv*2 may include a sensing pattern 221 and a bridge pattern 222. The sensing pattern 221 and the bridge pattern 222 may be disposed at (e.g., in or on) different layers from each other. The sensing pattern 221 and the bridge pattern 222 may be electrically connected with each other through a first contact hole CNa. For example, the bridge pattern 222 may be included in the first conductive layer 202SU, and the sensing pattern 221 and the first divided electrodes 210*dv*1 and 210*dv*2 may be included in the second conductive layer 204SU. The first conductive layer 202SU may be included in the first conductive layer 202 described above with reference to FIG. 8, and the second conductive layer 204SU may be included in the second conductive layer 204 described above with reference to FIG. 8.

Each of the third electrodes 230 may extend in the second direction DR2. The third electrodes 230 may be arranged along the first direction DR1 so as to be spaced apart from one another. In an embodiment of the present disclosure, each of the third electrodes 230 may include a plurality of first auxiliary electrodes 230*s* connected in parallel with each other. Although FIG. 9 illustrates an example in which one third electrode 230 includes two first auxiliary electrodes 230*s*, the present disclosure is not particularly limited thereto. The number of first auxiliary electrodes 230*s* included in each of the third electrodes 230 may be variously modified as needed or desired. For example, as the number of first auxiliary electrodes 230*s* included in each of the third electrodes 230 is increased, the resistance of each of the third electrodes 230 may be lowered, and thus, a power efficiency and a sensing sensitivity may be improved. On the other hand, as the number of first auxiliary electrodes 230*s* included in each of the third electrodes 230 is decreased, a loop coil pattern formed using the third electrodes 230 may be implemented in more various desired forms.

The first auxiliary electrodes 230*s* may be disposed to correspond to the first electrodes 210 in a one-to-one manner. Accordingly, one sensing unit SU may include a portion of one first auxiliary electrode 230*s*. A coupling capacitor may be defined between one first electrode 210 and one first auxiliary electrode 230*s*. In this case, an induced current generated when the pen is sensed may be transferred from the first auxiliary electrode 230*s* to the first electrode 210 through the coupling capacitor. In other words, the first auxiliary electrode 230*s* may serve to supplement a signal transferred from the first electrode 210 to the sensor driver 200C. Accordingly, a greatest effect may be obtained when the phase of a signal induced in the first auxiliary electrode 230*s* coincides with the phase of a signal induced in the first electrode 210.

The centers of the first electrodes 210 in the second direction DR2 may overlap with the centers of the first auxiliary electrodes 230*s* in the second direction DR2. In addition, the centers of the first electrodes 210 in the first direction DR1 may overlap with the centers of the first auxiliary electrodes 230*s* in the first direction DR1.

In an embodiment of the present disclosure, because one third electrode 230 includes two first auxiliary electrodes 230*s*, the one third electrode 230 may correspond to (e.g., may overlap with) two first electrodes 210. Accordingly, the number of first electrodes 210 included in the sensor layer 200 may be greater than the number of third electrodes 230. For example, the number of first electrodes 210 may be equal to a product of the number of third electrodes 230 included in the sensor layer 200 and the number of first auxiliary electrodes 230*s* included in each of the third electrodes 230. In FIG. 9, the number of first electrodes 210 may be six, the number of third electrodes 230 may be three, and the number of first auxiliary electrodes 230*s* included in each of the third electrodes 230 may be two. However, the present disclosure is not limited thereto.

The fourth electrodes 240 may be arranged along the second direction DR2. The fourth electrodes 240 may extend in the first direction DR1. In an embodiment of the present disclosure, each of the fourth electrodes 240 may include second auxiliary electrodes 240*s*1 or 240*s*2 connected in parallel with each other. The second auxiliary electrodes 240*s*1 or 240*s*2 may include second-first auxiliary electrodes 240*s*1 and second-second auxiliary electrodes 240*s*2. In FIG. 9, two fourth electrodes 240 are illustrated as an example. One of the two fourth electrodes 240 includes five second-first auxiliary electrodes 240*s*1 connected in parallel with each other, and the other one of the two fourth electrodes 240 includes five second-second auxiliary electrodes 240*s*2 connected in parallel with each other. However, the present disclosure is not limited thereto.

In an embodiment of the present disclosure, the sensor layer 200 may include one fourth electrode. In this case, the fourth electrode 240 may include ten second auxiliary electrodes connected in parallel with each other. However, the present disclosure is not limited thereto, and the number of second auxiliary electrodes included in the fourth electrode may be variously modified as needed or desired.

FIG. 9 illustrates an example in which five second-first auxiliary electrodes 240*s*1 are electrically connected together, and five second-second auxiliary electrodes 240*s*2 are electrically connected together. In other words, a ratio between the areas of the two fourth electrodes 240, or a ratio between the number of the second-first auxiliary electrodes 240*s*1 included in each of the two fourth electrodes 240 and the number of the second-second auxiliary electrodes 240*s*2 included in each of the two fourth electrodes 240, may be 1:1. However, the present disclosure is not particularly limited thereto. For example, the number of the second-first auxiliary electrodes 240*s*1 and the number of the second-second auxiliary electrodes 240*s*2 may be different from each other.

In an embodiment of the present disclosure, when each of the fourth electrodes 240 includes the second auxiliary electrodes 240*s*1 or 240*s*2 connected in parallel with each other, an effect of increasing the area of one fourth electrode 240 may be obtained. In addition, a resistance of each of the fourth electrodes 240 may be lowered, and thus, the sensing sensitivity for the second input 3000 (e.g., refer to FIG. 7) may be improved.

A coupling capacitor may be defined between one second electrode 220 and one second auxiliary electrode 240*s*1 or 240*s*2. In this case, an induced current generated when the pen is sensed may be transferred from the second auxiliary electrode 240*s*1 or 240*s*2 to the second electrode 220 through the coupling capacitor. In other words, the second auxiliary electrode 240*s*1 or 240*s*2 may serve to supplement a signal transferred from the second electrode 220 to the sensor driver 200C. Accordingly, a greatest effect may be obtained when the phase of a signal induced in the second auxiliary electrode 240*s*1 or 240*s*2 coincides with the phase of a signal induced in the second electrode 220. Thus, the center of each of the second electrodes 220 in the first direction DR1 may overlap with the center of the corresponding second auxiliary electrode 240*s*1 or 240*s*2 in the first direction DR1. In addition, the center of each of the second electrodes 220 in the second direction DR2 may overlap the center of the corresponding second auxiliary electrode 240*s*1 or 240*s*2 in the second direction DR2.

Referring to FIGS. 9, 11A, and 11B, each of the first auxiliary electrodes 230*s* included in the third electrode 230 may include a third-first pattern 231 and a third-second pattern 232. The third-first pattern 231 and the third-second pattern 232 may be disposed at (e.g., in or on) different layers from each other. The third-first pattern 231 and the third-second pattern 232 may be electrically connected with each other through a second contact CNb. The third-first pattern 231 may be included in the first conductive layer 202SU, and the third-second pattern 232 may be included in the second conductive layer 204SU.

In an embodiment of the present disclosure, a portion of the third-first pattern 231 may overlap with a portion of each of the first divided electrodes 210*dv*1 and 210*dv*2. Accordingly, a coupling capacitance may be provided (e.g., may be formed) between the first electrode 210 and the third electrode 230.

Referring to FIGS. 9, 11A, and 11B, each of the second auxiliary electrodes 240*s*1 or 240*s*2 included in the fourth electrode 240 includes a plurality of auxiliary patterns, and an auxiliary bridge pattern 243 (e.g., a fourth-third pattern) electrically connecting the plurality of auxiliary patterns to each other. Each of the plurality of auxiliary patterns may include a first auxiliary pattern 241 (e.g., a fourth-first pattern) and a second auxiliary pattern 242 (e.g., a fourth-second pattern).

The first auxiliary pattern 241 and the auxiliary bridge pattern 243 may be disposed at (e.g., in or on) the same layer as each other. The second auxiliary pattern 242 may be disposed on a layer different from the layer on which the first auxiliary pattern 241 and the auxiliary bridge pattern 243 are disposed. The first auxiliary pattern 241 and the second auxiliary pattern 242 may be electrically connected with each other through a third contact CNc. The second auxiliary pattern 242 and the auxiliary bridge pattern 243 may be electrically connected with each other through a fourth contact CNd. The first auxiliary pattern 241 and the auxiliary bridge pattern 243 may be included in the first conductive layer 202SU, and the second auxiliary pattern 242 may be included in the second conductive layer 204SU.

In an embodiment of the present disclosure, a portion of the first auxiliary pattern 241 may overlap with the sensing pattern 221 of each of the second divided electrodes 220*dv*1 and 220*dv*2. Accordingly, a coupling capacitor may be defined (e.g., may be provided or formed) between the second electrode 220 and the fourth electrode 240.

In an embodiment of the present disclosure, the first conductive layer 202SU may further include dummy patterns DMP. Each of the dummy patterns DMP may be electrically floated or electrically grounded. In an embodiment of the present disclosure, the dummy patterns DMP may be omitted as needed or desired. Because the dummy patterns DMP may be disposed in empty spaces, a probability that specific patterns will be visually recognized due to a reflection of external light may be reduced. In other words, the electronic device 1000 (e.g., refer to FIG. 1A) in which a visibility depending on a reflection of external light is improved may be provided.

The sensor layer 200 may further include a plurality of first trace lines 210*t* disposed in the peripheral area 200NA, a plurality of first pads PD1 connected to the first trace lines 210*t* in a one-to-one correspondence, a plurality of second trace lines 220*t*, and a plurality of second pads PD2 connected to the second trace lines 220*t* in a one-to-one correspondence.

The first trace lines 210*t* may be electrically connected to the first electrodes 210 in a one-to-one correspondence. Two first divided electrodes 210*dv*1 and 210*dv*2 included in one first electrode 210 may be connected to one first trace line from among the first trace lines 210*t*. Each of the first trace lines 210*t* may include two first branch portions for connection to the corresponding two first divided electrodes 210*dv*1 and 210*dv*2. In an embodiment of the present disclosure, the two first divided electrodes 210*dv*1 and 210*dv*2 may be connected with each other in the sensing area 200A.

The second trace lines 220*t* may be electrically connected to the second electrodes 220 in a one-to-one correspondence. Two second divided electrodes 220*dv*1 and 220*dv*2 included in one second electrode 220 may be connected to one second trace line from among the second trace lines 220*t*. Each of the second trace lines 220*t* may include two second branch portions for connection to the corresponding two second divided electrodes 220*dv*1 and 220*dv*2. In an embodiment of the present disclosure, the two second divided electrodes 210*dv*1 and 210*dv*2 may be connected with each other in the sensing area 200A.

The second trace lines 220*t* may include second-first trace lines 220*t*1 and second-second trace lines 220*t*2. The second-first trace lines 220*t*1 are connected to second-first electrodes 220*s*1 from among the second electrodes 220, and the second-second trace lines 220*t*2 are connected to second-second electrodes 220*s*2 from among the second electrodes 220. A routing direction of the second-first electrodes 220*s*1 may be different from a routing direction of the second-second electrodes 220*s*2.

As used herein, when the routing directions are different from each other, the positions of connection portions where electrodes and trace lines are connected to each other are different from each other. For example, the position of a first connection portion where the second-first electrodes 220*s*1 and the second-first trace lines 220*t*1 are connected to each other may be different from the position of a second connection portion where the second-second electrodes 220*s*2 and the second-second trace lines 220*t*2 are connected to each other. The first connection portion may be located at first ends of the second-first electrodes 220*s*1 that are located on a first side (e.g., the right side) of the sensing area 200A, and the second connection portion may be located at second ends of the second-second electrodes 220*s*2 that are located on a second side (e.g., the left side) of the sensing area 200A that is opposite to (e.g., that faces away from) the first side.

The sensor layer 200 may further include a third trace line 230*rt*1 disposed in the peripheral area 200NA, a plurality of third pads PD3 connected to one end and an opposite end of the third trace line 230*rt*1, fourth trace lines 240*t*, and fourth pads PD4 connected to the fourth trace lines 240*t* in a one-to-one correspondence.

The third trace line 230*rt*1 may be electrically connected with at least one first auxiliary electrode 230*s* from among the first auxiliary electrodes 230*s*. In an embodiment of the present disclosure, the third trace line 230*rt*1 may be electrically connected with all of the first auxiliary electrodes 230*s*. In other words, the third trace line 230*rt*1 may be electrically connected to all of the third electrodes 230. The third trace line 230*rt*1 may include a first line portion 231*t* that extends in the first direction DR1 and is electrically connected to the third electrodes 230, a second line portion 232*t* extending from a first end of the first line portion 231*t* in the second direction DR2, and a third line portion 233*t* extending from a second end of the first line portion 231*t* in the second direction DR2.

In an embodiment of the present disclosure, each of a resistance of the second line portion 232*t* and a resistance of the third line portion 233*t* may be the same or substantially the same as a resistance of one third electrode from among the third electrodes 230. Accordingly, the second line portion 232*t* and the third line portion 233*t* may serve as another one of the third electrodes 230, and the same or substantially the same effect as that of disposing the third electrodes 230 in the peripheral area 200NA may be obtained. For example, one of the second line portion 232*t* or the third line portion 233*t* and one of the third electrodes 230 may form a coil. Accordingly, the pen located in an area adjacent to the peripheral area 200NA may also be sufficiently charged by a loop including the second line portion 232*t* or the third line portion 233*t*.

In an embodiment of the present disclosure, to adjust the resistance of the second line portion 232*t* and the resistance of the third line portion 233*t*, the widths of the second line portion 232*t* and the third line portion 233*t* in the first direction DR1 may be variously adjusted. However, the present disclosure is not limited thereto, and in some embodiments, the first to third line portions 231*t*, 232*t*, and 233*t* may have the same or substantially the same width as each other.

The fourth trace lines 240*t* include fourth-first trace lines 240*t*1 and fourth-second trace lines 240*t*2. The fourth-first trace lines 240*t*1 are connected to the second-first auxiliary electrodes 240*s*1 from among the fourth electrodes 240, and the fourth-second trace lines 24012 are connected to the second-second auxiliary electrodes 240*s*2 from among the fourth electrodes 240. A routing direction of the second-first auxiliary electrodes 240*s*1 may be different from a routing direction of the second-second auxiliary electrodes 240*s*2.

The position of a third connection portion where the second-first auxiliary electrode 240*s*1 and the fourth-first trace line 240*t*1 are connected to each other may be different from the position of a fourth connection portion where the second-second auxiliary electrode 240*s*2 and the fourth-second trace line 240*t*2 are connected to each other. The third connection portion may be located at a second end of the second-first auxiliary electrode 240*s*1 that is located on the second side (e.g., the left side) of the sensing area 200A, and the fourth connection portion may be located at a first end of the second-second auxiliary electrode 240*s*2 that is located on the first side (e.g., the right side) of the sensing area 200A.

The sensor layer 200 may further include fifth trace lines 230*rt*2 disposed in the peripheral area 200NA, and fifth pads PD5 connected to the fifth trace lines 230*rt*2 in a one-to-one correspondence. The fifth trace lines 230*rt*2 may be connected to the third electrodes 230 in a one-to-one correspondence. In other words, the number of fifth trace lines 230*rt*2 may correspond to the number of third electrodes 230. In FIG. 9, three fifth trace lines 230*rt*2 are illustrated as an example.

In an embodiment of the present disclosure, the fifth trace lines 230*t*2 and the fifth pads PD5 may be omitted as needed or desired, and a charging driving mode for charging the pen may be omitted. In this case, the sensor layer 200 may sense an input by an active pen capable of emitting a magnetic field, even though a magnetic field is not provided from the sensor layer 200.

Referring to FIGS. 11A and 11B, in the second conductive layer 204SU in one sensing unit SU, the area occupied by the components included in the first electrode 210 and the second electrode 220 may be larger than the area occupied by the components included in the third electrode 230 and the fourth electrode 240. A change in a capacitance by the first input 2000 (e.g., refer to FIG. 4) may be increased as the distance is decreased. Accordingly, a component for sensing the first input 2000 (e.g., refer to FIG. 4) may be disposed in a relatively larger area in a layer adjacent to the surface of the electronic device 1000 (e.g., refer to FIG. 1A). Thus, a touch performance may be improved.

Although FIGS. 6 to 9 illustrate a structure in which the first to fourth electrodes 210, 220, 230, and 240 are distributed and arranged in the two conductive layers 202SU and 204SU, the present disclosure is not particularly limited thereto. For example, the first to fourth electrodes 210, 220, 230, and 240 may be distributed and arranged in three conductive layers or four conductive layers.

In an embodiment of the present disclosure, the third electrode 230 to which a signal is applied in the charging driving mode may be included in a third conductive layer disposed under the first and second conductive layers 202SU and 204SU. For example, the third conductive layer may be provided under the sensor base layer 201. The third conductive layer may be disposed between the sensor base layer 201 and the display layer 100, may be disposed under the display layer 100, or may be included in the display layer 100.

The first, second, and fourth electrodes 210, 220, and 240 may be included in the first and second conductive layers 202SU and 204SU. For example, when the third electrode 230 is implemented as a separate conductive layer, such as the third conductive layer, the shape of the third electrode 230 may be more freely designed. For example, the third electrode 230 may be provided in a suitable form including a plurality of coils. In addition, the third electrode 230 may be provided more densely by using the third conductive layer. In this case, a pen sensing sensitivity may be improved. In an embodiment of the present disclosure, the fourth electrode 240 may be included in the third conductive layer instead of the third electrode 230.

Figure 13A:
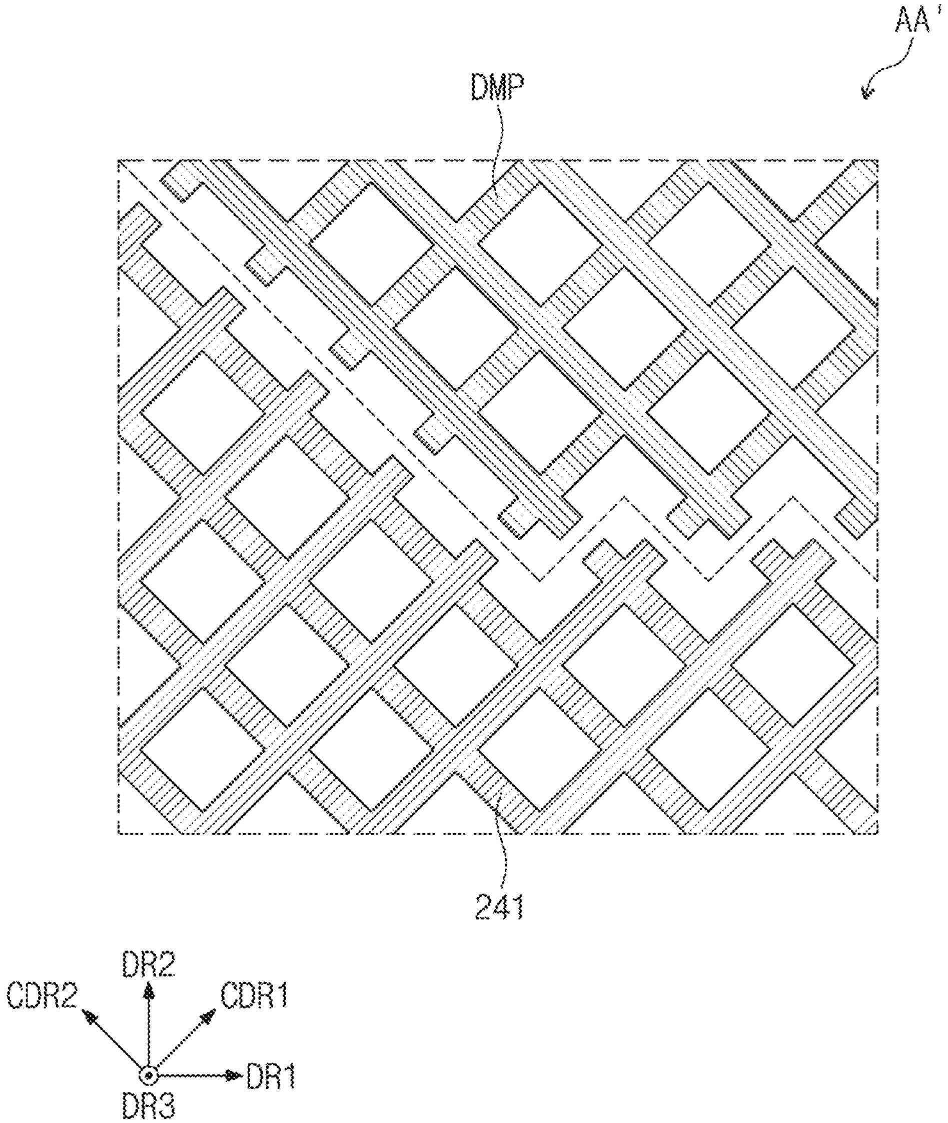
FIG. 13A is an enlarged plan view of the area AA' illustrated in FIG. 11A.
Figure 13B:
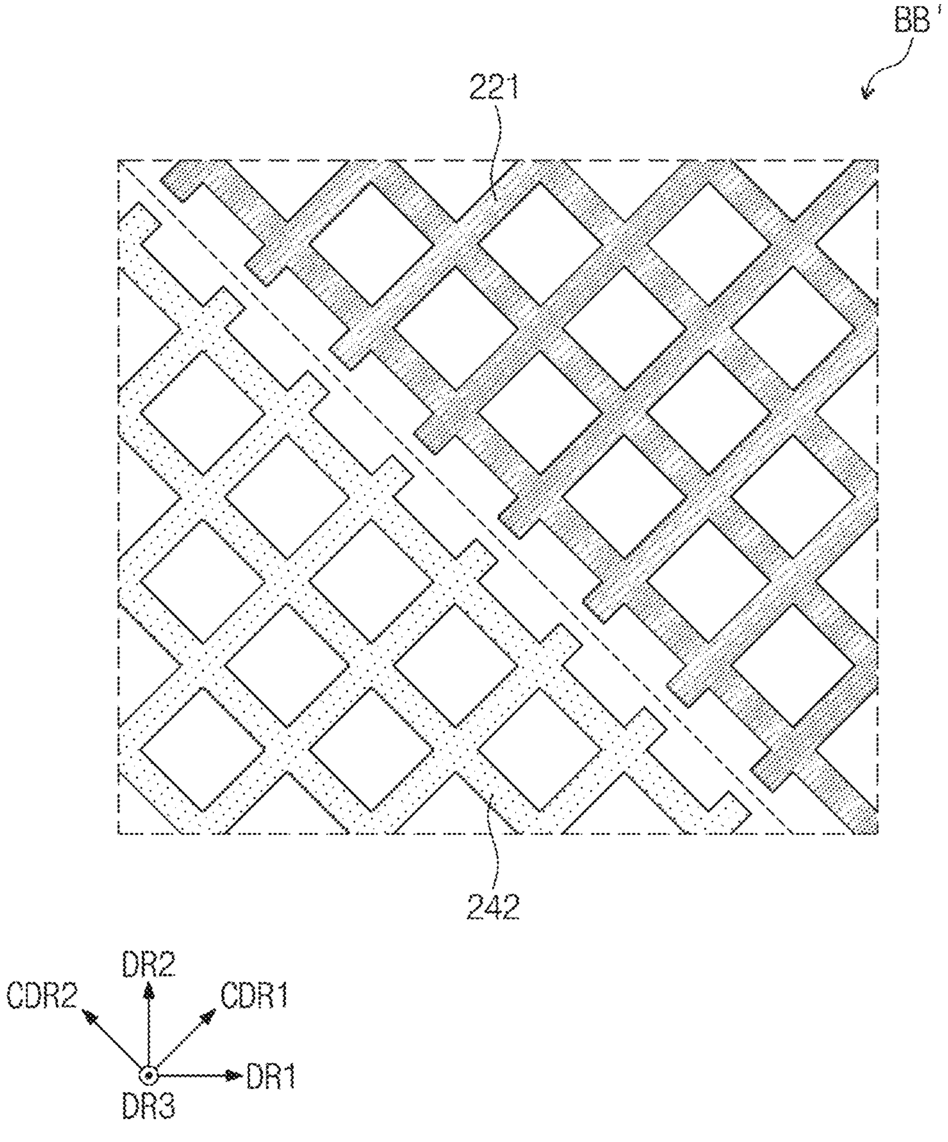
FIG. 13B is an enlarged plan view of the area BB' illustrated in FIG. 11B.

FIG. 13A is an enlarged plan view of the area AA' illustrated in FIG. 11A. FIG. 13B is an enlarged plan view of the area BB' illustrated in FIG. 11B. Referring to FIGS. 11A, 11B, 13A, and 13B, the first electrodes 210, the second electrodes 220, the third electrodes 230, the fourth electrodes 240, and the dummy patterns DMP may each have a mesh structure. The mesh structure may include a plurality of mesh lines. The plurality of mesh lines may have straight-line shapes extending in suitable directions (e.g., certain or predetermined directions), and may be connected with one another. Openings where the mesh structure is not disposed may be defined (e.g., may be provided or formed) in each of the first electrodes 210, the second electrodes 220, the third electrodes 230, the fourth electrodes 240, and the dummy patterns DMP.

FIGS. 13A and 13B illustrate an example in which the mesh structure includes mesh lines extending in a first crossing direction CDR1 that crosses the first direction DR1 and the second direction DR2, and mesh lines extending in a second crossing direction CDR2 that crosses the first crossing direction CDR1. However, the extension directions of the mesh lines constituting the mesh structure are not particularly limited to those illustrated in FIGS. 13A and 13B. For example, the mesh structure may include mesh lines (e.g., only mesh lines) extending in the first direction DR1 and the second direction DR2, or may include mesh lines extending in the first direction DR1, the second direction DR2, the first crossing direction CDR1, and the second crossing direction CDR2. In other words, the mesh structure may be modified in various suitable forms as needed or desired.

Figure 14:
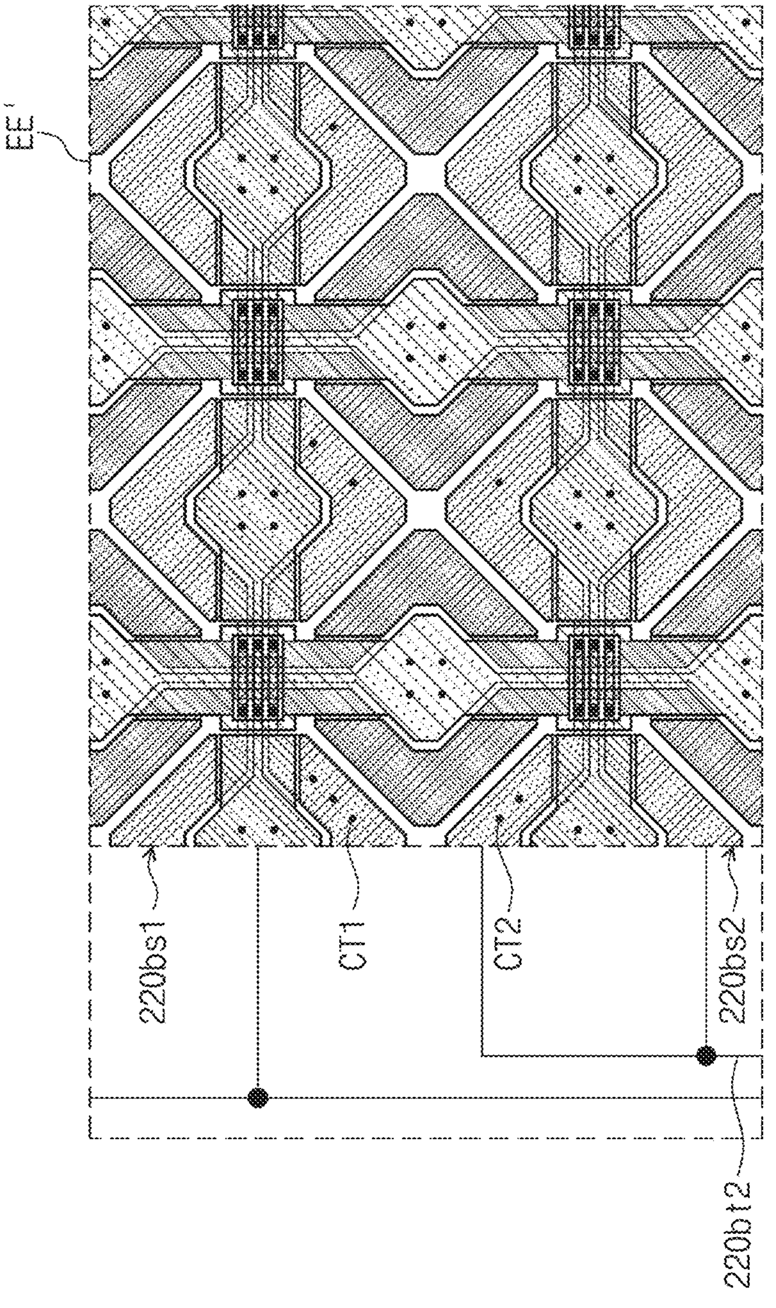
FIG. 14 is an enlarged plan view of the area EE' illustrated in FIG. 9.
Figure 15A:
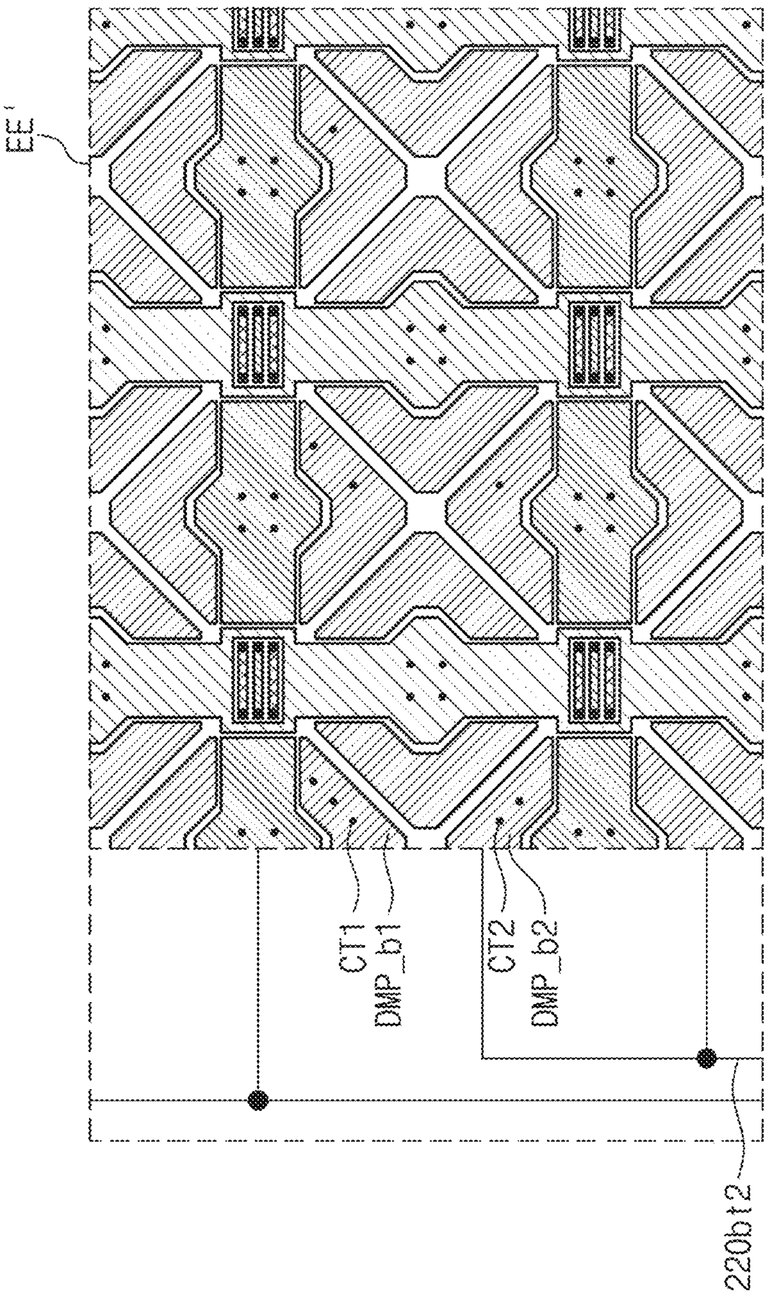
FIG. 15A is a plan view illustrating the first conductive layer of the area EE' according to an embodiment of the present disclosure.
Figure 15B:
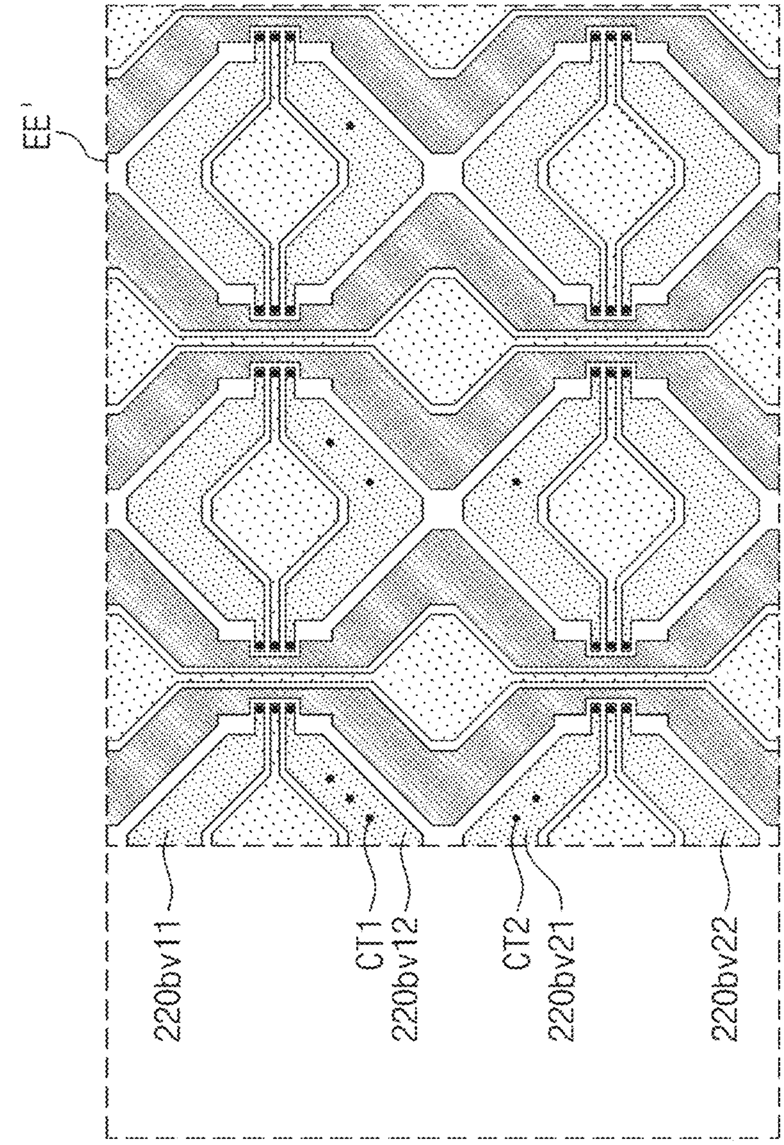
FIG. 15B is a plan view illustrating the second conductive layer of the area EE' according to an embodiment of the present disclosure.
Figure 16:
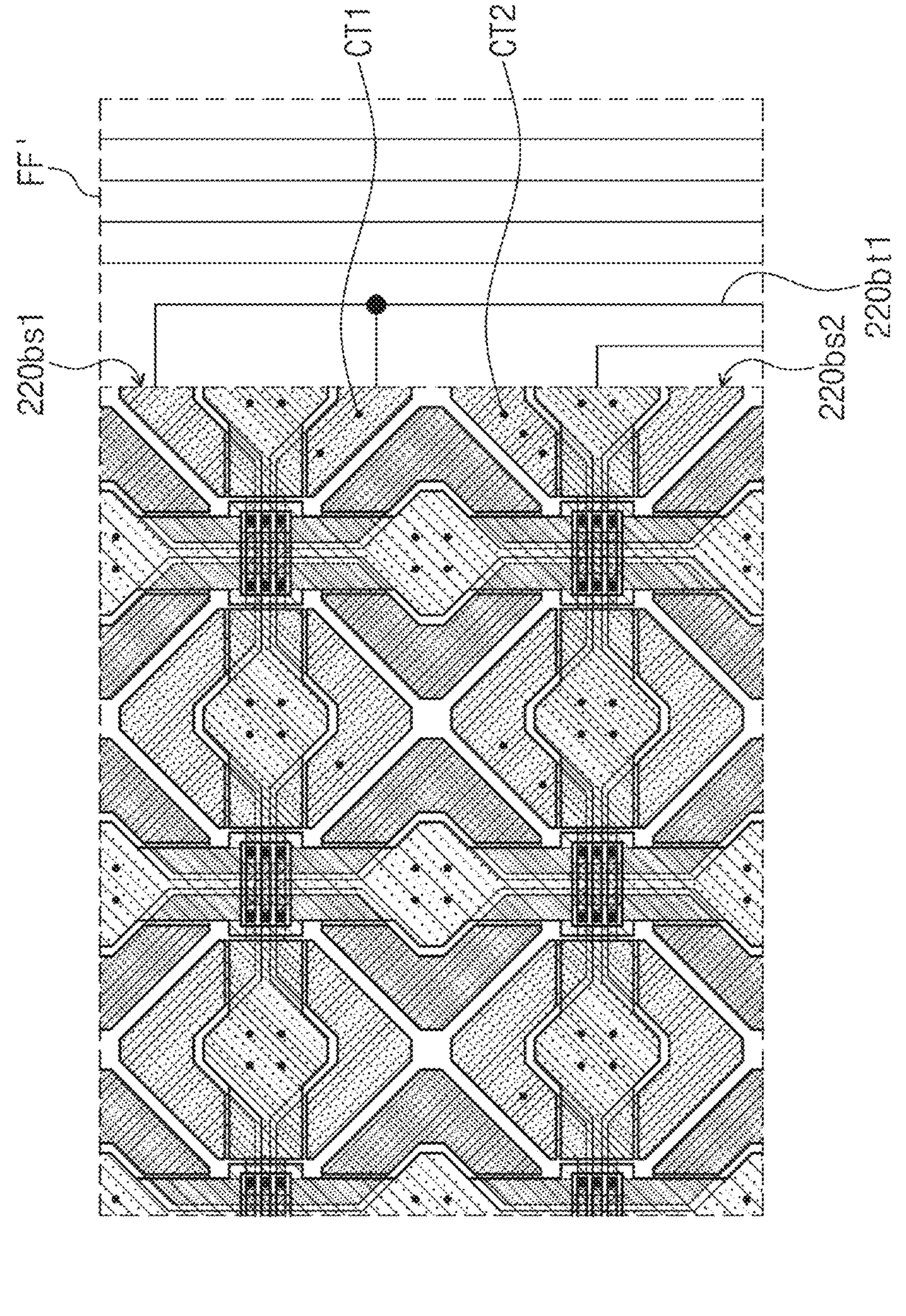
FIG. 16 is an enlarged plan view of the area FF' illustrated in FIG. 9.
Figure 17A:
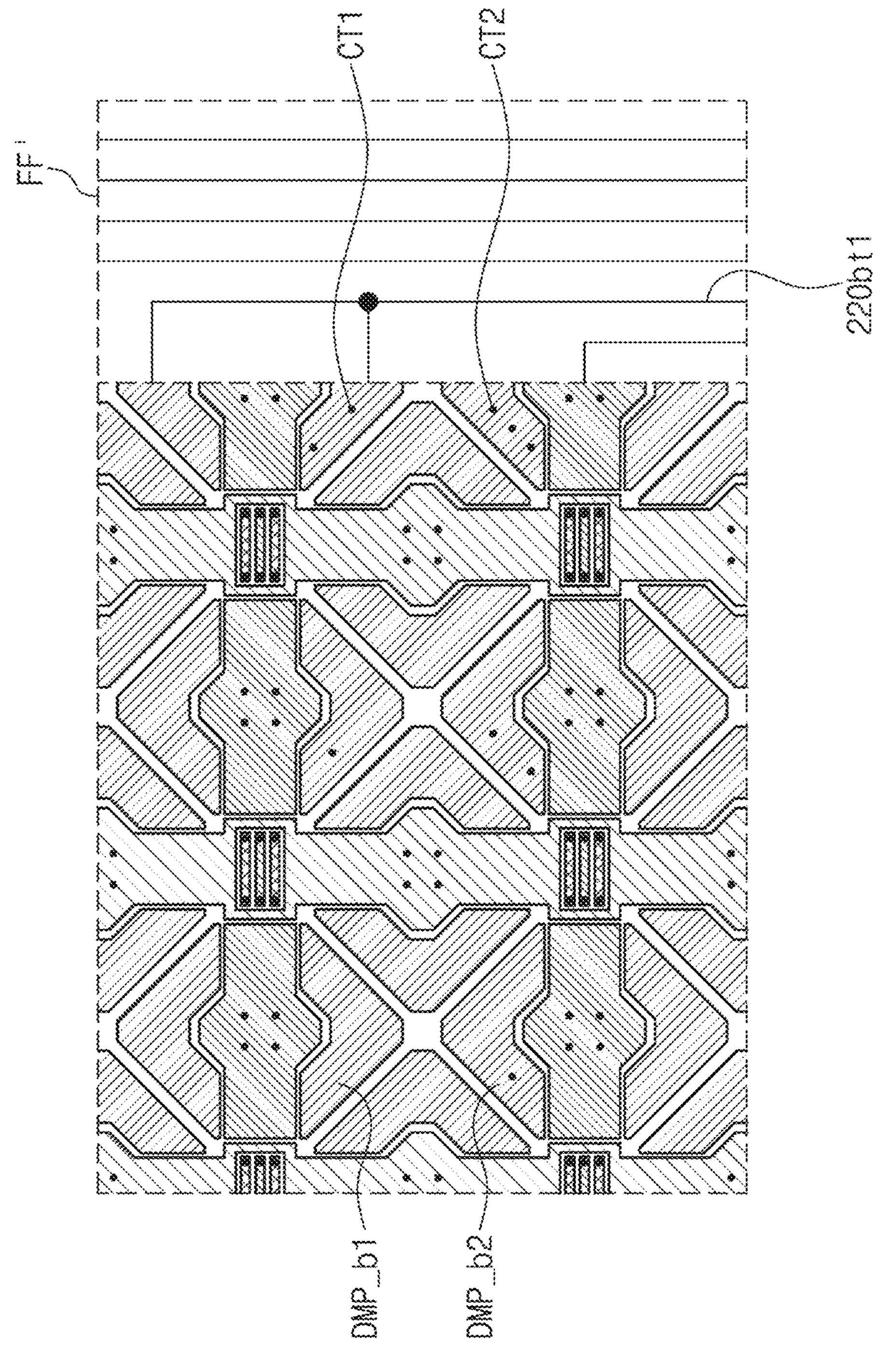
FIG. 17A is a plan view illustrating the first conductive layer of the area FF' according to an embodiment of the present disclosure.
Figure 17B:
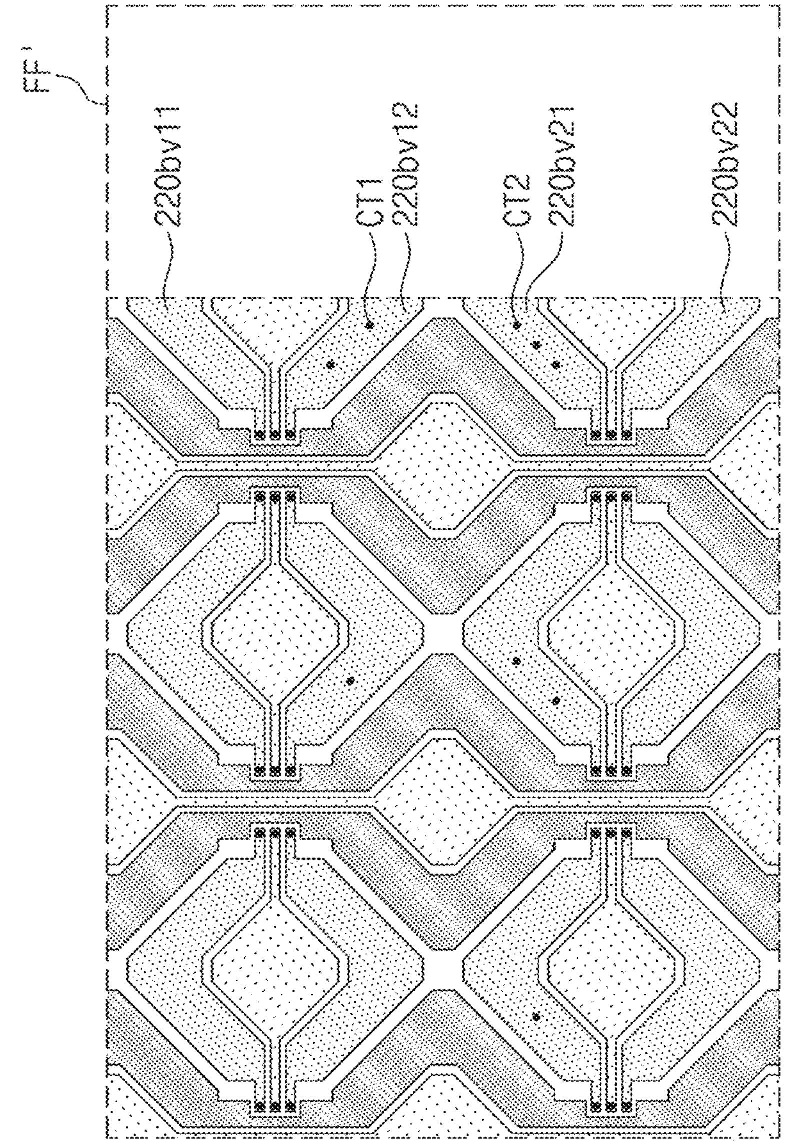
FIG. 17B is a plan view illustrating the second conductive layer of the area FF' according to an embodiment of the present disclosure.

FIG. 14 is an enlarged plan view of the area EE' illustrated in FIG. 9. FIG. 15A is a plan view illustrating the first conductive layer of the area EE' according to an embodiment of the present disclosure. FIG. 15B is a plan view illustrating the second conductive layer of the area EE' according to an embodiment of the present disclosure. FIG. 16 is an enlarged plan view of the area FF' illustrated in FIG. 9. FIG. 17A is a plan view illustrating the first conductive layer of the area FF' according to an embodiment of the present disclosure. FIG. 17B is a plan view illustrating the second conductive layer of the area FF' according to an embodiment of the present disclosure.

Referring to FIGS. 9, 14, and 16, the second-first electrodes 220*s*1 are disposed on the upper side with respect to the center line that passes through the center of the sensing area 200A in the first direction DR1, and the second-second electrodes 220*s*2 are disposed on the lower side with respect to the center line. In the central portion where the center line is located, the second-first electrodes 220*s*1 are adjacent to the second-second electrodes 220*s*2. In more detail, a first boundary electrode 220*bs*1 from among the second-first electrodes 220*s*1 is adjacent to a second boundary electrode 220*bs*2 from among the second-second electrodes 220*s*2 in the second direction DR2.

The first boundary electrode 220*bs*1 is connected to a first boundary trace line 220*bt*1 from among the second-first trace lines 220*t*1, and the second boundary electrode 220*bs*2 is connected to a second boundary trace line 220*bt*2 from among the second-second trace lines 220*t*2. The first boundary trace line 220*bt*1 is connected to a first end of the first boundary electrode 220*bs*1, and the second boundary trace line 220*bt*2 is connected to a second end of the second boundary electrode 220*bs*2.

The first boundary electrode 220*bs*1 includes two first divided boundary electrodes 220*bv*11 and 220*bv*12 (e.g., see FIGS. 15B and 17B) spaced apart from each other in the second direction DR2. The first divided boundary electrodes 220*bv*11 and 220*bv*12 are commonly connected to the first boundary trace line 220*bt*1. The second boundary electrode 220*bs*2 includes two second divided boundary electrodes 220*bv*21 and 220*bv*22 spaced apart from each other in the second direction DR2. The second divided boundary electrodes 220*bv*21 and 220*bv*22 are commonly connected to the second boundary trace line 220*bt*2. The two first divided boundary electrodes 220*bv*11 and 220*bv*12 may be referred to as the first-first divided boundary electrode 220*bv*11 and the first-second divided boundary electrode 220*bv*12, respectively. The two second divided boundary electrodes 220*bv*21 and 220*bv*22 may be referred to as the second-first divided boundary electrode 220*bv*21 and the second-second divided boundary electrode 220*bv*22, respectively. The first-second divided boundary electrode 220*bv*12 may be adjacent to the second-first divided boundary electrode 220*bv*21.

Referring to FIGS. 14 to 17B, the dummy patterns DMP include a first boundary dummy pattern DMP_b1 overlapping with the first boundary electrode 220*bs*1, and a second boundary dummy pattern DMP_b2 overlapping with the second boundary electrode 220*bs*2. The first boundary electrode 220*bs*1 is connected with the first boundary dummy pattern DMP_b1 through first compensation contact holes CT1. The second boundary electrode 220*bs*2 is connected with the second boundary dummy pattern DMP_b2 through second compensation contact holes CT2.

In an embodiment of the present disclosure, the first-second divided boundary electrode 220*bv*12 of the first boundary electrode 220*bs*1 may be connected with the first boundary dummy pattern DMP_b1 through the first compensation contact holes CT1. However, the present disclosure is not limited thereto. As another example, the first-first divided boundary electrode 220*bv*11 and the first-second divided boundary electrode 220*bv*12 may be connected with the first boundary dummy pattern DMP_b1 through the first compensation contact holes CT1. In an embodiment of the present disclosure, the second-first divided boundary electrode 220*bv*21 of the second boundary electrode 220*bs*2 may be connected with the second boundary dummy pattern DMP_b2 through the second compensation contact holes CT2. However, the present disclosure is not limited thereto. As another example, the second-first divided boundary electrode 220*bv*21 and the second-second divided boundary electrode 220*bv*22 may be connected with the second boundary dummy pattern DMP_b2 through the second compensation contact holes CT2.

The number of first compensation contact holes CT1 may be increased from the center point of the first boundary electrode 220*bs*1 toward a second end of the first boundary electrode 220*bs*1. In addition, the number of first compensation contact holes CT1 may be increased from the center point of the first boundary electrode 220*bs*1 toward the first end of the first boundary electrode 220*bs*1. The number of first compensation contact holes CT1 at the second end of the first boundary electrode 220*bs*1 may be different from the number of first compensation contact holes CT1 at the first end of the first boundary electrode 220*bs*1.

The number of second compensation contact holes CT2 may be increased from the center point of the second boundary electrode 220*bs*2 toward a first end of the second boundary electrode 220*bs*2. In addition, the number of second compensation contact holes CT2 may be increased from the center point of the second boundary electrode 220*bs*2 toward the second end of the second boundary electrode 220*bs*2. The number of second compensation contact holes CT2 at the first end of the second boundary electrode 220*bs*2 may be different from the number of second compensation contact holes CT2 at the second end of the second boundary electrode 220*bs*2.

In addition, the number of first compensation contact holes CT1 at the second end of the first boundary electrode 220*bs*1 may be different from the number of second compensation contact holes CT2 at the second end of the second boundary electrode 220*bs*2, and the number of first compensation contact holes CT1 at the first end of the first boundary electrode 220*bs*1 may be different from the number of second compensation contact holes CT2 at the first end of the second boundary electrode 220*bs*2.

Figure 18:
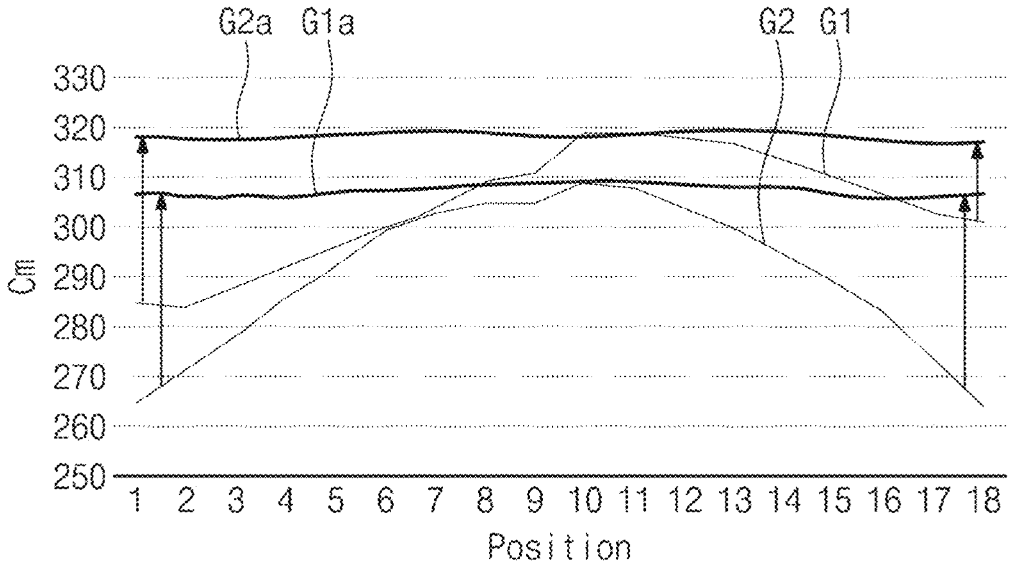
FIG. 18 illustrates graphs depicting mutual capacitances of first and second boundary electrodes according to an embodiment of the present disclosure.

FIG. 18 illustrates graphs depicting mutual capacitances Cm of the first and second boundary electrodes 220*bs*1 and 220*bs*2 according to an embodiment of the present disclosure. In FIG. 18, first and second graphs G1 and G2 depict the mutual capacitances Cm of the first and second boundary electrodes 220*bs*1 and 220*bs*2 in a structure in which the first and second compensation contact holes CT1 and CT2 (e.g., refer to FIGS. 14 and 16) are not provided. In FIG. 18, first and second graphs G1*a* and G2*a* depict the mutual capacitances Cm of the first and second boundary electrodes 220*bs*1 and 220*bs*2 in a structure in which the first and second compensation contact holes CT1 and CT2 (e.g., refer to FIGS. 14 and 16) are provided.

Referring to FIGS. 14, 16, and 18, when the first boundary electrode 220*bs*1 and the first boundary dummy pattern DMP_b1 are not connected to each other through the first compensation contact holes CT1, the mutual capacitance Cm of the first boundary electrode 220*bs*1 may vary depending on positions. When the number of first compensation contact holes CT1 is adjusted to compensate for the variation in the mutual capacitance Cm depending on the positions as in some embodiments of the present disclosure described above, the mutual capacitance Cm of the first boundary electrode 220*bs*1 may not vary depending on the positions.

When the second boundary electrode 220*bs*2 and the second boundary dummy pattern DMP_2*b* are not connected to each other through the second compensation contact holes CT2, the mutual capacitance Cm of the second boundary electrode 220*bs*2 may vary depending on positions. When the number of second compensation contact holes CT2 is adjusted to compensate for the variation in the mutual capacitance Cm depending on the positions as in some embodiments of the present disclosure, the mutual capacitance Cm of the second boundary electrode 220*bs*2 may not vary depending on the positions.

In addition, when the mutual capacitances Cm of the first and second boundary electrodes 220*bs*1 and 220*bs*2 are compensated for by adjusting the numbers of the first and second compensation contact holes CT1 and CT2, a variation in the mutual capacitance Cm between the first and second boundary electrodes 220*bs*1 and 220*bs*2 may also be decreased. In other words, a phenomenon in which a difference in the mutual capacitance Cm between the first end of the first boundary electrode 220*bs*1 and the first end of the second boundary electrode 220*bs*2 and a difference in the mutual capacitance Cm between the second end of the first boundary electrode 220*bs*1 and the second end of the second boundary electrode 220*bs*2 are greater than that in the central portion may be prevented or substantially prevented.

Figure 19:
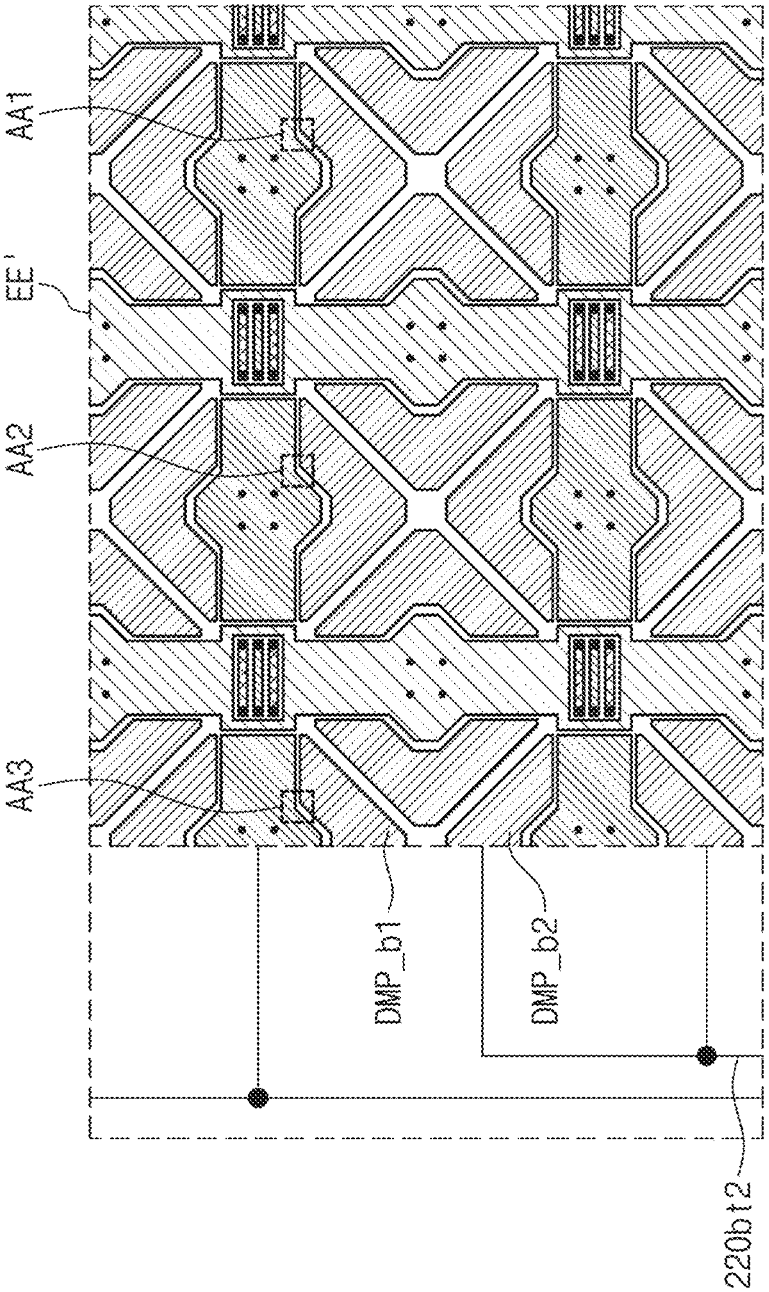
FIG. 19 is an enlarged plan view of the area EE' illustrated in FIG. 9.
Figure 20:
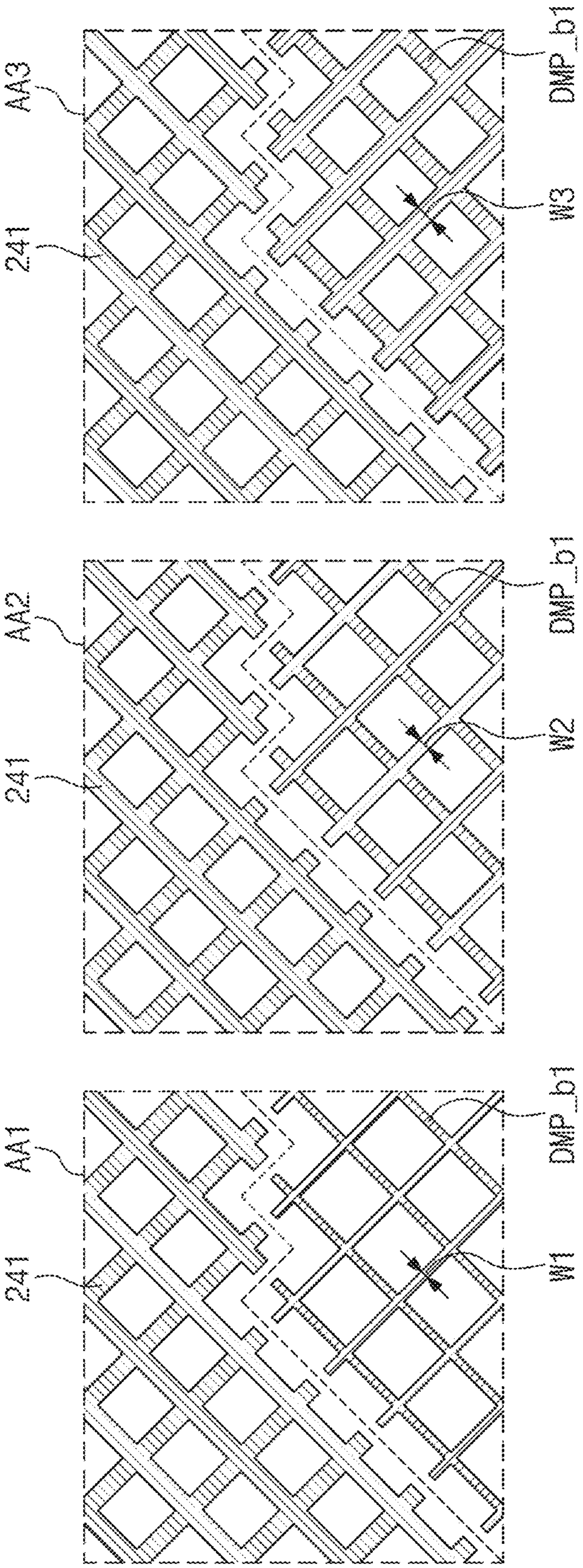
FIG. 20 is a plan view illustrating the first conductive layer located in the areas AA1, AA2, and AA3 illustrated in FIG. 19.
Figure 21:
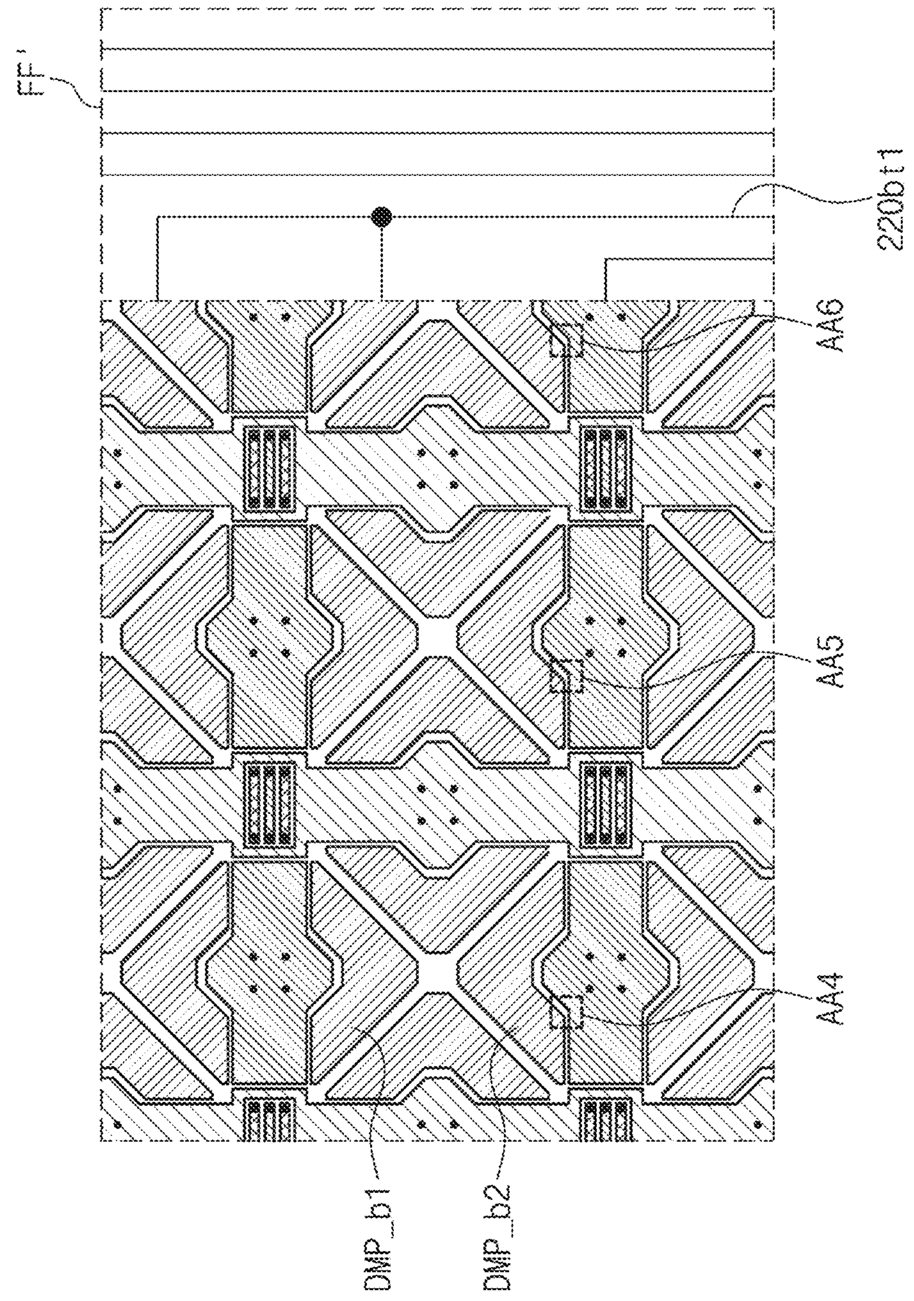
FIG. 21 is an enlarged plan view of the area FF' illustrated in FIG. 9.
Figure 22:
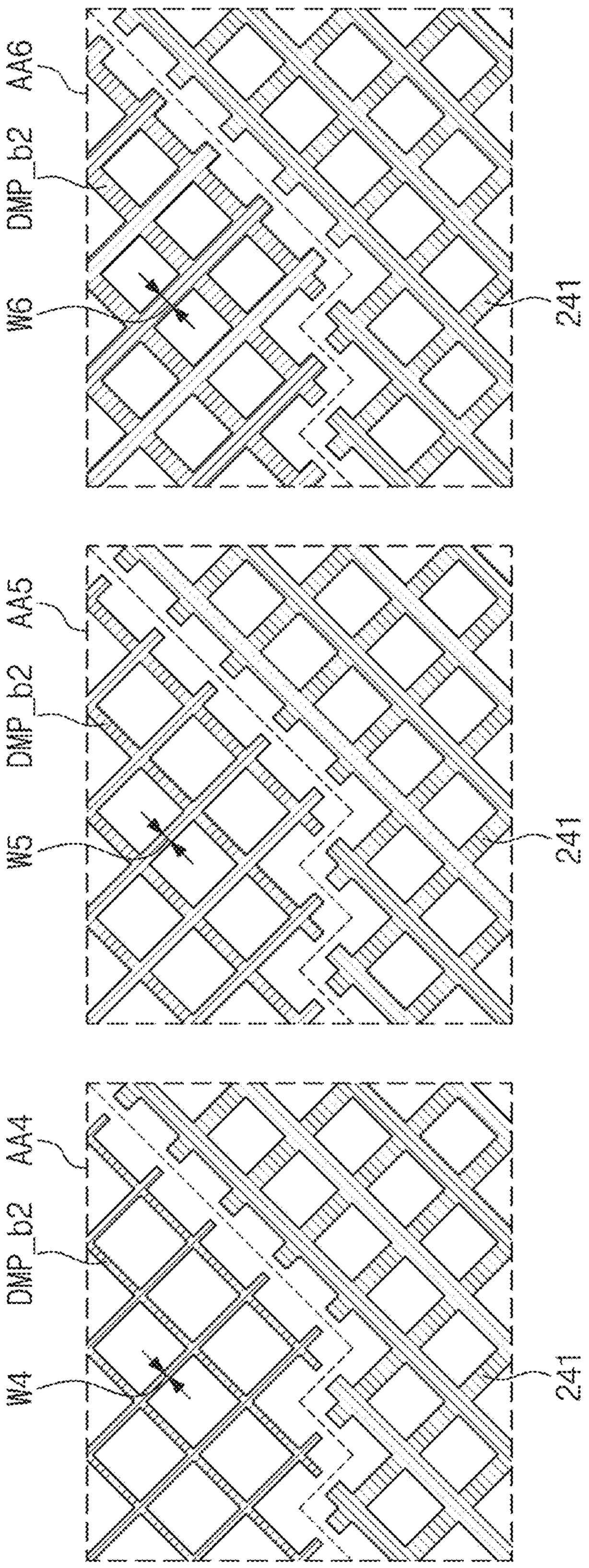
FIG. 22 is a plan view illustrating the first conductive layer located in the areas AA4, AA5, and AA6 illustrated in FIG. 21.

FIG. 19 is an enlarged plan view illustrating the first conductive layer in the area EE' illustrated in FIG. 9. FIG. 20 is a plan view illustrating the first conductive layer located in the areas AA1, AA2, and AA3 illustrated in FIG. 19. FIG. 21 is an enlarged plan view illustrating the first conductive layer in the area FF' illustrated in FIG. 9. FIG. 22 is a plan view illustrating the first conductive layer located in the areas AA4, AA5, and AA6 illustrated in FIG. 21.

Referring to FIGS. 19 to 22, the dummy patterns DMP (e.g., refer to FIG. 10) may include the first boundary dummy pattern DMP_b1 connected with the first boundary electrode 220*bs*1, and the second boundary dummy pattern DMP_b2 connected with the second boundary electrode 220*bs*2. The first boundary electrode 220*bs*1 may be connected with the first boundary dummy pattern DMP_b1, and the second boundary electrode 220*bs*2 may be connected with the second boundary dummy pattern DMP_b2.

Each of the first and second boundary dummy patterns DMP_b1 and DMP_b2 may include mesh lines, and the line widths of the mesh lines may vary or be different depending on the positions. The widths of the mesh lines of the first boundary dummy pattern DMP_b1 may be determined depending on (or based on) the distance from the first boundary trace line 220*bt*1 connected to the first boundary electrode 220*bs*1 from among the second-first trace lines 220*t*1. The widths of the mesh lines of the second boundary dummy pattern DMP_b2 may be determined depending on (or based on) the distance from the second boundary trace line 220*bt*2 connected to the second boundary electrode 220*bs*2 from among the second-second trace lines 220*t*2.

FIG. 20 illustrates the first area AA1, the second area AA2, and the third area AA3 illustrated in FIG. 19. The first area AA1 is closer to the first boundary trace line 220*bt*1 than the second and third areas AA2 and AA3, and the second area AA2 is closer to the first boundary trace line 220*bt*1 than the third area AA3.

The mesh lines of the first boundary dummy pattern DMP_b1 in the first area AA1 have a first width W1, the mesh lines of the first boundary dummy pattern DMP_b1 in the second area AA2 have a second width W2, and the mesh lines of the first boundary dummy pattern DMP_b1 in the third area AA3 have a third width W3. In an embodiment of the present disclosure, the second width W2 may be greater than the first width W1, and the third width W3 may be greater than the second width W2.

By including the mesh lines of the first boundary dummy pattern DMP_b1 having different widths depending on the distance from the first boundary trace line 220*bt*1, a variation in the mutual capacitance Cm of the first boundary electrode 220*bs*1 depending on the positions may be compensated for. Accordingly, the mutual capacitance Cm of the first boundary electrode 220*bs*1 may not vary or substantially vary depending on the positions in the first direction DR1.

FIG. 22 illustrates the fourth area AA4, the fifth area AA5, and the sixth area AA6 illustrated in FIG. 21. The fourth area AA4 is closer to the second boundary trace line 220*bt*2 than the fifth and sixth areas AA5 and AA6, and the fifth area AA5 is closer to the second boundary trace line 220*bt*2 than the sixth area AA6.

The mesh lines of the second boundary dummy pattern DMP_b2 in the fourth area AA4 have a fourth width W4, the mesh lines of the second boundary dummy pattern DMP_b2 in the fifth area AA5 have a fifth width W5, and the mesh lines of the second boundary dummy pattern DMP_b2 in the sixth area AA6 have a sixth width W6. In an embodiment of the present disclosure, the fifth width W5 may be greater than the fourth width W4, and the sixth width W6 may be greater than the fifth width W5.

By including the mesh lines of the second boundary dummy pattern DMP_b2 having different widths depending on the distance from the second boundary trace line 220*bt*2, a variation in the mutual capacitance Cm of the second boundary electrode 220*bs*2 depending on the positions may be compensated for. Accordingly, the mutual capacitance Cm of the second boundary electrode 220*bs*2 may not vary or substantially vary depending on the positions in the first direction DR1.

In addition, when the mutual capacitances Cm of the first and second boundary electrodes 220*bs*1 and 220*bs*2 are compensated for by adjusting the widths of the mesh lines of the first and second boundary dummy patterns DMP_b1 and DMP_b2, a variation in the mutual capacitance Cm between the first and second boundary electrodes 220*bs*1 and 220*bs*2 may also be decreased. In other words, a phenomenon in which a difference in the mutual capacitance Cm between the first end of the first boundary electrode 220*bs*1 and the first end of the second boundary electrode 220*bs*2 and a difference in the mutual capacitance Cm between the second end of the first boundary electrode 220*bs*1 and the second end of the second boundary electrode 220*bs*2 are greater than that in the central portion may be prevented or substantially prevented.

Figure 23:
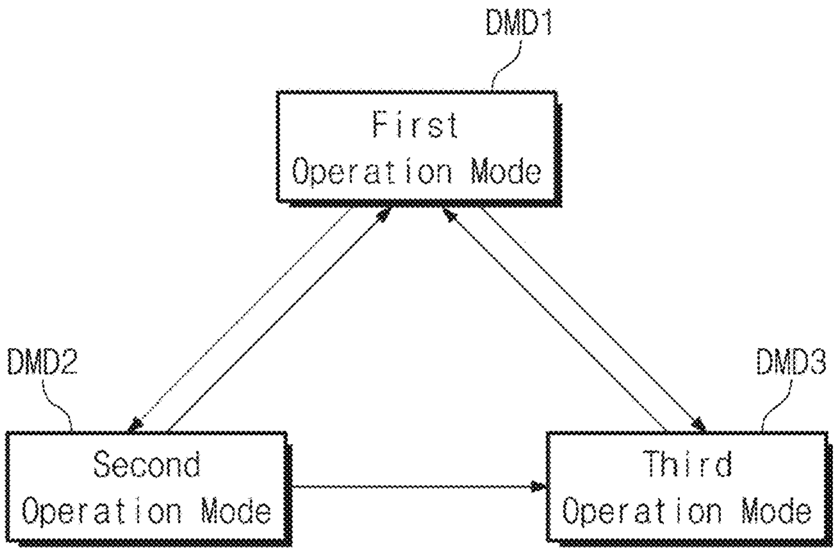
FIG. 23 is a view illustrating an operation of a sensor driver according to an embodiment of the present disclosure.

FIG. 23 is a view illustrating an operation of the sensor driver 200C according to an embodiment of the present disclosure.

Referring to FIGS. 7 and 23, the sensor driver 200C may be selectively driven in one of a first operation mode DMD1, a second operation mode DMD2, and a third operation mode DMD3.

The first operation mode DMD1 may be referred to as a touch and pen standby mode. The second operation mode DMD2 may be referred to as a touch activation and pen standby mode. The third operation mode DMD3 may be referred to as a pen activation mode. The first operation mode DMD1 may be a mode in which the sensor driver 200C waits for the first input 2000 and the second input 3000. The second operation mode DMD2 may be a mode in which the sensor driver 200C senses the first input 2000 and waits for the second input 3000. The third operation mode DMD3 may be a mode in which the sensor driver 200C senses the second input 3000.

In an embodiment of the present disclosure, the sensor driver 200C may first be driven in the first operation mode DMD1. When the first input 2000 is sensed in the first operation mode DMD1, the sensor driver 200C may be switched (e.g., changed) to the second operation mode DMD2. As another example, when the second input 3000 is sensed in the first operation mode DMD1, the sensor driver 200C may be switched (e.g., changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 24:
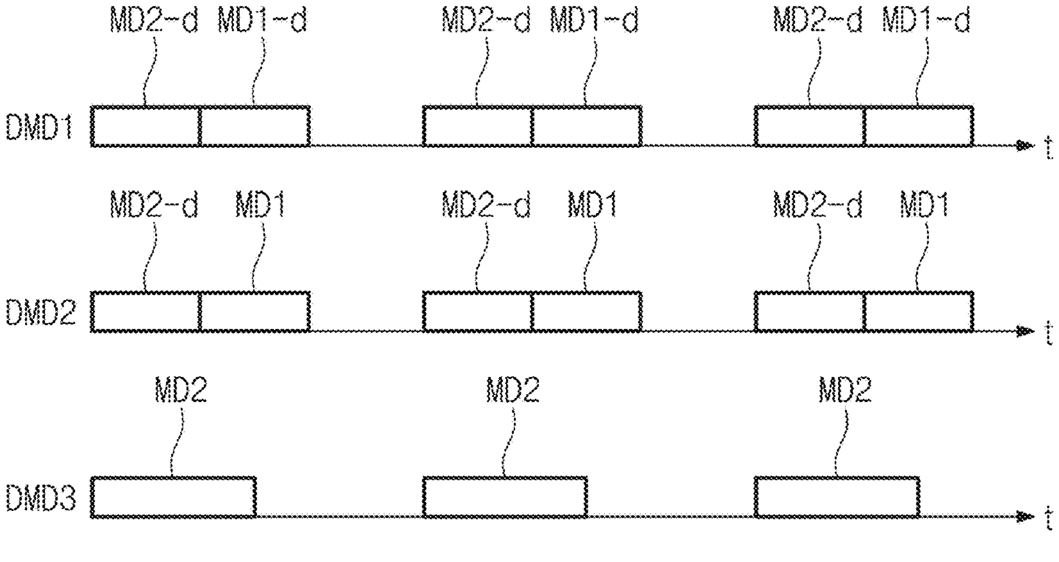
FIG. 24 is a view illustrating an operation of the sensor driver according to an embodiment of the present disclosure.

FIG. 24 is a view illustrating an operation of the sensor driver 200C according to an embodiment of the present disclosure.

Referring to FIGS. 7, 23, and 24, the operations in the first to third operation modes DMD1, DMD2, and DMD3 are illustrated in the order of time (t).

In the first operation mode DMD1, the sensor driver 200C may be repeatedly driven in a second mode MD2-*d* and a first mode MD1-*d*. During the second mode MD2-*d*, the sensor layer 200 may be scan-driven to detect the second input 3000. During the first mode MD1-*d*, the sensor layer 200 may be scan-driven to detect the first input 2000. Although FIG. 24 illustrates an example in which the sensor driver 200C operates in the first mode MD1-*d* continuously after the second mode MD2-*d*, the present disclosure is not limited thereto, and the order thereof may be variously modified as needed or desired.

In the second operation mode DMD2, the sensor driver 200C may be repeatedly driven in a second mode MD2-*d* and a first mode MD1. During the second mode MD2-*d*, the sensor layer 200 may be scan-driven to detect the second input 3000. During the first mode MD1, the sensor layer 200 may be scan-driven to detect the coordinates by the first input 2000.

In the third operation mode DMD3, the sensor driver 200C may be driven in a second mode MD2. During the second mode MD2, the sensor layer 200 may be scan-driven to detect the coordinates by the second input 3000. In the third operation mode DMD3, the sensor driver 200C may not operate in the first mode MD1-D or MD1 until the second input 3000 is released (e.g., not sensed).

Referring to FIGS. 9 and 24, in the first mode MD1-*d* and the first mode MD1, the third electrodes 230 and the fourth electrodes 240 may all be grounded. Accordingly, a touch noise may be prevented or substantially prevented from being introduced through the third electrodes 230 and the fourth electrodes 240.

In the second mode MD2-*d* of the first operation mode DMD1 or the second operation mode DMD2 and the second mode MD2 of the third operation mode DMD3, first ends of the third electrodes 230 and the fourth electrodes 240 may all be floated. In addition, in the second mode MD2-*d* and the second mode MD2, second ends of the third electrodes 230 and the fourth electrodes 240 may all be grounded or floated. Accordingly, a compensation for a sensing signal may be increased or maximized by the coupling between the first electrodes 210 and the third electrodes 230 and the coupling between the second electrodes 220 and the fourth electrodes 240.

Figure 25A:
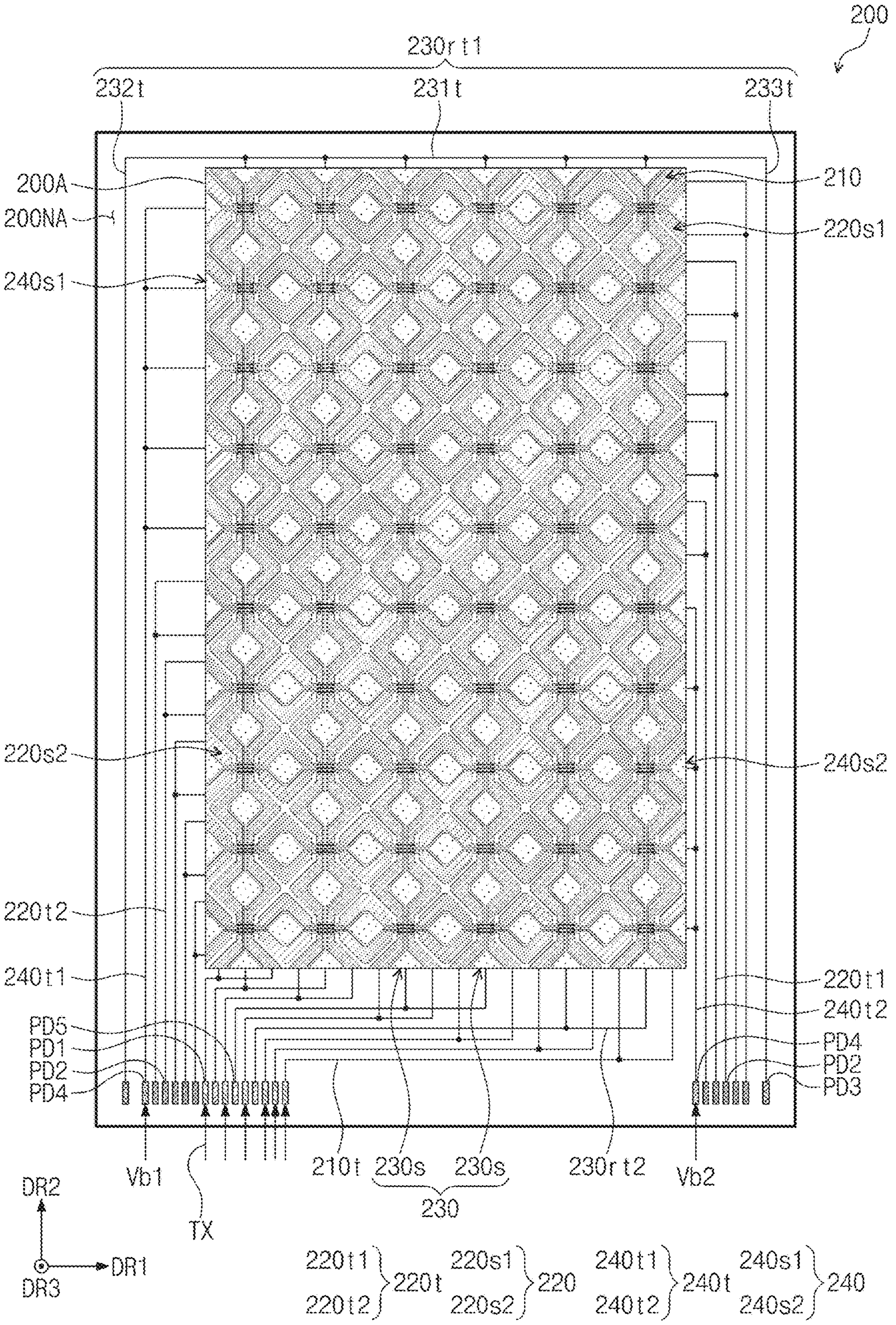
FIG. 25A is a view illustrating a first mode according to an embodiment of the present disclosure.
Figure 25B:
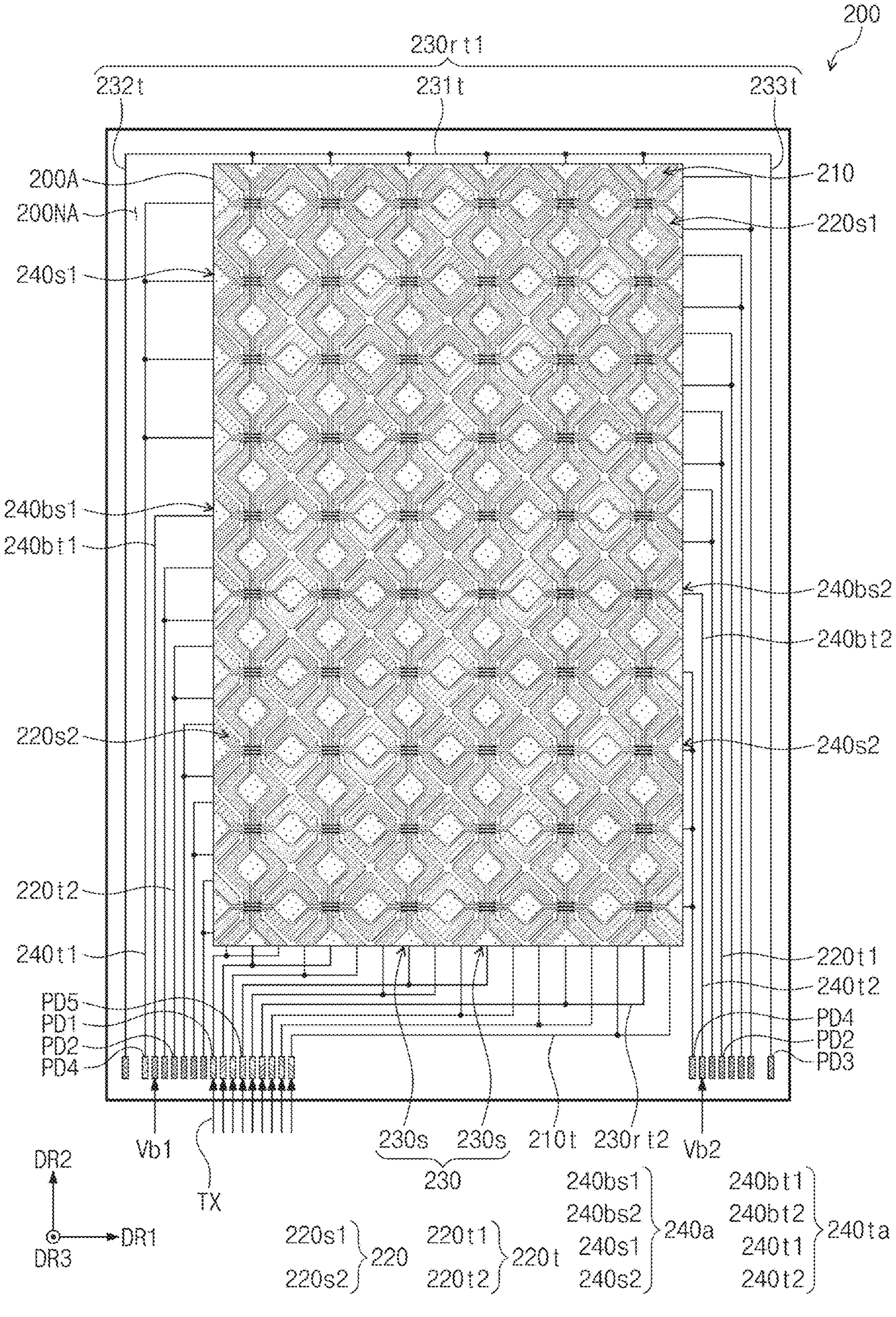
FIG. 25B is a view illustrating the first mode according to an embodiment of the present disclosure.

FIG. 25A is a view illustrating the first mode according to an embodiment of the present disclosure. FIG. 25B is a view illustrating the first mode according to an embodiment of the present disclosure.

Referring to FIGS. 17, 25A, and 25B, the first mode MD1-*d* and the first mode MD1 may include at least one of a self-capacitance detection mode or a mutual-capacitance detection mode. FIGS. 25A and 25B are views illustrating an operation of the self-capacitance detection mode.

In the self-capacitance detection mode, the sensor driver 200C may calculate input coordinates by outputting transmission signals TX to at least one of the first electrodes 210 and/or the second electrodes 220, and sensing a change in the capacitance of the at least one of the first electrodes 210 and/or the second electrodes 220. Although FIGS. 25A and 25B illustrate an example in which the sensor driver 200C outputs the transmission signals TX to the first trace lines 210*t* connected to the first electrodes 210, the present disclosure is not limited thereto. As another example, the sensor driver 200C may output the transmission signals TX to the second trace lines 220*t* connected to the second electrodes 220. In addition, when the self-capacitance detection mode includes two sub-sections (e.g., first and second sub-sections), the sensor driver 200C may output the transmission signal TX to the first trace lines 210*t* during the first sub-section, and may output the transmission signal TX to the second trace lines 220*t* during the second sub-section.

The third electrodes 230 are electrically connected with the third trace line 230*rt*1 and the fifth trace lines 230*rt*2, and the fourth electrodes 240 are electrically connected with the fourth trace lines 240*t*1 and 24012. In the self-capacitance detection mode, the third electrodes 230 may all be grounded. Accordingly, a noise may not be introduced through the third electrodes 230.

As another example, in the self-capacitance detection mode, all of the third electrodes 230 may be floated, or may receive a reference voltage (e.g., a preset or predetermined reference voltage). In an embodiment of the present disclosure, a signal in phase with the transmission signal TX may be applied to the third electrodes 230. In this case, a noise may not be introduced through the third electrodes 230.

In an embodiment of the present disclosure, in the self-capacitance detection mode, a first compensation voltage Vb1 may be applied to the second-first auxiliary electrodes 240*s*1 from among the fourth electrodes 240, and a second compensation voltage Vb2 may be applied to the second-second auxiliary electrodes 240*s*2. In the self-capacitance detection mode, the sensor driver 200C may output the first compensation voltage Vb1 to the fourth-first trace lines 240*t*1, and may output the second compensation voltage Vb2 to the fourth-second trace lines 240*t*2.

In an embodiment of the present disclosure, the first and second compensation voltages Vb1 and Vb2 may have different voltage levels from each other. The voltage levels of the first and second compensation voltages Vb1 and Vb2 may be determined to suitably compensate for a difference in a mutual capacitance Cm between the first and second boundary electrodes 220*bs*1 and 220*bs*2. Accordingly, the difference in the mutual capacitance Cm between the first and second boundary electrodes 220*bs*1 and 220*bs*2 may be decreased, and thus, a change in capacitance may be accurately sensed in the self-capacitance detection mode.

Referring to FIG. 25B, fourth trace lines 240*ta* may include fourth-first trace lines 240*t*1, fourth-second trace lines 240*t*2, a first auxiliary boundary trace line 240*bt*1, and a second auxiliary boundary trace line 240*bt*2. The first auxiliary boundary trace line 240*bt*1 is connected to a first auxiliary boundary electrode 240*bs*1 from among fourth electrodes 240*a*, and the second auxiliary boundary trace line 240*bt*2 is connected to a second auxiliary boundary electrode 240*bs*2 from among the fourth electrodes 240*a*. The first auxiliary boundary electrode 240*bs*1 overlaps with the first boundary electrode 220*bs*1 to form a coupling capacitor, and the second auxiliary boundary electrode 240*bs*2 overlaps with the second boundary electrode 220*bs*2 to form a coupling capacitor.

In the self-capacitance detection mode, the third electrodes 230, the second-first auxiliary electrodes 240*s*1, and the second-second auxiliary electrodes 240*s*2 may all be grounded. Accordingly, a noise may not be introduced through the third electrodes 230, the second-first auxiliary electrodes 240*s*1, and the second-second auxiliary electrodes 240*s*2. As another example, in the self-capacitance detection mode, all of the third electrodes 230, the second-first auxiliary electrodes 240*s*1, and the second-second auxiliary electrodes 240*s*2 may be floated, or may receive a reference voltage (e.g., a preset or predetermined reference voltage).

In an embodiment of the present disclosure, in the self-capacitance detection mode, the first compensation voltage Vb1 may be applied to the first auxiliary boundary electrode 240*bs*1 from among the fourth electrodes 240, and the second compensation voltage Vb2 may be applied to the second auxiliary boundary electrode 240*bs*2. In the self-capacitance detection mode, the sensor driver 200C may output the first compensation voltage Vb1 to the first auxiliary boundary trace lines 240*bt*1, and may output the second compensation voltage Vb2 to the second auxiliary boundary trace lines 240*bt*2.

In an embodiment of the present disclosure, the first and second compensation voltages Vb1 and Vb2 may have different voltage levels from each other. The coupling capacitance between the first auxiliary boundary electrode 240*bs*1 and the first boundary electrode 220*bs*1 may vary depending on the first compensation voltage Vb1, and the coupling capacitance between the second auxiliary boundary electrode 240*bs*2 and the second boundary electrode 220*bs*2 may vary depending on the second compensation voltage Vb2.

The voltage levels of the first and second compensation voltages Vb1 and Vb2 may be determined to suitably compensate for a difference in a mutual capacitance Cm between the first and second boundary electrodes 220*bs*1 and 220*bs*2. The magnitude of the coupling capacitance may be controlled by adjusting the voltage levels of the first and second compensation voltages Vb1 and Vb2, and thus, the difference in the mutual capacitance Cm between the first and second boundary electrodes 220*bs*1 and 220*bs*2 may be decreased. When the difference in the mutual capacitance Cm between the first and second boundary electrodes 220*bs*1 and 220*bs*2 is decreased, a change in capacitance may be accurately sensed in the central portion of the sensing area 200A.

Figure 26:
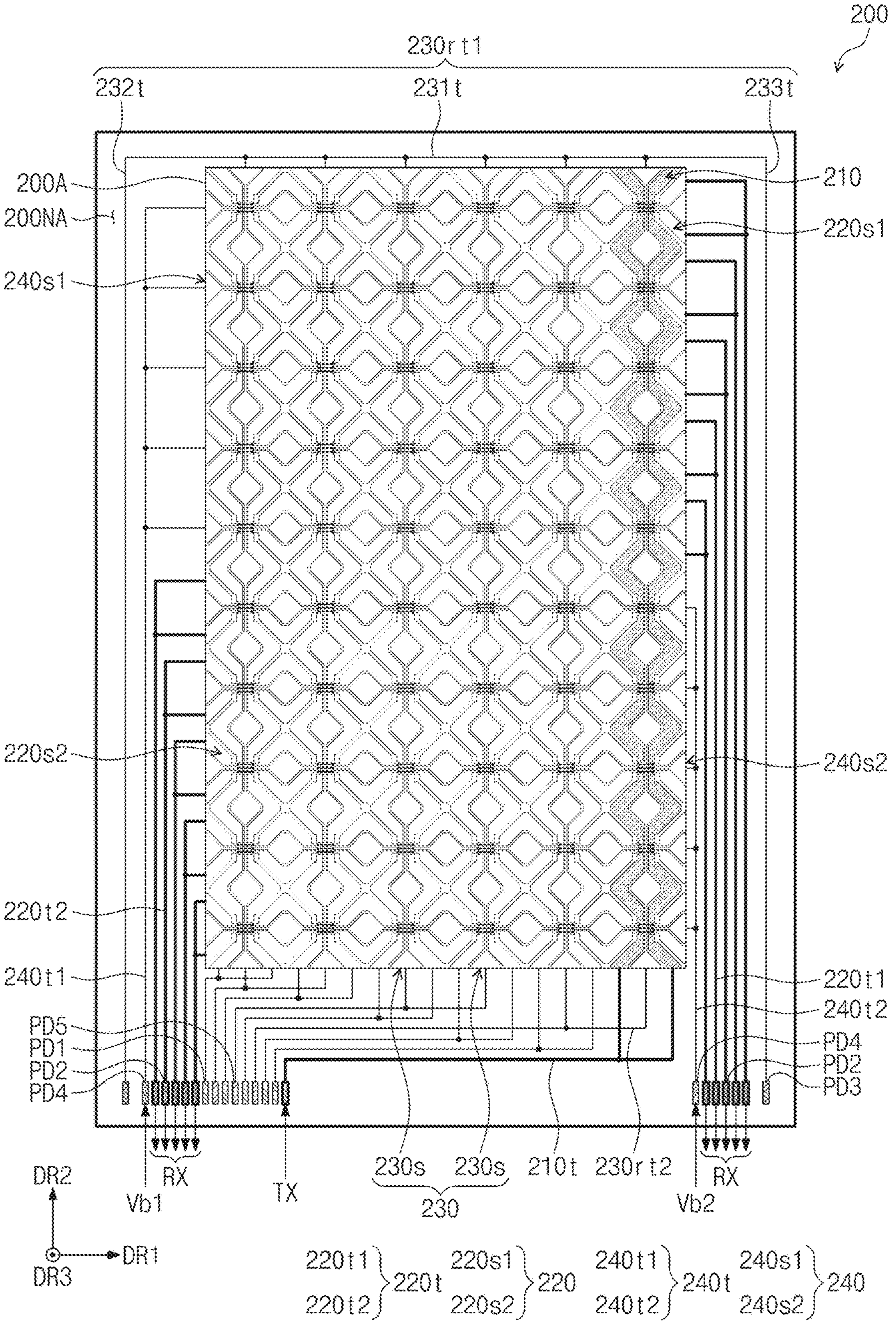
FIG. 26 is a view illustrating the first mode according to an embodiment of the present disclosure.

FIG. 26 is a view illustrating the first mode according to an embodiment of the present disclosure.

Referring to FIGS. 7, 24, and 26, the first mode MD1-*d* and the first mode MD1 may further include the mutual-capacitance detection mode. FIG. 26 is a view illustrating the mutual-capacitance detection mode in the first mode MD1-*d* and the first mode MD1.

In the mutual-capacitance detection mode, the sensor driver 200C may sequentially provide a transmission signal Tx to the first electrodes 210, and may detect the coordinates for the first input 2000 using a reception signal Rx detected through the second electrodes 220. For example, the sensor driver 200C may sense a change in the mutual capacitance between the first electrodes 210 and the second electrodes 220, and may calculate the input coordinates.

FIG. 26 illustrates an example in which the transmission signal TX is provided to one first electrode 210 and the reception signal RX is output from the second electrodes 220. In FIG. 26, to clarify the expression of the signals, hatching is drawn on only one first electrode 210 to which the transmission signal TX is provided. The sensor driver 200C may sense a change in the capacitance between the first electrode 210 and the second electrodes 220, and may detect the input coordinates for the first input 2000.

In the mutual-capacitance detection mode, the third electrodes 230 may all be grounded. Accordingly, a noise may not be introduced through the third electrodes 230. As another example, in the mutual-capacitance detection mode, all of the third electrodes 230 may be floated, or may receive a reference voltage (e.g., a preset or predetermined reference voltage). In an embodiment of the present disclosure, a signal in phase with the transmission signal TX may be applied to the third electrodes 230. In this case, a noise may not be introduced through the third electrodes 230.

In an embodiment of the present disclosure, in the mutual-capacitance detection mode, the first compensation voltage Vb1 may be applied to the second-first auxiliary electrodes 240*s*1 from among the fourth electrodes 240, and the second compensation voltage Vb2 may be applied to the second-second auxiliary electrodes 240*s*2. In the mutual-capacitance detection mode, the sensor driver 200C may output the first compensation voltage Vb1 to the fourth-first trace lines 240*t*1, and may output the second compensation voltage Vb2 to the fourth-second trace lines 240*t*2.

In an embodiment of the present disclosure, the first and second compensation voltages Vb1 and Vb2 may have different voltage levels from each other. The voltage levels of the first and second compensation voltages Vb1 and Vb2 may be determined to suitably compensate for a difference in a mutual capacitance Cm between the first and second boundary electrodes 220*bs*1 and 220*bs*2. Accordingly, the difference in the mutual capacitance Cm between the first and second boundary electrodes 220*bs*1 and 220*bs*2 may be decreased, and thus, a change in capacitance may be accurately sensed in the mutual-capacitance detection mode.

In the first mode MD1-*d* of the first operation mode DMD1 and the first mode MD1 of the second operation mode DMD2, the sensor layer 200 may alternately repeat a self-capacitance detection operation and a mutual capacitance detection operation. However, the present disclosure is not limited thereto. For example, in each of the first mode MD1-*d* and the first mode MD1, the sensor layer 200 may repeat only the mutual capacitance detection operation. As another example, in the first mode MD1-*d*, the sensor layer 200 may repeat only at least one of the self-capacitance detection operation or the mutual-capacitance detection operation, and in the first mode MD1, the sensor layer 200 may alternately repeat the self-capacitance detection operation and the mutual capacitance detection operation.

Figure 27:
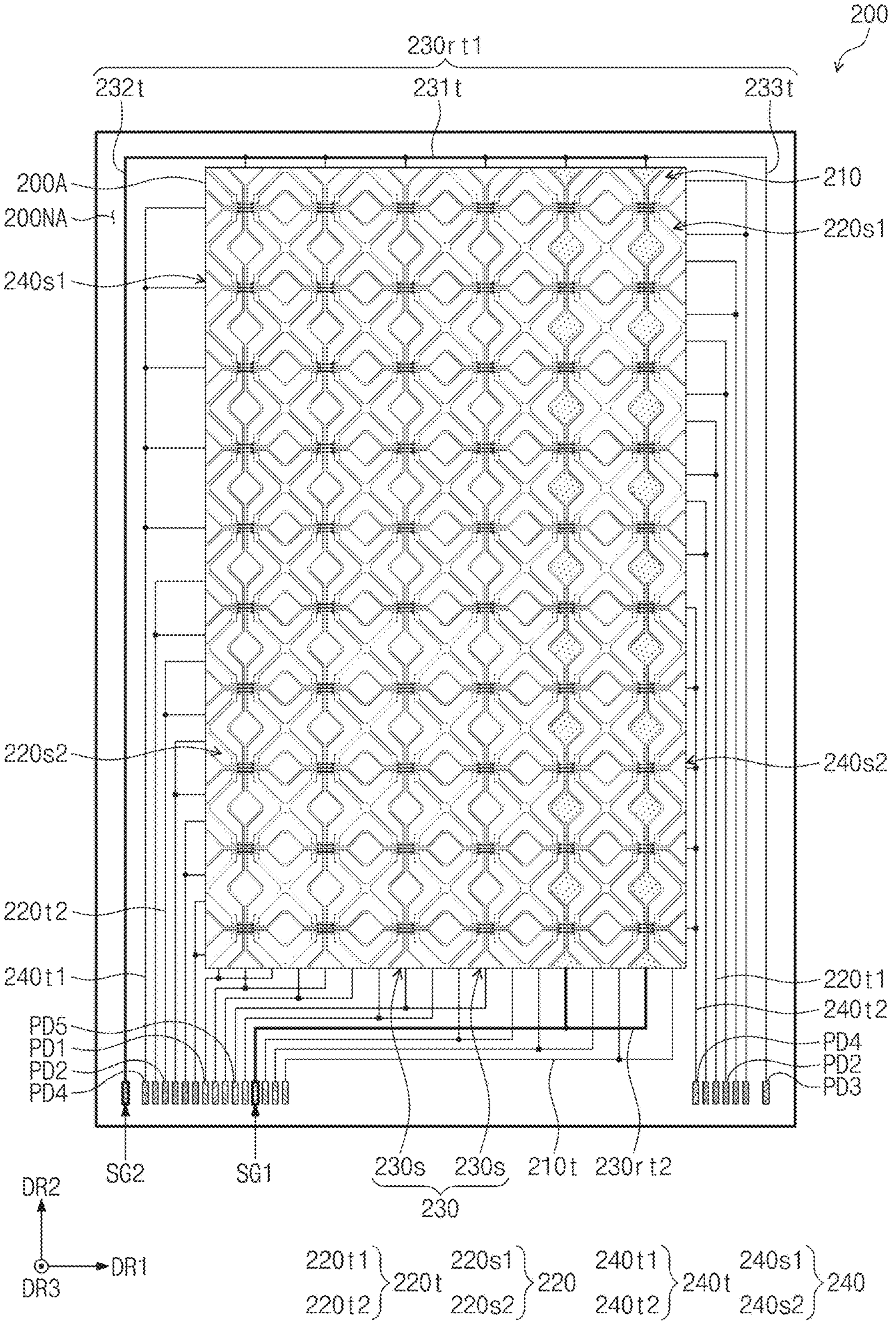
FIG. 27 is a view illustrating a second mode according to an embodiment of the present disclosure.
Figure 28A:
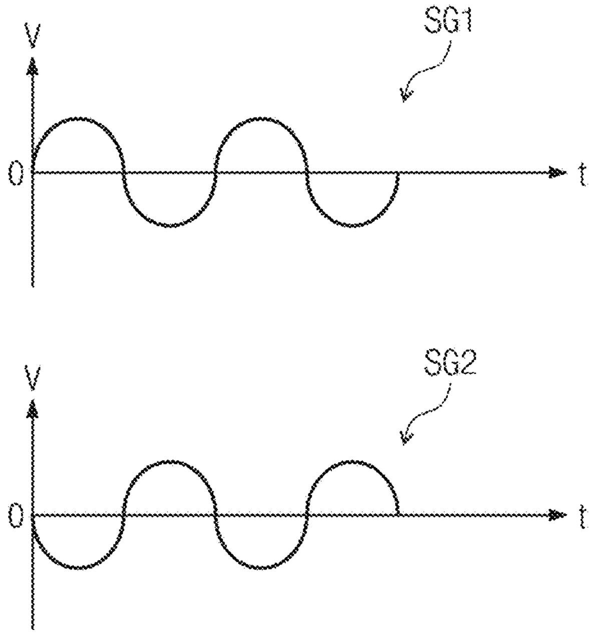
FIG. 28A illustrates graphs depicting waveforms of a first signal and a second signal according to an embodiment of the present disclosure.
Figure 28B:
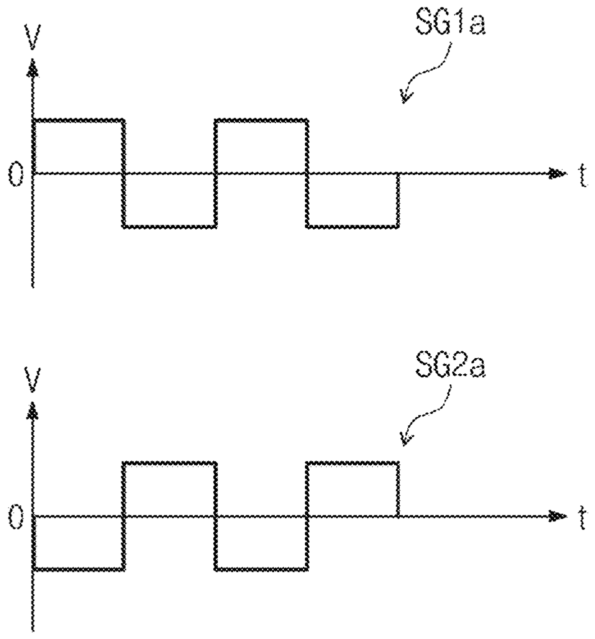
FIG. 28B illustrates graphs depicting waveforms of a first signal and a second signal according to an embodiment of the present disclosure.
Figure 28C:
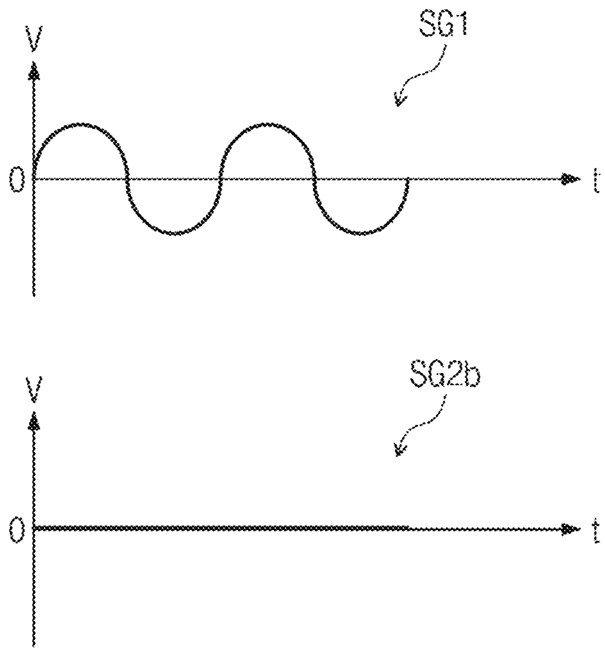
FIG. 28C illustrates graphs depicting waveforms of a first signal and a second signal according to an embodiment of the present disclosure.

FIG. 27 is a view illustrating the second mode according to an embodiment of the present disclosure. FIG. 28A illustrates graphs depicting waveforms of a first signal and a second signal according to an embodiment of the present disclosure. FIG. 28B illustrates graphs depicting waveforms of a first signal and a second signal according to an embodiment of the present disclosure. FIG. 28C illustrates graphs depicting waveforms of a first signal and a second signal according to an embodiment of the present disclosure.

Referring to FIGS. 24 and 27, the second mode MD2 may include a charging driving mode and a pen sensing driving mode. In addition, the charging driving mode may include a searching charging driving mode and a tracking charging driving mode. FIG. 27 is a view illustrating the searching charging driving mode.

Referring to FIGS. 24, 27, and 28A, in the charging driving mode, the sensor driver 200C may apply the first signal SG1 to at least one pad from among the third pads PD3 and/or the fifth pads PD5, and may apply the second signal SG2 to at least one other pad. The second signal SG2 may be an inverse signal of the first signal SG1. For example, the first signal SG1 may be a sinusoidal signal.

Although FIG. 27 illustrates an example in which the first signal SG1 is applied to one pad and the second signal SG2 is applied to another pad, the present disclosure is not limited thereto. For example, the first signal SG1 may be applied to two or more pads, and the second signal SG2 may be applied to two or more other pads.

Because the first signal SG1 and the second signal SG2 are applied to at least two pads, a current RFS may have a current path to flow through at least one pad to at least one other pad. In addition, because the first signal SG1 and the second signal SG2 may be sinusoidal signals having an inverse phase relationship, the direction of the current RFS may be periodically varied.

Referring to FIGS. 27 and 28B, the first signal SG1*a* and the second signal SG2*a* may be square-wave signals. The second signal SG2*a* may be an inverse signal of the first signal SG1*a*. Because the first signal SG1*a* and the second signal SG2*a* are applied to at least two pads, the current RFS may have a current path to flow through at least one pad to at least one other pad. In addition, because the first signal SG1*a* and the second signal SG2*a* may be square-wave signals having an inverse phase relationship, the direction of the current RFS may be periodically varied.

The first signal SG1 or SG1*a* illustrated in FIGS. 28A and 28B may have an inverse relationship with the second signal SG2 or SG2*a*. Accordingly, a noise caused in the display layer 100 (e.g., refer to FIG. 7) by the first signal SG1 or SG1*a* may cancel out a noise caused by the second signal SG2 or SG2*a*. Thus, a flicker phenomenon may not occur in the display layer 100, and the display quality of the display layer 100 may be improved.

Referring to FIGS. 27 and 28C, the first signal SG1 may be a sinusoidal signal. However, without being limited thereto, the first signal SG1 may be a square-wave signal. The second signal SG2*b* may have a constant voltage (e.g., a certain or predetermined constant voltage). For example, the second signal SG2*b* may be a ground voltage. In other words, a pad to which the second signal SG2*b* is applied may be regarded as being grounded. Even in this case, the current RFS may flow from at least one pad to at least one other pad. In addition, even though the at least one other pad is grounded, the direction of the current RFS may be periodically varied, because the first signal SG1 may be a sinusoidal signal or a square-wave signal.

Referring to FIG. 27, the second signal SG2 is provided to one third pad PD3*a* connected with one third trace line 230*rt*1, and the first signal SG1 is provided to one fifth pad PD5*a* connected with the third electrode 230. The current RFS may flow along a current path defined by the fifth pad PD5*a*, the fifth trace line 230*t*2 connected to the fifth pad PD5*a*, the third electrode 230, a portion of the third trace line 230*t*1 connected to the third pad PD3*a*, and the third pad PD3*a*. The current path may have a coil shape. Accordingly, in the charging driving mode of the second mode, the resonance circuit of the pen PN may be charged by the current path.

According to some embodiments of the present disclosure, a current path having a loop coil pattern may be implemented by the components included in the sensor layer 200. Accordingly, the electronic device 1000 (e.g., refer to FIG. 1A) may charge the pen PN using the sensor layer 200. Thus, a component having a coil for charging the pen PN may not be separately added, so that an increase in the thickness and the weight of the electronic device 1000 and a decrease in the flexibility of the electronic device 1000 may not occur.

In the charging driving mode, the first electrodes 210, the second electrodes 220, and the fourth electrodes 240 may be grounded or electrically floated, or may receive a constant voltage. In more detail, the first electrodes 210, the second electrodes 220, and the fourth electrodes 240 may be floated. In this case, the current RFS may not flow to the first electrodes 210, the second electrodes 220, and the fourth electrodes 240.

According to an embodiment, an electronic device includes a sensor layer and a sensor driver that drives the sensor layer and selectively operates in a first mode to sense a touch input or in a second mode to sense a pen input.

The sensor layer includes a plurality of first electrodes that are arranged in a first direction and that extend in a second direction crossing the first direction, a plurality of second electrodes that are arranged in the second direction and that extend in the first direction, a plurality of first auxiliary electrodes that are arranged in the first direction and that extend in the second direction and overlap the plurality of first electrodes, a plurality of second auxiliary electrodes that are arranged in the second direction and that extend in the first direction and overlap the plurality of second electrodes, a plurality of first trace lines connected to the plurality of first electrodes, a plurality of second trace lines connected to the plurality of second electrodes, and dummy patterns that overlap the plurality of second electrodes.

The plurality of second trace lines include second-first trace lines connected to second-first electrodes among the plurality of second electrodes and second-second trace lines connected to second-second electrodes among the plurality of second electrodes.

A first boundary electrode among the second-first electrodes is adjacent to a second boundary electrode among the second-second electrodes, and the dummy patterns include a first boundary dummy pattern that overlaps the first boundary electrode and a second boundary dummy pattern that overlaps the second boundary electrode.

The first boundary electrode and the first boundary dummy pattern are connected through first compensation contact holes, and the second boundary electrode and the second boundary dummy pattern are connected through second compensation contact holes. The number of first compensation contact holes and the number of second compensation contact holes vary depending on positions.

According to an embodiment, an electronic device includes a sensor layer and a sensor driver that drives the sensor layer and selectively operates in a first mode to sense a touch input or in a second mode to sense a pen input.

The sensor layer includes a plurality of first electrodes that are arranged in a first direction and that extend in a second direction crossing the first direction, a plurality of second electrodes that are arranged in the second direction and that extend in the first direction, a plurality of first auxiliary electrodes that are arranged in the first direction and that extend in the second direction and overlap the plurality of first electrodes, a plurality of second auxiliary electrodes that are arranged in the second direction and that extend in the first direction and overlap the plurality of second electrodes, a plurality of first trace lines connected to the plurality of first electrodes, a plurality of second trace lines connected to the plurality of second electrodes, and dummy patterns that overlap the plurality of second electrodes.

The plurality of second trace lines include second-first trace lines connected to second-first electrodes among the plurality of second electrodes and second-second trace lines connected to second-second electrodes among the plurality of second electrodes.

A first boundary electrode among the second-first electrodes is adjacent to a second boundary electrode among the second-second electrodes, and the dummy patterns include a first boundary dummy pattern connected with the first boundary electrode and a second boundary dummy pattern connected with the second boundary electrode. Each of the first and second boundary dummy patterns includes a mesh line, and a line width of the mesh line varies depending on positions.

According to an embodiment, an electronic device includes a sensor layer and a sensor driver that drives the sensor layer and selectively operates in a first mode to sense a touch input or in a second mode to sense a pen input.

The sensor layer includes a plurality of first electrodes that are arranged in a first direction and that extend in a second direction crossing the first direction, a plurality of second electrodes that are arranged in the second direction and that extend in the first direction, a plurality of first auxiliary electrodes that are arranged in the first direction and that extend in the second direction and overlap the plurality of first electrodes, a plurality of second auxiliary electrodes that are arranged in the second direction and that extend in the first direction and overlap the plurality of second electrodes, a plurality of first trace lines connected to the plurality of first electrodes, and a plurality of second trace lines connected to the plurality of second electrodes.

The plurality of second trace lines include second-first trace lines connected to second-first electrodes among the plurality of second electrodes and second-second trace lines connected to second-second electrodes among the plurality of second electrodes.

The plurality of second auxiliary electrodes include second-first auxiliary electrodes that overlap the second-first electrodes and second-second auxiliary electrodes that overlap the second-second electrodes.

The second mode includes a pen sensing driving mode. In the pen sensing driving mode, the plurality of first auxiliary electrodes are electrically connected with a ground or electrically connected with each other, and in the pen sensing driving mode, the plurality of second auxiliary electrodes are electrically connected with a ground or electrically connected with each other.

In the first mode, the second-first auxiliary electrodes receive a first compensation voltage, and the second-second auxiliary electrodes receive a second compensation voltage different from the first compensation voltage.

According to an embodiment, an electronic device includes a sensor layer and a sensor driver that drives the sensor layer and selectively operates in a first mode to sense a touch input or in a second mode to sense a pen input.

The sensor layer includes a plurality of first electrodes that are arranged in a first direction and that extend in a second direction crossing the first direction, a plurality of second electrodes that are arranged in the second direction and that extend in the first direction, a plurality of first auxiliary electrodes that are arranged in the first direction and that extend in the second direction and overlap the plurality of first electrodes, a plurality of second auxiliary electrodes that are arranged in the second direction and that extend in the first direction and overlap the plurality of second electrodes, a plurality of first trace lines connected to the plurality of first electrodes, and a plurality of second trace lines connected to the plurality of second electrodes.

The plurality of second trace lines include second-first trace lines connected to second-first electrodes among the plurality of second electrodes and second-second trace lines connected to second-second electrodes among the plurality of second electrodes.

The plurality of second auxiliary electrodes include a first auxiliary boundary electrode that overlaps a first boundary electrode among the second-first electrodes and a second auxiliary boundary electrode that overlaps a second boundary electrode among the second-second electrodes.

The second mode includes a pen sensing driving mode. In the pen sensing driving mode, the plurality of first auxiliary electrodes are electrically connected with a ground or electrically connected with each other, and in the pen sensing driving mode, the plurality of second auxiliary electrodes are electrically connected with a ground or electrically connected with each other.

In the first mode, the first auxiliary boundary electrode receives a first compensation voltage, and the second auxiliary boundary electrode receives a second compensation voltage different from the first compensation voltage.

According to some embodiments described above, a difference in a mutual capacitance between the first and second boundary electrodes may be compensated for by adjusting the number of first compensation contact holes and the number of second compensation contact holes depending on positions, and thus, a change in capacitance may be accurately sensed in the first mode.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a sensor layer; and a sensor driver configured to drive the sensor layer, and selectively operate in a first mode to sense a touch input or in a second mode to sense a pen input, wherein the sensor layer comprises:

a plurality of first electrodes along a first direction, and extending in a second direction crossing the first direction;

a plurality of second electrodes along the second direction, and extending in the first direction;

a plurality of first auxiliary electrodes along the first direction, extending in the second direction, and overlapping with the plurality of first electrodes;

a plurality of second auxiliary electrodes along the second direction, extending in the first direction, and overlapping with the plurality of second electrodes;

a plurality of first trace lines connected to the plurality of first electrodes;

a plurality of second trace lines connected to the plurality of second electrodes; and dummy patterns overlapping with the plurality of second electrodes, wherein the plurality of second trace lines comprises:

second-first trace lines connected to second-first electrodes from among the plurality of second electrodes; and second-second trace lines connected to second-second electrodes from among the plurality of second electrodes, wherein a first boundary electrode from among the second-first electrodes is adjacent to a second boundary electrode from among the second-second electrodes, wherein the dummy patterns comprise a first boundary dummy pattern overlapping with the first boundary electrode, and a second boundary dummy pattern overlapping with the second boundary electrode, wherein the first boundary electrode and the first boundary dummy pattern are connected to each other through first compensation contact holes, wherein the second boundary electrode and the second boundary dummy pattern are connected to each other through second compensation contact holes, and wherein a number of the first compensation contact holes and a number of the second compensation contact holes vary depending on positions.

2. The electronic device of claim 1, wherein the second-first trace lines are connected to first ends of the second-first electrodes located on a first side, respectively, and wherein the second-second trace lines are connected to second ends of the second-second electrodes located on a second side opposite to the first side, respectively.

3. The electronic device of claim 2, wherein the number of first compensation contact holes increases from a center point of the first boundary electrode toward a second end of the first boundary electrode, and wherein the number of second compensation contact holes increases from a center point of the second boundary electrode toward a first end of the second boundary electrode.

4. The electronic device of claim 1, wherein the first boundary electrode comprises first divided boundary electrodes spaced from each other in the second direction, and the first divided boundary electrodes are commonly connected to a first boundary trace line from among the second trace lines, and wherein the second boundary electrode comprises second divided boundary electrodes spaced from each other in the second direction, and the second divided boundary electrodes are commonly connected to a second boundary trace line from among the second trace lines.

5. The electronic device of claim 4, wherein the first compensation contact holes are connected with one of the first divided boundary electrodes, and wherein the second compensation contact holes are connected with one of the second divided boundary electrodes.

6. The electronic device of claim 1, wherein each of the first and second boundary electrodes comprises a plurality of sensing patterns, and a plurality of sensing bridge patterns electrically connecting the plurality of sensing patterns to each other, and wherein the sensor layer comprises:

a sensor base layer, the first and second boundary dummy patterns and the sensing bridge patterns being located on the sensor base layer; and an intermediate insulating layer covering the first and second boundary dummy patterns and the sensing bridge patterns, the sensing patterns being located on the intermediate insulating layer.

7. The electronic device of claim 6, wherein the first compensation contact holes penetrate the intermediate insulating layer, and expose the first boundary dummy pattern, wherein the sensing patterns of the first boundary electrode are connected to the first boundary dummy pattern through the first compensation contact holes, wherein the second compensation contact holes penetrate the intermediate insulating layer, and expose the second boundary dummy pattern, and wherein the sensing patterns of the second boundary electrode are connected to the second boundary dummy pattern through the second compensation contact holes.

8. The electronic device of claim 6, wherein each of the second auxiliary electrodes comprises a plurality of auxiliary patterns, and a plurality of auxiliary bridge patterns electrically connecting the plurality of auxiliary patterns to each other, and wherein the plurality of auxiliary patterns comprises:

first auxiliary patterns on the sensor base layer; and second auxiliary patterns on the intermediate insulating layer.

9. The electronic device of claim 8, wherein the first and second auxiliary patterns are connected with each other through a contact hole penetrating the intermediate insulating layer, and wherein the second auxiliary patterns and the auxiliary bridge patterns are connected with each other through a contact hole penetrating the intermediate insulating layer.

10. The electronic device of claim 1, wherein the second mode comprises a pen sensing driving mode, and wherein, in the pen sensing driving mode, the plurality of first auxiliary electrodes are electrically connected to ground, or electrically connected with each other, and wherein, in the pen sensing driving mode, the plurality of second auxiliary electrodes are electrically connected to ground, or electrically connected with each other.

11. The electronic device of claim 1, wherein the sensor layer further comprises:

a third trace line electrically connected to the plurality of first auxiliary electrodes; and a fourth trace line electrically connected to the plurality of second auxiliary electrodes, and wherein the fourth trace line comprises:

a fourth-first trace line commonly connected to second-first auxiliary electrodes adjacent to the second-first electrodes from among the second auxiliary electrodes; and a fourth-second trace line commonly connected to second-second auxiliary electrodes adjacent to the second-second electrodes from among the second auxiliary electrodes.

* * * * *